US010198767B2

(12) United States Patent
Armstrong et al.

(10) Patent No.: US 10,198,767 B2
(45) Date of Patent: Feb. 5, 2019

(54) DISPLAYED AND DARK EQUITY OPTIONS ELECTRONIC ORDER BOOK WITH MARKET MAKER PARTICIPATION

(75) Inventors: Peter Armstrong, Lafayette, CA (US); Amy Farnstrom, Oakland, CA (US); Jon Werts, Winnetka, IL (US)

(73) Assignee: NYSE Group, Inc., New York, NY (US)

( * ) Notice: Subject to any disclaimer, the term of this patent is extended or adjusted under 35 U.S.C. 154(b) by 1679 days.

(21) Appl. No.: 11/880,852

(22) Filed: Jul. 24, 2007

(65) Prior Publication Data

US 2009/0125431 A1 May 14, 2009

Related U.S. Application Data

(60) Provisional application No. 60/834,327, filed on Jul. 28, 2006.

(51) Int. Cl.
*G06Q 40/06* (2012.01)
*G06Q 40/04* (2012.01)
(Continued)

(52) U.S. Cl.
CPC ............. *G06Q 40/04* (2013.01); *G06Q 30/06* (2013.01); *G06Q 40/00* (2013.01); *G06Q 40/06* (2013.01)

(58) Field of Classification Search
CPC ................................ G06Q 40/06; G06Q 40/04
(Continued)

(56) References Cited

U.S. PATENT DOCUMENTS 5,101,353 A 3/1992 Lupien et al.
5,560,580 A 10/1996 Almoslino
(Continued)

FOREIGN PATENT DOCUMENTS

EP 1 321 870 6/2003
WO WO 2001/22322 3/2001
(Continued)

OTHER PUBLICATIONS

A Taxonomy of Automated Trade Execution Systems, Ian Domowitz, Journal of International Money and Finance, (1993), 12, pp. 607-631.*

(Continued)

*Primary Examiner* — Bruce I Ebersman
(74) *Attorney, Agent, or Firm* — DLA Piper LLP (US)

(57) ABSTRACT

An enhanced system and method for executing options trades are disclosed. The lead market maker entitlements are integrated with sophisticated order types, including dark order types, so that the lead marker maker is guaranteed an allocation of the trade if the lead market maker is at the NBBO when an order priced at or better than the NBBO is received. The lead market maker is not provided an opportunity to price improve to execute with a specific incoming order. Additionally, market makers who are not the lead market maker in an option series may be granted the privileges of a lead market maker for the purpose of executing with a specific incoming directed order if the designated market maker is at the NBBO when a directed order priced at or better than the NBBO is received. The system and method disclosed encourages market makers to quote the best price possible, which in turn has the effect of narrowing spreads. Furthermore, as only displayed orders at the NBBO are eligible to execute ahead of market makers quoting at the NBBO, the system and method encourages users to display their best prices and sizes to the marketplace.

26 Claims, 18 Drawing Sheets

(51) Int. Cl.
*G06Q 30/06* (2012.01)
*G06Q 40/00* (2012.01)
(58) Field of Classification Search
USPC .................................................. 705/37, 36 R
See application file for complete search history.

(56) References Cited

U.S. PATENT DOCUMENTS

| | | | |
|---|---|---|---|
| 5,845,266 A | 12/1998 | Lupien et al. | |
| 5,905,974 A | 5/1999 | Fraser et al. | |
| 5,950,176 A | 9/1999 | Keiser et al. | |
| 6,012,046 A | 1/2000 | Lupien et al. | |
| 6,098,051 A | 8/2000 | Lupien et al. | |
| 6,278,982 B1 | 8/2001 | Korhammer et al. | |
| 6,343,278 B1 | 1/2002 | Jain et al. | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,505,174 B1 | 1/2003 | Keiser et al. | |
| 6,615,188 B1 | 9/2003 | Breen et al. | |
| 6,618,707 B1* | 9/2003 | Gary | G06Q 40/00 705/36 R |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |
| 6,963,856 B2 | 11/2005 | Lutnick et al. | |
| 6,983,260 B2 | 1/2006 | Hummelgren | |
| 7,162,448 B2 | 1/2007 | Madoff et al. | |
| 7,184,982 B1 | 2/2007 | Howorka et al. | |
| 7,197,483 B2 | 3/2007 | Brady et al. | |
| 7,209,896 B1 | 4/2007 | Serkin et al. | |
| 7,225,153 B2 | 5/2007 | Lange | |
| 7,242,669 B2 | 7/2007 | Bundy et al. | |
| 7,246,090 B1 | 7/2007 | Thomas | |
| 7,246,093 B1 | 7/2007 | Katz | |
| 7,249,086 B2 | 7/2007 | Bloom et al. | |
| 7,356,498 B2 | 4/2008 | Kaminsky et al. | |
| 7,383,220 B1 | 6/2008 | Keith | |
| 7,401,046 B2 | 7/2008 | Hollerman et al. | |
| 7,467,110 B2 | 12/2008 | Muller et al. | |
| 7,685,057 B2 | 3/2010 | Chiulli et al. | |
| 7,873,561 B1 | 1/2011 | Adcock et al. | |
| 7,908,201 B2* | 3/2011 | Addock | G06Q 40/00 705/35 |
| 8,799,131 B2* | 8/2014 | Cormack | G06Q 30/08 705/36 R |
| 2001/0037284 A1 | 11/2001 | Finkelstein et al. | |
| 2002/0010672 A1 | 1/2002 | Waelbroeck et al. | |
| 2002/0010673 A1 | 1/2002 | Muller et al. | |
| 2002/0019795 A1 | 2/2002 | Madoff et al. | |
| 2002/0019799 A1 | 2/2002 | Ginsberg et al. | |
| 2002/0042765 A1 | 4/2002 | Dawson | |
| 2002/0062273 A1 | 5/2002 | Perkel et al. | |
| 2002/0082979 A1 | 6/2002 | Sands et al. | |
| 2002/0091617 A1 | 7/2002 | Keith | |
| 2002/0091621 A1 | 7/2002 | Conklin et al. | |
| 2002/0091624 A1 | 7/2002 | Glodjo et al. | |
| 2002/0120511 A1 | 8/2002 | Hanes | |
| 2002/0128951 A1 | 9/2002 | Kiron et al. | |
| 2002/0128955 A1 | 9/2002 | Brady et al. | |
| 2002/0128958 A1 | 9/2002 | Slone | |
| 2002/0143676 A1 | 10/2002 | Kiron et al. | |
| 2002/0147670 A1 | 10/2002 | Lange | |
| 2002/0161687 A1 | 10/2002 | Serkin et al. | |
| 2002/0169703 A1 | 11/2002 | Lutnick et al. | |
| 2002/0184135 A1 | 12/2002 | Zakaria | |
| 2002/0184136 A1 | 12/2002 | Cleary et al. | |
| 2002/0198815 A1 | 12/2002 | Greifeld et al. | |
| 2002/0198816 A1 | 12/2002 | Gilbert et al. | |
| 2003/0004851 A2 | 1/2003 | Kiron et al. | |
| 2003/0004858 A1 | 1/2003 | Schmitz et al. | |
| 2003/0009400 A2 | 1/2003 | Kiron et al. | |
| 2003/0009412 A1 | 1/2003 | Furbush et al. | |
| 2003/0009413 A1 | 1/2003 | Furbush et al. | |
| 2003/0009414 A1 | 1/2003 | Furbush et al. | |
| 2003/0014351 A1 | 1/2003 | Neff et al. | |
| 2003/0023536 A1 | 1/2003 | Hollerman et al. | |
| 2003/0040955 A1 | 2/2003 | Anaya et al. | |
| 2003/0041006 A1 | 2/2003 | Bunda | |
| 2003/0083974 A1 | 5/2003 | Bunda | |
| 2003/0093343 A1 | 5/2003 | Huttenlocher et al. | |
| 2003/0097328 A1 | 5/2003 | Lundberg et al. | |
| 2003/0115131 A1 | 6/2003 | Heaton et al. | |
| 2003/0130920 A1 | 7/2003 | Freund | |
| 2003/0130925 A1 | 7/2003 | Malitzis | |
| 2003/0130926 A1 | 7/2003 | Moore | |
| 2003/0135443 A1 | 7/2003 | Moore et al. | |
| 2003/0139998 A1 | 7/2003 | Gilbert et al. | |
| 2003/0172024 A1 | 9/2003 | Kokis et al. | |
| 2003/0177082 A1 | 9/2003 | Buckwalter | |
| 2003/0191703 A1 | 10/2003 | Chen et al. | |
| 2003/0216932 A1 | 11/2003 | Foley | |
| 2003/0229557 A1 | 12/2003 | Richmann et al. | |
| 2003/0233307 A1 | 12/2003 | Salvadori et al. | |
| 2004/0030630 A1 | 2/2004 | Tilfors et al. | |
| 2004/0044610 A1 | 3/2004 | Fraser et al. | |
| 2004/0059666 A1 | 3/2004 | Waelbroeck et al. | |
| 2004/0088242 A1 | 5/2004 | Ascher et al. | |
| 2004/0143538 A1* | 7/2004 | Korhammer | G06Q 40/04 705/37 |
| 2004/0143542 A1 | 7/2004 | Magill et al. | |
| 2004/0177024 A1 | 9/2004 | Bok et al. | |
| 2004/0177026 A1 | 9/2004 | Balabon | |
| 2004/0210508 A1 | 10/2004 | Bohnenberger | |
| 2004/0210511 A1 | 10/2004 | Waelbroeck et al. | |
| 2004/0215538 A1 | 10/2004 | Smith et al. | |
| 2004/0225592 A1 | 11/2004 | Churquina | |
| 2004/0236662 A1 | 11/2004 | Korhammer et al. | |
| 2004/0236669 A1 | 11/2004 | Horst et al. | |
| 2004/0243502 A1 | 12/2004 | Slowik et al. | |
| 2004/0254804 A1 | 12/2004 | Peterffy et al. | |
| 2004/0254877 A1 | 12/2004 | Buckwalter et al. | |
| 2004/0267655 A1 | 12/2004 | Davidowitz et al. | |
| 2005/0010481 A1 | 1/2005 | Lutnick et al. | |
| 2005/0075963 A1 | 4/2005 | Balabon | |
| 2005/0096999 A1 | 5/2005 | Newell et al. | |
| 2005/0119964 A1 | 6/2005 | Brady et al. | |
| 2005/0125316 A1 | 6/2005 | Levering et al. | |
| 2005/0131802 A1 | 6/2005 | Glodjo | |
| 2005/0137962 A1 | 6/2005 | Penney et al. | |
| 2005/0160024 A1 | 7/2005 | Soderborg et al. | |
| 2005/0171887 A1 | 8/2005 | Daley et al. | |
| 2005/0171888 A1 | 8/2005 | Daley et al. | |
| 2005/0171889 A1 | 8/2005 | Daley et al. | |
| 2005/0171890 A1 | 8/2005 | Daley et al. | |
| 2005/0171891 A1 | 8/2005 | Daley et al. | |
| 2005/0171895 A1 | 8/2005 | Howorka et al. | |
| 2005/0197916 A1 | 9/2005 | Newell et al. | |
| 2005/0222936 A1 | 10/2005 | Panariti et al. | |
| 2005/0228739 A1 | 10/2005 | Leibowitz | |
| 2005/0240510 A1 | 10/2005 | Schweickert et al. | |
| 2005/0273407 A1 | 12/2005 | Black et al. | |
| 2005/0273408 A1 | 12/2005 | Bandman et al. | |
| 2005/0273419 A1 | 12/2005 | Ogg et al. | |
| 2005/0283415 A1 | 12/2005 | Studnitzer et al. | |
| 2005/0283421 A1 | 12/2005 | Hatheway et al. | |
| 2005/0283426 A1 | 12/2005 | Krishnasami et al. | |
| 2005/0283427 A1 | 12/2005 | Owens et al. | |
| 2006/0020536 A1 | 1/2006 | Renton et al. | |
| 2006/0031157 A1 | 2/2006 | Gianakouros et al. | |
| 2006/0089898 A1 | 4/2006 | Durkin et al. | |
| 2006/0089899 A1 | 4/2006 | Durkin et al. | |
| 2006/0106707 A1* | 5/2006 | Shetty | G06Q 40/04 705/37 |
| 2006/0136318 A1 | 6/2006 | Rafieyan et al. | |
| 2006/0136326 A1 | 6/2006 | Heckman et al. | |
| 2006/0149659 A1 | 7/2006 | Carone et al. | |
| 2006/0161494 A1 | 7/2006 | Littlewood | |
| 2006/0184444 A1 | 8/2006 | McConaughy et al. | |
| 2006/0206404 A1 | 9/2006 | Hatheway et al. | |
| 2006/0206407 A1 | 9/2006 | Troxel et al. | |
| 2006/0235786 A1 | 10/2006 | DiSalvo | |
| 2006/0253374 A1 | 11/2006 | Addock et al. | |

(56) References Cited

U.S. PATENT DOCUMENTS

| | | | |
|---|---|---|---|
| 2006/0253379 A1* | 11/2006 | Adcock | G06Q 40/04 705/37 |
| 2006/0259391 A1 | 11/2006 | Schoen et al. | |
| 2006/0277137 A1 | 12/2006 | Claus et al. | |
| 2006/0277138 A1 | 12/2006 | Ross et al. | |
| 2007/0022041 A1 | 1/2007 | Durkin et al. | |
| 2007/0043647 A1 | 2/2007 | Bickford | |
| 2007/0055607 A1 | 3/2007 | Wunsch et al. | |
| 2007/0078753 A1 | 4/2007 | Cormack et al. | |
| 2007/0112693 A1 | 5/2007 | Cushing | |
| 2007/0198391 A1 | 8/2007 | Dreyer et al. | |
| 2007/0244792 A1 | 10/2007 | Couperier et al. | |
| 2008/0040290 A1 | 2/2008 | Harris | |
| 2008/0172318 A1* | 7/2008 | Bartko | G06Q 30/04 705/37 |
| 2009/0125431 A1 | 5/2009 | Armstrong et al. | |
| 2010/0030704 A1 | 2/2010 | Griffin et al. | |

FOREIGN PATENT DOCUMENTS

| | | |
|---|---|---|
| WO | WO 2001/22339 | 3/2001 |
| WO | WO 2001/52166 | 7/2001 |
| WO | WO 2001/75733 | 10/2001 |
| WO | WO 2001/90925 | 11/2001 |
| WO | WO 2002/07039 | 1/2002 |
| WO | WO 2002/09008 | 1/2002 |
| WO | WO 2004/008296 | 1/2004 |
| WO | WO 2005/010790 | 2/2005 |
| WO | WO 2005/036354 | 4/2005 |
| WO | WO 2006/121687 | 11/2006 |
| WO | WO 2006/121688 | 11/2006 |
| WO | WO 2006/121689 | 11/2006 |
| WO | WO 2006/121691 | 11/2006 |
| WO | WO 2006/121792 | 11/2006 |
| WO | WO 2006/121796 | 11/2006 |
| WO | WO 2006/121812 | 11/2006 |
| WO | WO 2007/038084 | 4/2007 |
| WO | WO 2007/038218 | 4/2007 |
| WO | WO 2008/013776 | 1/2008 |
| WO | WO 2008/013828 | 1/2008 |
| WO | WO 2008/013916 | 1/2008 |
| WO | WO 2008/013917 | 1/2008 |
| WO | WO 2008/024172 | 2/2008 |
| WO | WO 2008/027124 | 3/2008 |
| WO | WO 2008/073252 | 6/2008 |

OTHER PUBLICATIONS

Shmuel Baruch David Eccles School of Business, University of Utah article attached (Year: 2005).*
Apr. 23, 2009 International Preliminary Report on Patentability PCT/US2007/016572.
International Search Report PCT/US07/16572, dated Jul. 2, 2008.
Anonymous "Rising Tide Lifts All Boats in Institutional Equities," The Investment Dealers' Digest: IDD, New York, Mar. 28, 1994, vol. 60, Issue 13, p. 16, 5 pages.
Archipelago, "Launch of NASDAQ-listed Symbols on ArcaEx," Archipelago Bull Session, Jan. 2003, vol. 3, Isssue 1, [Online] [Retrieved Oct. 1, 2010] Retrieved from the Internet <URL: http://www.archipelago.com/content/announce/Bull%20Session%20January%2003.pdf>.
Australian Patent Office Search Report and Written Opinion, Singapore Application No. SG 2007/16678-8, dated Dec. 1, 2008, seventeen pages.
Austrian Patent Office Examination Report, Singapore Application No. SG2007166754, dated Sep. 28, 2009, five pages.
Austrian Patent Office Examination Report, Singapore Application No. SG2007166812, dated Oct. 2, 2009, five pages.
Austrian Patent Office Search Report and Written Opinion, Singapore Application No. SG 2007/16675-4, dated Jan. 9, 2009, six pages.
Austrian Patent Office Search Report and Written Opinion, Singapore Application No. SG 2007/16681-2, dated Jan. 30, 2009, seven pages.
Austrian Patent Office Search Report and Written Opinion, Singapore Application No. SG 2007/16679-6, dated Feb. 13, 2009, seven pages.
Austrian Patent Office Search Report and Written Opinion, Singapore Application No. SG 2007/16677-0, dated Mar. 6, 2009, eight pages.
Austrian Patent Office Search Report and Written Opinion, Singapore Application No. SG 2007/16680-4, dated Mar. 13, 2009, seven pages.
Domowitz, I., "A Taxonomy of Automated Trade Executions Systems," Journal of International Money and Finance, 1993, vol. 12, pp. 607-631.
EIC3600 Search Report, U.S. Appl. No. 11/345,420, dated Jul. 2, 2009, fifty-two pages.
EIC3600 Search Report, U.S. Appl. No. 11/122,679, dated Jul. 22, 2009, one hundred twenty-one pages.
Frijns, B., et al., "Price Discovery in Tick Time," Journal of Empirical Financial, vol. 16, Issue 5, Dec. 2009, pp. 759-776.
Huang, R. et al., "Tick Size, Bid-Ask Spreads and Market Structure," Working Paper 99-05 Version: Feb. 8, 2001; Forthcoming Journal of Financial and Quantitative Analysis, thirty-two pages.
M2 Presswire, "NASDAQ Launches Liquidity Tracker, Intelligent Order Routing System Allows Market Participants to Find and Increase Liquidity," Dec. 5, 2002, four pages.
McKinnion, J., "Toldeo Ohio-Based Dana Corp. Could Lose NYSE Listing in Takeover Battle," The Blade, Aug. 3, 2003, three pages.
Noticiasfinancieras, "Headstrong Buys Assets of Elind Software Provider," Nov. 1, 2004, Miami, Floriday, USA, four pages.
PCT International Preliminary Report on Patentability, PCT/US2007/016572, dated Apr. 15, 2009, four pages.
PCT International Preliminary Report on Patentability, PCT/US2007/024921, dated Jun. 10, 2009, five pages.
PCT International Search Report, PCT/US2007/016718, dated Mar. 20, 2008, two pages.
PCT International Search Report, PCT/US2007/016682, dated Jun. 17, 2008, two pages.
PCT International Search Report, PCT/US2006/036461, dated Jun. 17, 2008, two pages.
PCT International Search Report, PCT/US2007/016857, dated Sep. 5, 2008, one page.
PCT International Search Report, PCT/US2007/016856, dated Sep. 18, 2008, two pages.
PCT International Search Report and Written Opinion, PCT Application No. PCT/US2006/36878, dated May 18, 2007, 4 pages.
PCT International Search Report and Written Opinion, PCT Application No. PCT/US2006/17296, dated Aug. 7, 2007, 5 pages.
PCT International Search Report and Written Opinion, PCT Application No. PCT/US2006/16684, dated Aug. 9, 2007, 6 pages.
PCT International Search Report and Written Opinion, PCT Application No. PCT/US2006/16683, dated Aug. 29, 2007, 6 pages.
PCT International Search Report and Written Opinion, PCT Application No. PCT/US2006/16701, dated Aug. 29, 2007, 7 pages.
PCT International Search Report and Written Opinion, PCT Application No. PCT/US2006/17249, dated Sep. 5, 2007, 8 pages.
PCT International Search Report and Written Opinion, PCT Application No. PCT/US2006/17253, dated Sep. 12, 2007, 6 pages.
PCT International Search Report and Written Opinion, PCT Application No. PCT/US06/16685, dated Sep. 17, 2007, six pages.
PCT International Search Report and Written Opinion, PCT Application No. PCT/US2007/024921, dated May 12, 2008, nine pages.
PCT International Search Report and Written Opinion, PCT Application No. PCT/US2007/016571, dated Jun. 17, 2008, six pages.
PCT International Search Report and Written Opinion, PCT Application No. PCT/US2007/016572, dated Jul. 2, 2008, nine pages.
PCT International Search Report and Written Opinion, PCT Application No. PCT/US07/16856, dated Nov. 10, 2008, eight pages.
Schnitzlein, C., "Call and Continuous Trading Mechanisms Under Asymmetric Information: An Experimental Investigation," The Journal of Finance, vol. 51, No. 2, pp. 613-636.

(56) References Cited

OTHER PUBLICATIONS

Securities and Exchange Commission, "Self-Regulatory Organization; Order Approving Proposed Rule Change by the Pacific Exchange, Inc., as Amended, and Notice of Filing and Order Granting Accelerated Approval to Amendment No. 2 Relating to New Order Types and to Amend PCXE Rule 7.37," Federal Register, Mar. 13, 2003, vol. 68, No. 49, pp. 12134-12138. [Online] [Retrievied Nov. 19, 2010] Retrieved from the Internet <URL: http://edocket.access.gpo.gov/2003/03-6072.htm.>.
Tseng, K.C., "Supermontage as a New Trading System of NAS-DAQ," Investment Management and Financial Innovations, Mar. 2005, pp. 8-15.
U.S. Appl. No. 11/122,498, filed May 5, 2005.
U.S. Appl. No. 11/122,689, filed Jul. 27, 2010.
U.S. Appl. No. 11/345,420, filed Nov. 9, 2006.
U.S. Appl. No. 11/345,421, filed Nov. 9, 2009.
U.S. Appl. No. 11/416,710, filed Nov. 9, 2006.
U.S. Appl. No. 11/416,756, filed Nov. 9, 2006.
U.S. Appl. No. 11/416,913, filed Nov. 9, 2006.
U.S. Appl. No. 11/416,942, filed Nov. 9, 2006.
U.S. Appl. No. 11/416,943, filed Nov. 9, 2006.
U.S. Appl. No. 11/525,363, filed Apr. 5, 2007.
U.S. Appl. No. 11/527,797, filed Mar. 29, 2007.
U.S. Appl. No. 11/634,020, filed Jun. 5, 2008.
U.S. Appl. No. 11/880,840, filed Mar. 12, 2009.
U.S. Appl. No. 11/880,686, filed Jan. 29, 2009.
U.S. Appl. No. 11/881,064, filed Sep. 18, 2008.
U.S. Appl. No. 11/881,788, filed Jun. 18, 2009.
U.S. Appl. No. 11/881,789, field Sep. 18, 2009.
U.S. Appl. No. 60/721,165, filed Sep. 28, 2005.
U.S. Appl. No. 61/191,055.
USPTO Examiner Interview Summary, U.S. Appl. No. 11/416,943, dated Mar. 31, 2009, two pages.
USPTO Examiner Interview, U.S. Appl. No. 11/122,689, dated Apr. 13, 2009, four pages.
USPTO Examiner Interview Summary, U.S. Appl. No. 11/122,679, dated May 4, 2009, two pages.
USPTO Examiner Interview Summary, U.S. Appl. No. 11/122,498, dated Aug. 18, 2009, four pages.
USPTO Examiner Interview Summary, U.S. Appl. No. 11/122,689, dated Aug. 18, 2009, four pages.
USPTO Examiner Interview Summary, U.S. Appl. No. 11/122,679, dated Sep. 9, 2009, two pages.
USPTO Examiner Interview Summary, U.S. Appl. No. 11/416,942, dated Oct. 14, 2009, three pages.
USPTO Examiner Interview, U.S. Appl. No. 11/122,498, dated Jan. 21, 2010, three pages.
USPTO Final Office Action, U.S. Appl. No. 11/880,686, dated Jul. 21, 2010, nine pages.
USPTO Final Rejection, U.S. Appl. No. 11/122,498, dated Sep. 19, 2008, twenty-nine pages.
USPTO Final Rejection, U.S. Appl. No. 11/122,689, dated Nov. 18, 2008, twenty-five pages.
USPTO Final Rejection, U.S. Appl. No. 11/345,421, dated Jan. 26, 2009, nine pages.
USPTO Final Rejection, U.S. Appl. No. 11/527,797, dated Mar. 30, 2009, thirteen pages.
USPTO Final Rejection, U.S. Appl. No. 11/416,943, dated Mar. 17, 2009, eighteen pages.
USPTO Final Rejection, U.S. Appl. No. 11/416,942, dated Apr. 23, 2009, ten pages.
USPTO Final Rejection, U.S. Appl. No. 11/416,913, dated Aug. 3, 2009, forty-nine pages.
USPTO Final Rejection, U.S. Appl. No. 11/634,020, dated Dec. 28, 2009, eleven pages.
USPTO Final Rejection, U.S. Appl. No. 11/122,498, dated Jan. 21, 2010, forty-two pages.
USPTO Final Rejection, U.S. Appl. No. 11/527,797, dated Jan. 25, 2010, twelve pages.
USPTO Final Rejection, U.S. Appl. No. 11/416,756, dated Apr. 27, 2010, fourteen pages.
USPTO Final Rejection, U.S. Appl. No. 11/881,064, dated Mar. 22, 2011, fifteen pages.
USPTO Informal Response to Non-Final, U.S. Appl. No. 11/416,710, dated Aug. 4, 2008, seventeen pages.
USPTO Non-Final Rejection, U.S. Appl. No. 11/122,498, dated Feb. 12, 2008, twenty-two pages.
USPTO Non-Final Rejection, , U.S. Appl. No. 11/122,689, dated Feb. 26, 2008, twenty-two pages.
USPTO Non-Final Rejection, U.S. Appl. No. 11/122,679, dated Apr. 1, 2008, thirty-one pages.
USPTO Non-Final Rejection, U.S. Appl. No. 11/416,710, dated Apr. 4, 2008, six pages.
USPTO Non-Final Rejection, U.S. Appl. No. 11/345,421, dated Jun. 27, 2008, seven pages.
USPTO Non-Final Rejection, U.S. Appl. No. 11/527,797, dated Sep. 15, 2008, nine pages.
USPTO Non-Final Rejection, U.S. Appl. No. 11/416,942, dated Sep. 30, 2008, seven pages.
USPTO Non-Final Rejection, U.S. Appl. No. 11/634,020, dated Nov. 12, 2008, ten pages.
USPTO Non-Final Rejection, U.S. Appl. No. 11,345,420, dated Dec. 9, 2008, eight pages.
USPTO Non-Final Rejection, U.S. Appl. No. 11/416,913, dated Dec. 29, 2008, forty-four pages.
USPTO Non-Final Rejection, U.S. Appl. No. 11/416,710, dated Dec. 30, 2008, five pages.
USPTO Non-Final Rejection, U.S. Appl. No. 11/122,679, dated Jan. 5, 2009, twenty-one pages.
USPTO Non-Final Rejection, U.S. Appl. No. 11/122,498, dated Apr. 15, 2009, forty-five pages.
USPTO Non-Final Rejection, U.S. Appl. No. 11/122,689, dated Apr. 27, 2009, forty pages.
USPTO Non-Final Rejection, U.S. Appl. No. 11/525,363, dated May 19, 2009, seventeen pages.
USPTO Non-Final Rejection, U.S. Appl. No. 11/634,020, dated Jun. 24, 2009, fourteen pages.
USPTO Non-Final Rejection, U.S. Appl. No. 11/416,756, dated Aug. 4, 2009, six pages.
USPTO Non-Final Rejection, U.S. Appl. No. 11/416,710, dated Aug. 17, 2009, six pages.
USPTO Non-Final Rejection, U.S. Appl. No. 11/416,943, dated Sep. 30, 2009, thirteen pages.
USPTO Non-Final Rejection, U.S. Appl. No. 11/345,421, dated Oct. 7, 2009, nine pages.
USPTO Non-Final Rejection, U.S. Appl. No. 11/880,686, dated Nov. 6, 2009, eight pages.
USPTO Non-Final Rejection,, U.S. Appl. No. 11/881,789, dated Dec. 1, 2009, ten pages.
USPTO Non-Final Rejection, U.S. Appl. No. 11/416,913, dated Jan. 22, 2010, thirty-eight pages.
USPTO Non-Final Rejection, U.S. Appl. No. 11/634,020, dated Apr. 28, 2010, twelve pages.
USPTO Non-Final Rejection, U.S. Appl. No. 11/881,788, dated Jun. 29, 2010, six pages.
USPTO Non-Final Rejection, U.S. Appl. No. 11/881,064, dated Jun. 30, 2010, twelve pages.
USPTO Non-Final Rejection, U.S. Appl. No. 11/880,840, dated Jul. 6, 2010, nine pages.
USPTO Notice of Abandonment, U.S. Appl. No. 11/527,797, dated Aug. 3, 2010, two pages.
USPTO Notice of Allowance, U.S. Appl. No. 11/345,420, dated Jul. 23, 2009, eight pages.
USPTO Notice of Allowance, U.S. Appl. No. 11/122,679, dated Aug. 21, 2009, ten pages.
USPTO Notice of Allowance, U.S. Appl. No. 11/345,420, dated Nov. 16, 2009, four pages.
USPTO Notice of Allowance, U.S. Appl. No. 11/122,689, dated Dec. 14, 2009, eight pages.
USPTO Notice of Allowance, U.S. Appl. No. 11/416,942, dated Dec. 29, 2009, eight pages.

(56) References Cited

OTHER PUBLICATIONS

USPTO Notice of Allowance, U.S. Appl. No. 11/122,679, dated Jan. 15, 2010, ten pages.
USPTO Notice of Allowance, U.S. Appl. No. 11/122,689, dated Jan. 26, 2010, six pages.
USPTO Notice of Allowance, U.S. Appl. No. 11/416,942, dated Jan. 26, 2010, five pages.
USPTO Notice of Allowance, U.S. Appl. No. 11/416,942, dated Feb. 24, 2010, five pages.
USPTO Notice of Allowance, U.S. Appl. No. 11/122,689, dated Mar. 1, 2010, two pages.
USPTO Notice of Allowance, U.S. Appl. No. 11/416,710, dated Mar. 22, 2010, eight pages.
USPTO Notice of Allowance, U.S. Appl. No. 11/345,421, dated Apr. 2, 2010, four pages.
USPTO Notice of Allowance, U.S. Appl. No. 11/416,710, dated Jun. 15, 2010, eight pages.
USPTO Notice of Allowance, U.S. Appl. No. 11/416,942, dated Jun. 16, 2010, five pages.
USPTO Notice of Allowance, U.S. Appl. No. 11/122,498, dated Jul. 1, 2010, six pages.
USPTO Notice of Allowance, U.S. Appl. No. 11/345,421, dated Aug. 4, 2010, four pages.
USPTO Notice of Allowance, U.S. Appl. No. 11/122,679, dated Aug. 16, 2010, ten pages.
USPTO Notice of Allowance, U.S. Appl. No. 11/122,498, dated Aug. 31, 2010, seven pages.
USPTO Notice of Allowance, U.S. Appl. No. 11/345,420, dated Sep. 7, 2010, six pages.
USPTO Notice of Allowance, U.S. Appl. No. 11/122,498, dated Sep. 14, 2010, two pages.
USPTO Notice to Applicant re: Informal Response to Non-Final, U.S. Appl. No. 11/416,710, dated Sep. 11, 2008, two pages.
USPTO Proposed Examiner's Amendment, U.S. Appl. No. 11/525,363, dated Jul. 6, 2010, seventeen pages.
USPTO Response to Final, U.S. Appl. No. 11/122,498, dated Jan. 9, 2009, nineteen pages.
USPTO Response to Final, U.S. Appl. No. 11/122,689, dated Mar. 17, 2009, twenty pages.
USPTO Response to Final, U.S. Appl. No. 11/527,797, dated May 19, 2009, sixteen pages.
USPTO Response to Final, U.S. Appl. No. 11/345,421, dated May 22, 2009, fifteen pages.
USPTO Response to Final, U.S. Appl. No. 11/416,943, dated Jun. 17, 2009, fifteen pages.
USPTO Response to Final, U.S. Appl. No. 11/416,942, dated Sep. 30, 2009, thirteen pages.
USPTO Response to Final, U.S. Appl. No. 11/416,942, dated Oct. 7, 2009, seven pages.
USPTO Response to Final, U.S. Appl. No. 11/416,913, dated Oct. 13, 2009, fifteen pages.
USPTO Response to Final, U.S. Appl. No. 11/634,020, dated Mar. 16, 2010, eleven pages.
USPTO Response to Final, U.S. Appl. No. 11/122,498, dated Jun. 16, 2010, twenty-one pages.
USPTO Response to Final, U.S. Appl. No. 11,416,913, dated Jun. 22, 2010, sixteen pages.
USPTO Response to Non-Final, U.S. Appl. No. 11/122,498, dated Aug. 14, 2008, seventeen pages.
USPTO Response to Non-Final, U.S. Appl. No. 11/122,689, dated Aug. 29, 2008, sixteen pages.
USPTO Response to Non-Final, U.S. Appl. No. 11/416,710, dated Sep. 19, 2008, seventeen pages.
USPTO Response to Non-Final, U.S. Appl. No. 11/345,421, dated Sep. 22, 2008, nine pages.
USPTO Response to Non-Final, U.S. Appl. No. 11/122,679, dated Oct. 6, 2008, fourteen pages.
USPTO Response to Non-Final, U.S. Appl. No. 11/416,943, dated Dec. 5, 2008, eleven pages.
USPTO Response to Non-Final, U.S. Appl. No. 11/527,797, dated Dec. 15, 2008, eleven pages.
USPTO Response to Non-Final, U.S. Appl. No. 11/416,942, dated Jan. 12, 2009, five pages.
USPTO Response to Non-Final, U.S. Appl. No. 11/634,020, dated Feb. 17, 2009, eleven pages.
USPTO Response to Non-Final, U.S. Appl. No. 11/345,420, dated Mar. 16, 2009, ten pages.
USPTO Response to Non-Final, U.S. Appl. No. 11/416,913, dated Mar. 25, 2009, twelve pages.
USPTO Response to Non-Final, U.S. Appl. No. 11/416,710, dated Mar. 27, 2009, eleven pages.
USPTO Response to Non-Final, U.S. Appl. No. 11/122,679, dated Apr. 6, 2009, eighteen pages.
USPTO Response to Non-Final, U.S. Appl. No. 11/416,756, dated Apr. 27, 2009, thirteen pages.
USPTO Response to Non-Final, U.S. Appl. No. 11/122,679, dated Jun. 17, 2009, twenty-one pages.
USPTO Response to Non-Final, U.S. Appl. No. 11/122,689, dated Aug. 27, 2009, twenty-nine pages.
USPTO Response to Non-Final, U.S. Appl. No. 11/122,498, dated Sep. 15, 2009, twenty-five pages.
USPTO Response to Non-Final, U.S. Appl. No. 11/634,020, dated Sep. 29, 2009, twelve pages.
USPTO Response to Non-Final, U.S. Appl. No. 11/416,710, dated Nov. 2, 2009, sixteen pages.
USPTO Response to Non-Final, U.S. Appl. No. 11/416,756, dated Nov. 4, 2009, eighteen pages.
USPTO Response to Non-Final, U.S. Appl. No. 11/525,363, dated Nov. 16, 2009, twenty-eight pages.
USPTO Response to Non-Final, U.S. Appl. No. 11/345,421, dated Nov. 23, 2009, eleven pages.
USPTO Response to Non-Final, U.S. Appl. No. 11/881,789, dated Mar. 19, 2010, twenty-two pages.
USPTO Response to Non-Final, U.S. Appl. No. 11/880,686, dated May 3, 2010, ten pages.
USPTO Response to Non-Final, U.S. Appl. No. 11/634,020, dated Jul. 28, 2010, eighteen pages.
USPTO Response to Restriction Requirement, U.S. Appl. No. 11/881,789, dated Sep. 2, 2010, eighteen pages.
USPTO Restriction Requirement, U.S. Appl. No. 11/416,756, dated Mar. 27, 2009, ten pages.
USPTO Restriction Requirement, U.S. Appl. No. 11/881,789, dated Aug. 20, 2010, eight pages.
Wall Street Letter, "Phlx Allows Floor Broker Crossing," New York, New York, USA, Feb. 24, 2003, two pages.

\* cited by examiner

Highest Priority → → → → → → → → → Lowest Priority

| Display Order Process | Reserve Process | Liquidity Process | Discretionary Process | Tracking Process | Routing Process |
|---|---|---|---|---|---|
| 1. Best Displayed Order or Quote at the NBBO | 4. Best Reserve Portion of an Order at the NBBO | 7. Best Passive Liquidity Order at the NBBO | 10. Best Discretionary Order that can Step Up to the NBBO | 13. Best Tracking Liquidity Order at the NBBO | 16. Best Away Market Quote at the NBBO |
| 2. 2$^{nd}$-best Displayed Order or Quote at the NBBO | 5. 2$^{nd}$-best Reserve Portion of an Order at the NBBO | 8. 2$^{nd}$-best Passive Liquidity Order at the NBBO | 11. 2$^{nd}$-best Discretionary Order that can Step Up to the NBBO | 14. 2$^{nd}$-best Tracking Liquidity Order at the NBBO | 17. 2$^{nd}$-best Away Market Quote at the NBBO |
| 3. 3$^{rd}$-best Displayed Order or Quote at the NBBO | 6. 3$^{rd}$-best Reserve Portion of an Order at the NBBO | 9. 3$^{rd}$-best Passive Liquidity Order at the NBBO | 12. 3$^{rd}$-best Discretionary Order that can Step Up to the NBBO | 15. 3$^{rd}$-best Tracking Liquidity Order at the NBBO | 18. 3$^{rd}$-best Away Market Quote at the NBBO |
| 19. Best Displayed Order or Quote at One Tick Inferior to the NBBO | 22. Best Reserve Portion of an Order at One Tick Inferior to the NBBO | 25. Best Passive Liquidity Order at One Tick Inferior to the NBBO | 28. Best Discretionary Order that can Step Up to One Tick Inferior to the NBBO | | 31. Best Away Market Quote at One Tick Inferior to the NBBO |
| 20. 2$^{nd}$-best Displayed Order or Quote at One Tick Inferior to the NBBO | 23. 2$^{nd}$-best Reserve Portion of an Order at One Tick Inferior to the NBBO | 26. 2$^{nd}$-best Passive Liquidity Order at One Tick Inferior to the NBBO | 29. 2$^{nd}$-best Discretionary Order that can Step Up to One Tick Inferior to the NBBO | | 32. 2$^{nd}$-best Away Market Quote at One Tick Inferior to the NBBO |
| 21. 3$^{rd}$-best Displayed Order or Quote at One Tick Inferior to the NBBO | 24. 3$^{rd}$-best Reserve Portion of an Order at One Tick Inferior to the NBBO | 27. 3$^{rd}$-best Passive Liquidity Order at One Tick Inferior to the NBBO | 30. 3$^{rd}$-best Discretionary Order that can Step Up to One Tick Inferior to the NBBO | | 33. 3$^{rd}$-best Away Market Quote at One Tick Inferior to the NBBO |

FIG. 3

Directed Order Permissions Table

Example of a DMM / OSF Permissions Table

| Issue | Designated Market Maker Firm (DMM) | Default MM? | Order Sending Firm (OSF) |
|---|---|---|---|
| XYZ | Firm A |   | Firm B |
| XYZ | Firm A | Y | Firm C |
| XYZ | Firm B | Y | Firm B |
| XYZ | Firm B |   | Firm A |

According to this Table:

* Firm B can Direct Orders to Firm A and Firm B
* Firm C can Direct Orders to Firm A Only
* Firm A can Direct Orders to Firm B Only
* If Firm B does not Specify a DMM, the Route Defaults to Firm B
* If Firm C does not Specify a DMM, the Route Defaults to Firm A
* If Firm A does not Specify a DMM, there is no Default Route

FIG. 7B

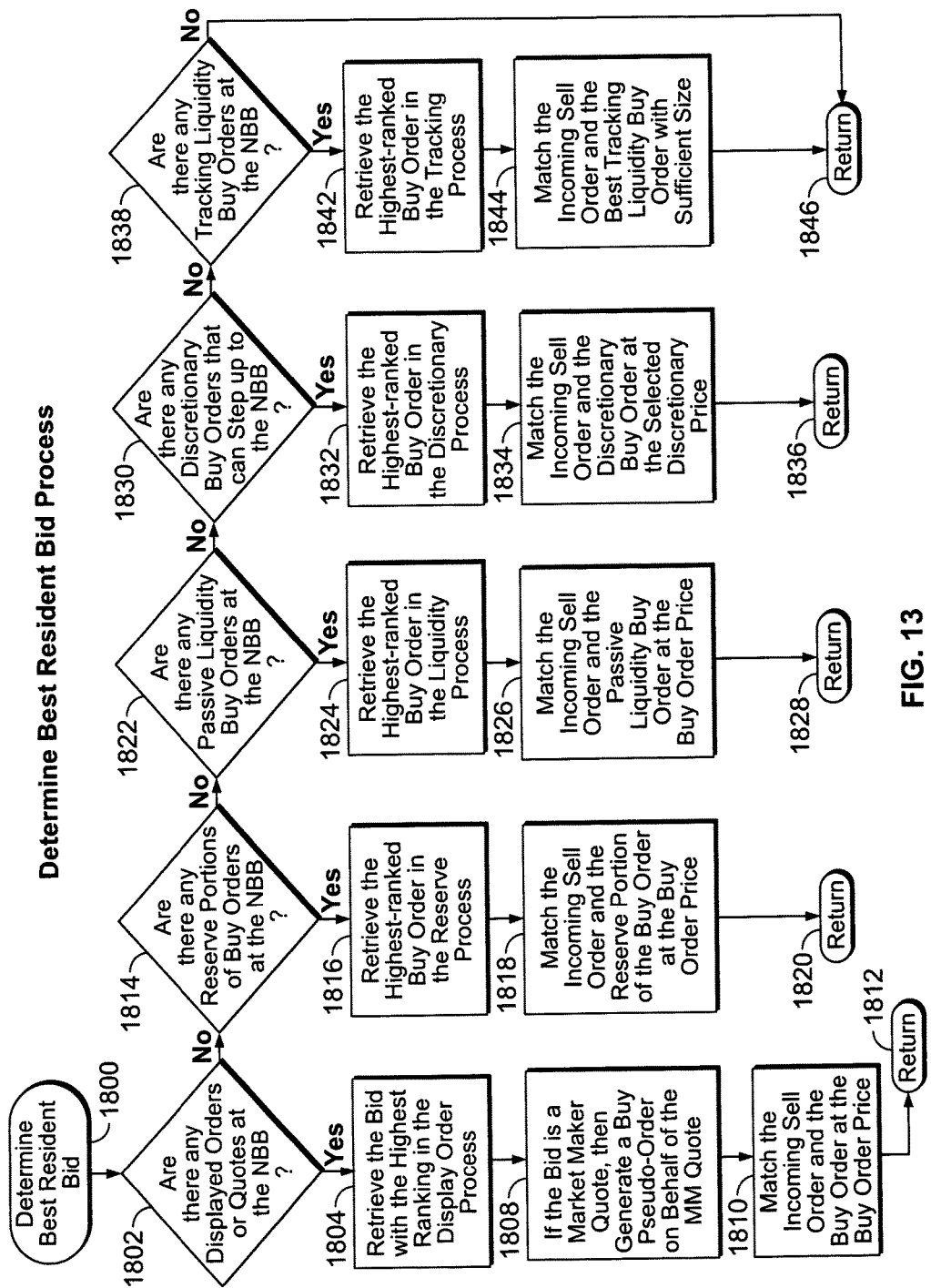

DISPLAYED AND DARK EQUITY OPTIONS ELECTRONIC ORDER BOOK WITH MARKET MAKER PARTICIPATION

CROSS-REFERENCE TO RELATED APPLICATIONS

This application claims priority from and claims the benefit of U.S. Provisional Application No. 60/834,327, filed Jul. 28, 2006, entitled "Electronic Equity Options Order Execution and Routing System"; co-pending U.S. patent application Ser. No. 11/416,756, filed May 3, 2006, entitled "Passive Liquidity Order"; and co-pending U.S. patent application Ser. No. 11/416,943, filed May 3, 2006, entitled "Tracking Liquidity Order"; which are all hereby incorporated by reference.

BACKGROUND

Until 2000, the trading of options was conducted on physical trading floors using an open outcry method. In response to increasing competition as equity options classes became listed on multiple exchanges, the options marketplace has now become highly automated. While some exchanges retain their trading floors, others are completely electronic and floorless. One model employed by option exchanges is a hybrid trading system model. In a hybrid model, the exchange has a physical trading floor, but also has an electronic order execution facility. A typical hybrid trading system model supports one or more limit order books where guaranteed, electronic matching takes place for small size customer orders. Orders not qualifying for fully-electronic execution, such as large orders and complex orders, are generally routed to workstations on the trading floor for execution or facilitation by a specialist or equivalent market maker. The specialist or equivalent market maker typically presents an order to the trading crowd for possible electronic and open outcry price improvement before executing it or sending it to another exchange at the NBBO.

A second trading model employed on option exchanges is generally referred to as a competing market maker model. In this model, typically used by fully-electronic exchanges without a physical trading floor, market makers in each option class compete against a primary or lead market maker for incoming orders. The market makers are electronically notified when an incoming order is eligible for price improvement, and interested participants send their price-matching and/or price-improving orders remotely during a brief (e.g., 1- to 3-second) auction period.

In these order execution models, incoming orders are typically divided among all the market makers willing to trade at a certain price, with the largest percentage of incoming orders allocated to the market makers who quote the largest size or who trade the most often. Thus, market makers often take the contra side of an incoming order to encourage trading. Also, in models that support price-improvement auctions, a market maker can step ahead of displayed orders and quotes by as little as a penny to participate with specific incoming orders. This encourages the exchanges to momentarily improve their prices only in response to specific incoming orders, rather than tightening the NBBO spread.

Accordingly, there is a need for an "order-driven" options trading system that utilizes price/time priority principles, rather than being "quote-driven," so that all orders and quotes compete equally, while still providing an incentive for market makers to make a market in each specific option class. There is also a need that such a system only allows a market maker to receive a guaranteed entitlement if it is already quoting at the national best bid and offer ("NBBO") when an incoming order is received. In such a system, the market maker would not be allowed to improve its price (either by changing its quote or by sending a superior-priced order) for the purpose of executing against a specific incoming order. Such an options trading system would reward market makers for narrowing the spread, promote more competition between orders and quotes and, as a result, encourage users of the system, i.e., both members and non-members alike, to compete against each other.

SUMMARY

According to one aspect of the present invention, a method for electronic options trading with market maker participation includes a market center which lists a plurality of options series, wherein the market center has an order book for each option series and a quote book for each option series, wherein the order book has a displayed interest component and a nondisplayed interest component and wherein a number of the option series have an appointed lead market maker. The method further includes receiving an incoming order, determining if the order is for an option series that has a lead market maker and determining if the lead market maker has a quote at the NBBO. The method further includes, wherein if the lead market maker has a quote at the NBBO, computing an allocation percentage for the lead market maker and matching the incoming order up to the allocation percentage amount computed for the lead market maker.

According to another aspect of the present invention, the method may further include, prior to computing the lead market maker allocation percentage, determining if the order book has a customer order at the NBBO; wherein if the order book does have a customer order at the NBBO, determining if the customer order is displayed and was posted to the order book prior to the lead market maker quote at the NBBO; wherein if the customer order at the NBBO is displayed and was posted to the order book prior to the lead market maker quote at the NBBO, it matches the incoming order with the customer order. According to another aspect of the present invention, wherein if the customer order at the NBBO was posted to the order book after the lead market maker quote at the NBBO, proceeding to compute the lead market maker allocation percentage or wherein if the customer order at the NBBO is not displayed, proceeding to compute the lead market maker allocation percentage.

According to yet another aspect of the present invention, the method includes determining if the order book has a nondisplayed order with a price superior to the NBBO; wherein if the order book does have a nondisplayed order with a price superior to the NBBO, determining if the order may execute ahead of the lead market maker quote. If the order with a price superior to the NBBO may execute ahead of the lead market maker quote, matching the incoming order with the nondisplayed order with a price superior to the NBBO. In the method of the invention, the lead market maker may have a quote at the NBO or the NBB.

According to another aspect of the present invention, the method may further include an appointed market maker in the option series in addition to the lead market maker; wherein the incoming order is from a specified order sending firm and is directed to and designates the appointed market maker. The method determines if the order sending firm is permissioned to direct orders to the designated market maker; wherein if the order sending firm does have permission to direct orders to the designated market maker, determining if the designated market maker has a quote at the NBBO and wherein if the designated market maker has a quote at the NBBO, computing an allocation percentage for the designated market maker and matching the incoming order up to the allocation percentage amount computed for the designated market maker.

DESCRIPTION OF THE DRAWINGS

These and other features, aspects and advantages of the present invention will become better understood with regard to the following description, appended claims and accompanying drawings where:

FIG. 3 illustrates an order execution hierarchy of the equity options electronic order book of the present invention;

FIG. 7B is an exemplary designated market maker/order sending firm permissions table;

FIG. 13 is a flow diagram illustrating a process for determining the best resident bid in an embodiment of the present invention.

DETAILED DESCRIPTION

Figure 1:
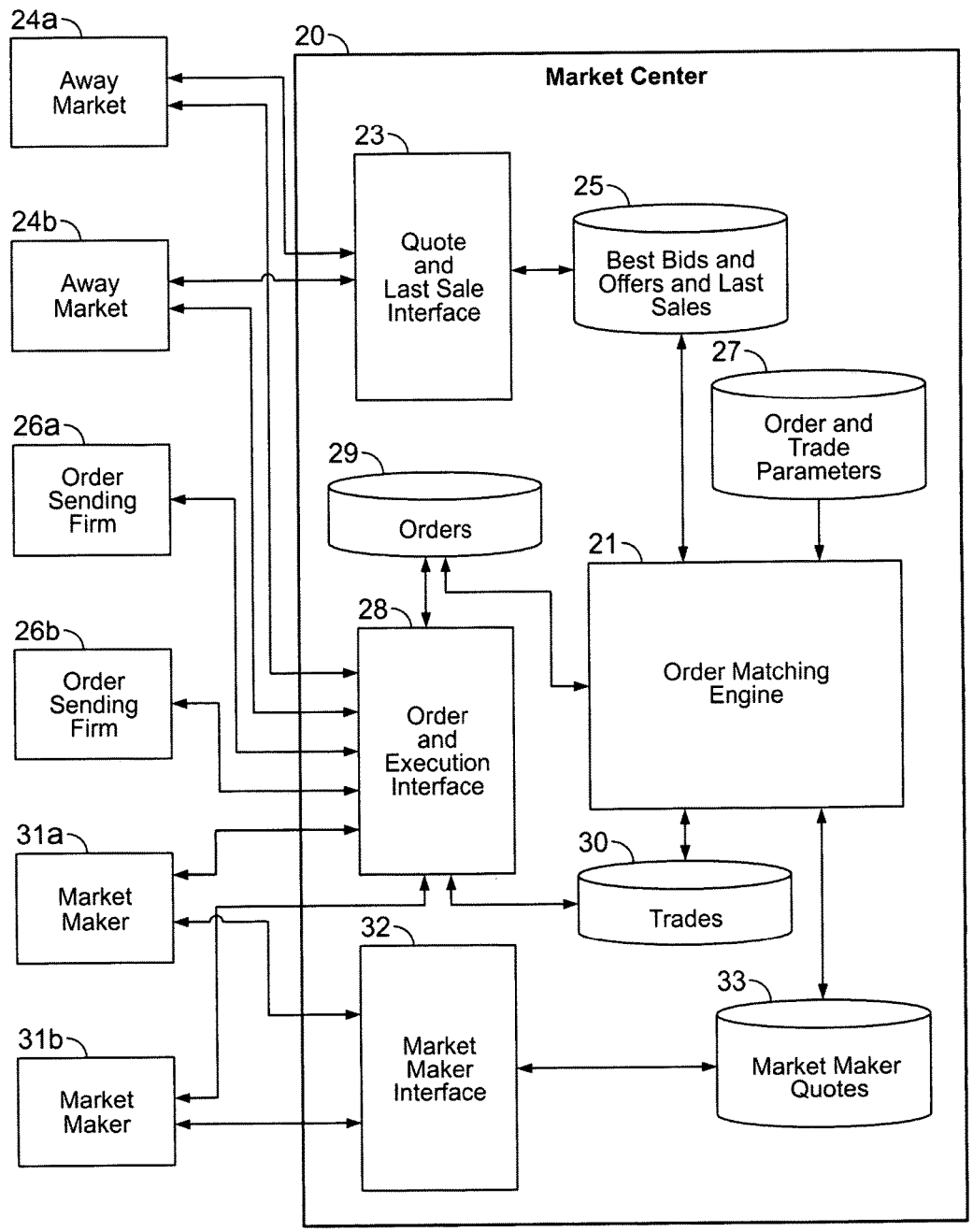
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity options market center environment, but it should be understood that the present invention could be used in any type of financial instrument market center environment (e.g., equities, futures, bonds, etc.). This embodiment of the invention describes the use of multiply-listed single-leg equity options, wherein contracts for a specified underlying security can be bought (if the option type is a call) or sold (if the option type is a put) at a specific strike price prior to a specific exercise date. The functionality described herein is generally applicable to all standard options products (including near-term options and LEAPs) in all underlying securities, including but not limited to exchange-listed stocks, Exchange-Traded Funds (ETFs), Holding Company Depositary Receipts (HOLDRs), American Depositary Receipts (ADRs), and commonly traded indices.

The trading environment of this embodiment includes a market center 20 which interacts with a number of other market centers 24 (i.e. away markets) and traders at order sending firms 26 and market makers 31. It should also be understood that the market center 20 referred to herein refers to a computing system having sufficient processing and memory capabilities and does not refer to a specific physical location. In fact, in certain embodiments, the computing system may be distributed over several physical locations. It should also be understood that any number of traders 26 or market makers 31 or away market centers 24 can interact with the market center 20. The market center 20 is the market center on which a specific trader 26 posts a specific order, and on which a specific market maker 31 posts a specific quote. The market center 20 includes an order matching engine 21, which validates, maintains, ranks, executes and/or routes all orders on the market center 20, and which executes marketable quotes on the market center 20. In this embodiment, the code for the order matching engine 21 is stored in the market center's memory.

The market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. The market center 20 may also include an order and trade parameters data structure 27. The order and trade parameters data structure 27 stores pre-defined trading parameters and rules that are used by the order matching engine 21 in matching orders and executing trades. The market center 20 may also include an order and execution interface 28 which interacts with the traders 26, the market makers 31, the away market centers 24 and the order matching engine 21 in the order execution process.

The market center 20 may also include an order information data structure 29 where order information is stored and a trade information data structure 30 where completed trade information is stored. The market center 20 may also include a market maker interface 32 that interacts with market makers 31 to capture market maker bids and offers in assigned issues. These bids and offers are depicted in a market maker quote structure 33 in this illustration.

Throughout the discussion herein, it should be understood that the details regarding the operating environment, data structures, and other technological elements surrounding the market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Figure 2:
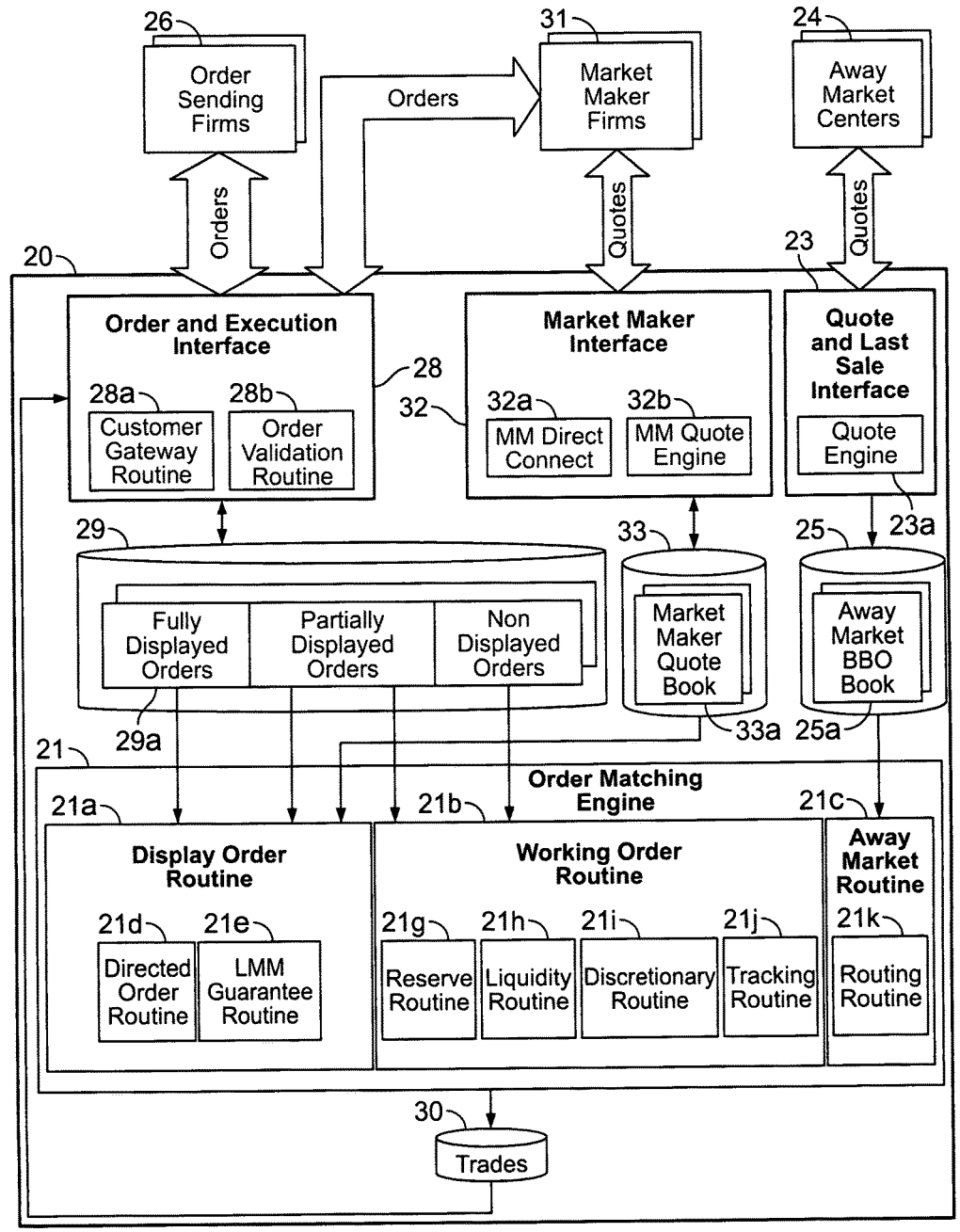
FIG. 2 is a block diagram illustrating an overview of the architecture involved in the equity options electronic order book of the present invention.

Referring now to FIG. 2, a trading environment in which orders and quotes are ranked and executed is depicted. Because the market center 20 disclosed in this embodiment is order-driven, which encourages orders and quotes to compete equally, the market center 20 is designed to allow users to send a very diverse and sophisticated body of order types. For example, with the disclosed market center 20, a user may, as described in detail below, use the sophisticated order types available to mask their trading intentions from the marketplace by using order types that do not display all or part of an order's size or price.

The market center 20 disclosed in this embodiment also ranks all resting orders in such a manner as to give preference to displayed trading interest over nondisplayed trading interest at the same price so that users are encouraged to send displayed limit orders at the best possible prices. The market center 20 disclosed in this embodiment can be used in a non-competing market maker environment, a competing market maker environment and in an environment that does not use market makers in some or all of the issues. In a preferred embodiment, described herein, the market center 20 has a non-competing market maker environment. The market center order books are largely flat and open based on price/time principles. As described below, lead market makers are guaranteed participation entitlements, but only when they are already on the NBBO in their assignments, which encourages tighter spreads and faster executions.

In the non-competing market maker embodiment, described herein, market maker quotes cannot be automatically or manually improved for the purpose of participating with a specific incoming order, nor can a market maker send a price-improving order for the purpose of intercepting a specific incoming order. In this embodiment, market makers do not see an incoming order at all. As a result, a user of this system that sends an order is able to trade anonymously without divulging his or her trading intentions. Another characteristic of this non-competing market maker embodiment, as described below, is that only the lead market maker (or alternatively, a specific, designated non-lead market maker who is temporarily granted lead market maker privileges in a directed order process) is entitled to guaranteed participation with an incoming order, and therefore complex market maker pro rata allocations, as used in prior systems, is not necessary in this embodiment.

Referring specifically to FIG. 2, in this embodiment, market makers 31 can send orders and quotes to the market center 20, and order sending firms 26 can send orders to the market center 20. Away market centers 24 also route orders to the market center 20 and receive routed orders from the market center 20. Such "linkage" processing, however, is known and is not described herein. The order and execution interface 28 includes a customer gateway routine 28a, which, when executed, initiates a process that determines whether and by what means a specific order sending firm 26 is eligible to send orders to the market center 20, and also includes an order validation routine 28b which, when executed, initiates a process that determines whether the specific order meets all the business requirements of the market center 20. If an order is determined to be valid, then the order and execution interface 28 releases the order to the order matching engine 21 for further processing. Marketable orders are executed immediately, whereas nonmarketable orders that can execute later are posted to an order book 29a on the order data structure 29. The order book 29a includes all active nonmarketable orders resident on the market center 20, including fully-displayed orders, partially-displayed order and nondisplayed orders.

As illustrated in FIG. 2, market makers 31 may send orders as well. If a market maker's order is determined to be valid, as with an order sending firm's order, then the order and execution interface 28 releases the order to the order matching engine 21 for further processing. As with order sending firm orders, marketable orders are executed immediately, whereas nonmarketable orders are posted to the same order book 29a as are orders from order sending firms 26.

The market maker interface 32 includes a market maker direct connect routine 32a, and also includes a market maker quote engine 32b, which, when executed, initiates a process that receives and analyzes market maker quotes. The quote and last sale interface 23 includes a quote engine 23a, which, when executed, initiates a process that receives and analyzes away market BBO quotes and receives and analyzes the consolidated NBBO quote.

In this embodiment, the order matching engine 21 includes a display order routine 21a, a working order routine 21b and an away market routine 21c. When executed, the display order routine 21a implements a process that maintains and ranks displayed orders. As indicated in FIG. 2, market maker quotes are integrated with the display order routine 21a. The working order routine 21b, when executed, implements a process that maintains and ranks working orders. Working orders are orders having a conditional or undisplayed price and/or size that is not disclosed to the marketplace, but is electronically accessible for matching. For example, a reserve order is a working order because it has a displayed size and a nondisplayed size. The working order process is significant to the "order-driven" market center of this invention because it allows highly sophisticated order types to be submitted to the market center 20. By way of example, such sophisticated order types allow market participants to be active in the market without disclosing trading intentions, which increases the liquidity of the market center 20.

The display order routine 21a receives and processes fully-displayed orders and partially-displayed orders. When presented with a marketable incoming order, the display order routine 21a ranks disseminated market maker quotes and resting displayed orders or portions thereof according to strict price/time priority. The display order routine 21a, in this embodiment, includes the following sub-routines: a directed order routine 21d and a lead market maker guarantee routine 21e. The directed order routine 21d is a routine that, when initiated, guarantees a specified percentage of an incoming directed order to a designated market maker after customer orders ranked ahead of the designated market maker's quote execute first. The lead market maker routine 21e is a routine that, when initiated, guarantees a specified percentage of an incoming non-directed order to a lead market maker after customer orders ranked ahead of the lead market maker's quote execute first.

The working order routine 21b receives and processes partially-displayed orders and nondisplayed orders. The working order routine 21b, in this embodiment, includes the following sub-routines: a reserve routine 21g, a liquidity routine 21h, a discretionary routine 21i and a tracking routine 21j. The reserve routine 21g is a routine that, when initiated, ranks and maintains reserve orders, which display a portion of the size to the marketplace but keep another undisplayed portion in reserve. The liquidity routine 21h is a routine that, when initiated, ranks and maintains passive liquidity orders, which are completely nondisclosed limit orders that grant price improvement to incoming orders. The discretionary routine 21*i* is a routine that, when initiated, ranks discretionary orders, which display a price to the marketplace but include a superior undisplayed price. The tracking routine 21*j* is a routine that, when initiated, ranks and maintains tracking liquidity orders, which are completely nondisclosed orders whose prices automatically track the NBBO and execute only if they can prevent an incoming order from routing.

As illustrated in FIG. 2, although market maker quotes are maintained in a separate market maker quote book 33*a*, they are retrieved and integrated with displayed orders and partially-displayed orders in the processes initiated when the display order routine 21*a* is activated ("Display Order Process"), which includes the directed order routine 21*d* and the lead market maker guarantee routine 21*e*, when the order matching engine 21 evaluates matching opportunities. As also illustrated in FIG. 2, although away market quotes are maintained in a separate away market BBO book 25*a*, they are retrieved and integrated with displayed orders, partially-displayed orders, nondisclosed orders and market maker quotes when the order matching engine 21 evaluates matching opportunities and routing opportunities.

FIG. 2 shows the relative rankings of various order execution routines initiated by the order matching engine 21. As described above, the order matching engine 21 has a display order routine 21*a*, a working order routine 21*b*, and an away market routine 21*c*. The sequence of the subroutines 21*d*, 21*e* and 21*g* through 21*k* generally correspond to the sequence in which the order matching engine 21, in this embodiment, attempts to process an incoming marketable order. The order matching engine 21 attempts to execute an incoming marketable order as fully as possible in a given routine before continuing to the next-highest ranking routine.

In this embodiment, upon receiving an incoming marketable order, the display order routine 21*a* is typically initiated first, which activates the Display Order Process. The Display Order Process initiates the directed order routine 21*d* if the incoming order is a directed order and initiates the lead market maker guarantee routine 21*e* if the incoming order is unable to execute in the directed order routine 21*d*. Any remaining quantity of the incoming order is released to the Display Order Process. After the Display Order Process has completed, if the incoming order still has quantity available to trade, then the working order routine 21*b* is initiated next. It attempts to execute the remainder of the incoming order in the reserve routine 21*g* first; in the liquidity routine 21*h* second; in the discretionary routine 21*i* third; and in the tracking routine 21*j* fourth. If the incoming order still has quantity remaining and is eligible to route off the market center 20, then the away market routine 21*c* is initiated next.

Referring to FIG. 3, the sequence in which resting orders and quotes are ranked for execution in a preferred embodiment is shown in greater detail. In the example depicted in FIG. 3, there are three orders or quotes that have been ranked by each of the order execution routine processes, at two price levels: the NBBO, and one tick inferior to the NBBO. When the order matching engine 21 evaluates matching and pricing opportunities for a given issue, it retrieves the order book 29*a*, the market maker quote book 33*a*, and the away market BBO book 25*a* and momentarily combines them into a single ranked list of bids and a single ranked list of offers in local memory. All the bids (buy orders and bid quotations) are ranked on one side of the list, and all the offers (sell orders and offer quotations) are ranked on the opposite side of the list. The ranked list of bids combined with the ranked list of offers is referred to as the "virtual consolidated order and quote list." FIG. 3 illustrates one side of an exemplary virtual consolidated order and quote list for a given issue.

The order matching engine 21 ranks each side of the virtual consolidated order and quote list according to price/time priority principles, but with a preference for displayed orders and quotes over working orders at the same price. This method of ranking is referred to as "price/display/time priority" in this document to indicate that an order's display characteristics (i.e., displayed versus not displayed) trumps the time that an order is received. Simply put, at a given price level, a nondisplayed order has a lower priority than a displayed order that was received later. As also shown in FIG. 3, resident orders and quotes always have priority over away market quotes at the same price, regardless of the time received.

Each order execution routine is responsible for ranking a subset of the resting orders and/or quotes in the virtual consolidated order and quote list. Resting orders and quotes are generally ranked in the sequence shown in the example of FIG. 3. Beginning with the first column of FIG. 3, all market maker quotes (e.g., lead market maker quotes and non-lead market maker quotes) and all displayed orders (e.g., exchange-restricted orders, inside limit orders, sweep limit orders, intermarket orders and pegged orders) are consolidated together and ranked in strict price/time priority in the Display Order Process, regardless of the order type or quote type. The displayed portions of partially-displayed orders (for example, the displayed portion of a reserve order, and the displayed portion of a discretionary order) are also combined with the other fully-displayed order types and market maker quotes and ranked in strict price/time priority in the Display Order Process.

The process initiated by the directed order routine 21*d* ("Directed Order Process") and the process initiated by the lead market maker guarantee routine 21*e* ("LMM Guarantee Process") match a marketable incoming order against a subset of the resting displayed orders and market maker quotes that are combined and ranked in the Display Order Process. In this embodiment, all displayed customer orders that are ranked ahead of a lead market maker's quote are eligible to execute in the LMM Guarantee Process. Similarly, all displayed customer orders that are ranked ahead of a designated market maker's quote are eligible to execute in the Directed Order Process. Accordingly, the displayed portion of a customer reserve order is eligible to execute in the Directed Order Process or in the LMM Guarantee Process, but its nondisclosed reserve portion is not eligible. Similarly, the displayed price of a customer discretionary order is eligible to execute in the Directed Order Process or the LMM Guarantee Process, but its nondisclosed discretionary price is not eligible. If a marketable incoming order still has quantity available to trade after it has completed executing in the Directed Order Process or in the LMM Guarantee Process (or alternatively, if it is unable to execute in either process), then the order matching engine 21 attempts to execute the order in the Display Order Process next, i.e., in strict price/time priority, with no preference granted to customers or market makers.

Continuing to the second column, the process initiated by the reserve routine 21*g* ("Reserve Process") executes the reserve portions of resting orders only after all eligible orders and market maker quotes at the same price have been executed in the Display Order Process. Reserve portions of orders are ranked in the Reserve Process according to the price/time priority assigned to their displayed portions in the Display Order Process.

Continuing to the third column, the process initiated by the liquidity routine 21*h* ("Liquidity Process") executes passive liquidity orders only after any eligible reserve portions at the same price have been executed in the Reserve Process. Passive liquidity orders are ranked in price/time priority in the Liquidity Process.

Continuing to the fourth column, the process initiated by the discretionary routine 21*i* ("Discretionary Process") executes discretionary orders only after any eligible passive liquidity orders at the same price have been executed in the Liquidity Process. Discretionary prices are ranked according to the price/time priority assigned to their displayed prices in the Display Order Process. It should be noted that an order executes using discretion in the Discretionary Process only if it cannot execute at its displayed price in the Display Order Process.

Continuing to the fifth column, the process initiated by the tracking routine 21*j* ("Tracking Process") executes tracking orders only after any eligible discretionary orders that can "step up" to the same price have been executed in the Discretionary Process, and the incoming order is about to route off the market center 20. Tracking liquidity orders are ranked in price/time priority in the Tracking Process.

Continuing to the last column, the process initiated by the routing routine 21*k* ("Routing Process") routes orders to eligible away markets if the order cannot execute at the best price on the market center 20. If the order type cannot be routed, then the order is generally canceled or repriced less aggressively.

After executing against all eligible orders and quotes at the NBBO in the sequence of their ranking (from 1 through 18 in this example), if an incoming order is allowed to execute at a price inferior to the NBBO, then it would continue to execute against all eligible orders (and quotes, if allowed) at the next-best price level, i.e., at one minimum price increment (tick) inferior to the NBBO, in the sequence of their ranking (from 19 through 30 in this example). As tracking orders can only execute at the NBBO by definition, they are not shown in FIG. 3 at one tick inferior to the NBBO. If an order type (e.g., an intermarket sweep order) is also allowed to contemporaneously route to away markets inferior to the NBBO, then the incoming order would continue to execute against the eligible away market quotes at one tick inferior to the NBBO, in the sequence of their ranking (from 31 through 33 in this example).

It should also be noted that certain working order types (e.g., discretionary orders and passive liquidity orders) can execute at prices between the spread (i.e., higher than the national best bid and lower than the national best offer) under certain conditions. Passive liquidity orders with prices superior to the NBBO and discretionary orders with discretionary prices that are superior to the NBBO are not shown in the rankings of exemplary FIG. 3, as the rules regarding the execution of these order types at prices between the spread are described in detail in the separate patent applications cited above, which are incorporated herein and elsewhere. A discretionary order is allowed to execute against an incoming order at a price between the spread only if the incoming order is not priced at or better than the NBBO. Accordingly, an incoming order never executes in the Discretionary Process prior to executing in the Directed Order Process or the LMM Guarantee Process. In contrast, in a preferred embodiment, a passive liquidity order whose price is superior to the NBBO is allowed to execute in the Liquidity Process with an incoming marketable order, granting price improvement to the incoming order, before the remaining quantity of the incoming order attempts to execute at the NBBO in the Directed Order Process, the LMM Guarantee Process, the Display Order Process, or the Reserve Process. This is because price priority always trumps order execution routine priority in this embodiment.

In this embodiment of the invention, the following working order types are described: reserve orders, discretionary orders, passive liquidity orders and tracking liquidity orders. It should be understood that this list of working orders is exemplary and that other embodiments of the invention may not utilize the working orders described above or may use differing combinations of them.

Incoming Buy Order Received

Figure 4A:
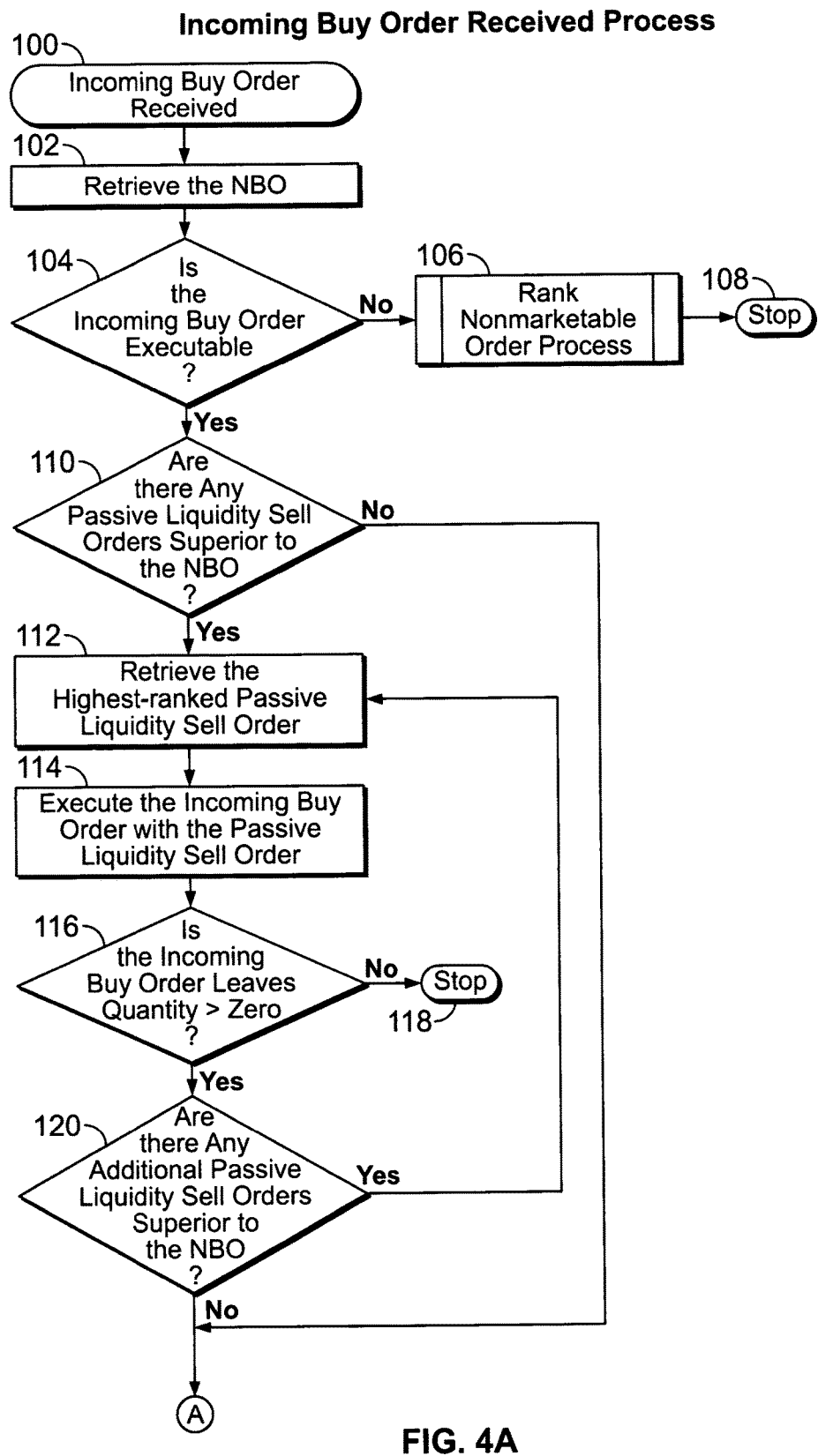
FIGS. 4A-4C are flow diagrams illustrating processes for receiving an incoming buy order in an embodiment of the present invention.
Figure 4B:
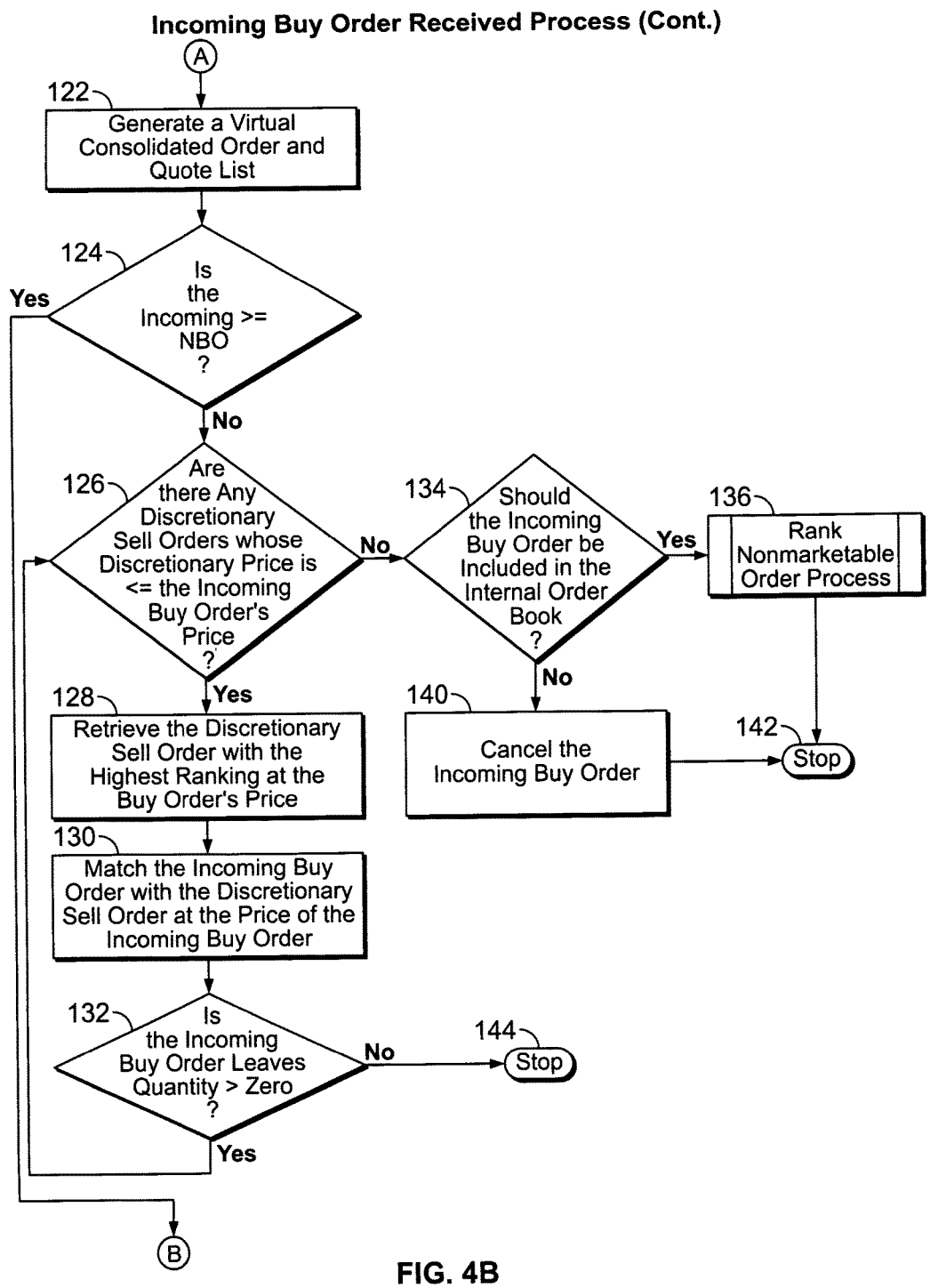
Figure 4C:
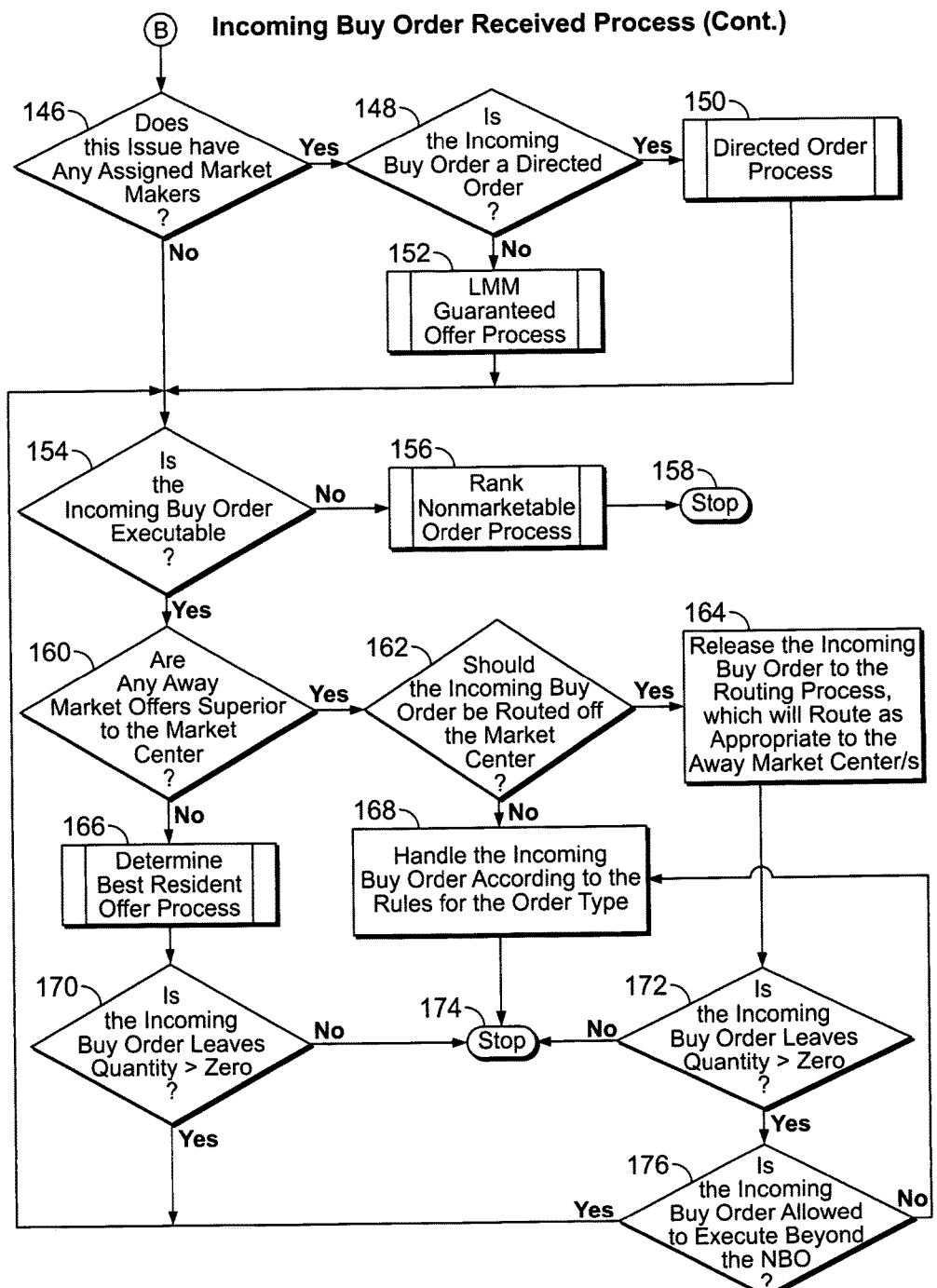

Referring to FIGS. 4A-4C, the market center 20 receives an incoming buy order, as indicated at step 100. The order is released to the order matching engine 21 and the processes of the order matching engine 21 are implemented to determine whether the incoming buy order is executable or not, and if it can participate in either the Directed Order Process or the LMM Guarantee Process before continuing to execute against other orders and quotes.

At step 102, the process retrieves the national best offer ("NBO"). Then at step 104, the process checks if the incoming buy order is executable. If it is determined that the incoming buy order is not executable, then the process continues to step 106, where it initiates the "Rank Nonmarketable Order Process" and proceeds to step 200 (FIG. 5), where the nonmarketable order is ranked in the internal order book 29*a* according to the rules for its order type.

Returning to step 104, if, however, the incoming buy order is executable, then the process attempts to execute it against the best-priced offers. As passive liquidity sell orders are allowed to be priced superior to the NBO, at step 110, the process checks whether any such superior orders exist. If one or more superior passive liquidity sell orders do exist, then the process retrieves the highest-ranked order in step 112, and executes it against the incoming buy order according to the market center matching rules at step 114. An embodiment of such matching rules is described and disclosed in co-pending and co-owned U.S. patent application Ser. No. 11/416,756, filed May 3, 2006, entitled "Passive Liquidity Order," which is incorporated by reference herein. In general terms, this means the incoming buy order executes at the price of the passive liquidity sell order unless the passive liquidity sell order's price is so aggressive it would trade through the NBB and must therefore be capped. The process then continues to step 116, where it checks if the incoming buy order still has quantity available to trade. If it does not, then the process terminates as indicated at step 118. If the buy order does still have quantity available to trade, then the process continues to step 120, where it checks if there are any additional passive liquidity sell orders whose prices are superior to the NBO. If there are superior orders, then the process returns to step 112, where it retrieves the next best passive liquidity sell order and repeats the process just described until all superior passive liquidity sell orders are executed, unless the incoming buy order is depleted first.

Returning to step 120, if there are no additional superior passive liquidity sell orders, then the process continues to step 122, where it combines the away market BBO book 25*a*, the market maker quote book 33*a*, and the order book 29*a* together in a virtual consolidated order and quote list, which it ranks in price/display/time priority but with a preference for resident interest over away market interest at the same price level. Returning to step 110, if no passive liquidity sell orders are included in the order book 29*a*, or if such orders exist but are not superior to the NBO, then the process also continues to step 122.

After generating a virtual consolidated order and quote list, the process then, at step 124, checks if the incoming buy order is greater than or equal to the NBO. If it is greater than or equal to the NBO, then the process proceeds to step 146, where it checks if the incoming buy order can participate in a market maker guaranteed entitlement. Returning to step 124, if, however, the incoming buy order is less than the NBO, i.e., is priced between the spread, then the incoming buy order can execute on the market center 20 only if the internal order book 29*a* includes one or more resting discretionary sell orders that can step up to the incoming buy order's price, i.e., that have a discretionary price that is less than or equal to the incoming buy order's price. The process checks for the presence of such overlapping discretionary sell orders in step 126 as indicated.

If there are such overlapping discretionary sell orders, then the process continues to step 128, where it retrieves the discretionary sell order with the highest ranking at the price of the incoming buy order. At step 130, the process matches the incoming buy order with the retrieved discretionary sell order, at the incoming buy order's price. In step 132, the process checks if the incoming buy order still has quantity remaining, and if it does not, the process terminates at step 144 as indicated. If, however, the incoming buy order does still have available quantity, then the process returns to step 126, where it checks if there are additional discretionary sell orders that can step up to match the incoming buy order. If there are, then the process retrieves the next-highest ranking discretionary sell order and repeats the process described above, until the incoming buy order is exhausted or until there are no additional discretionary sell orders that can step up to match the incoming buy order, as described next.

Figure 5:
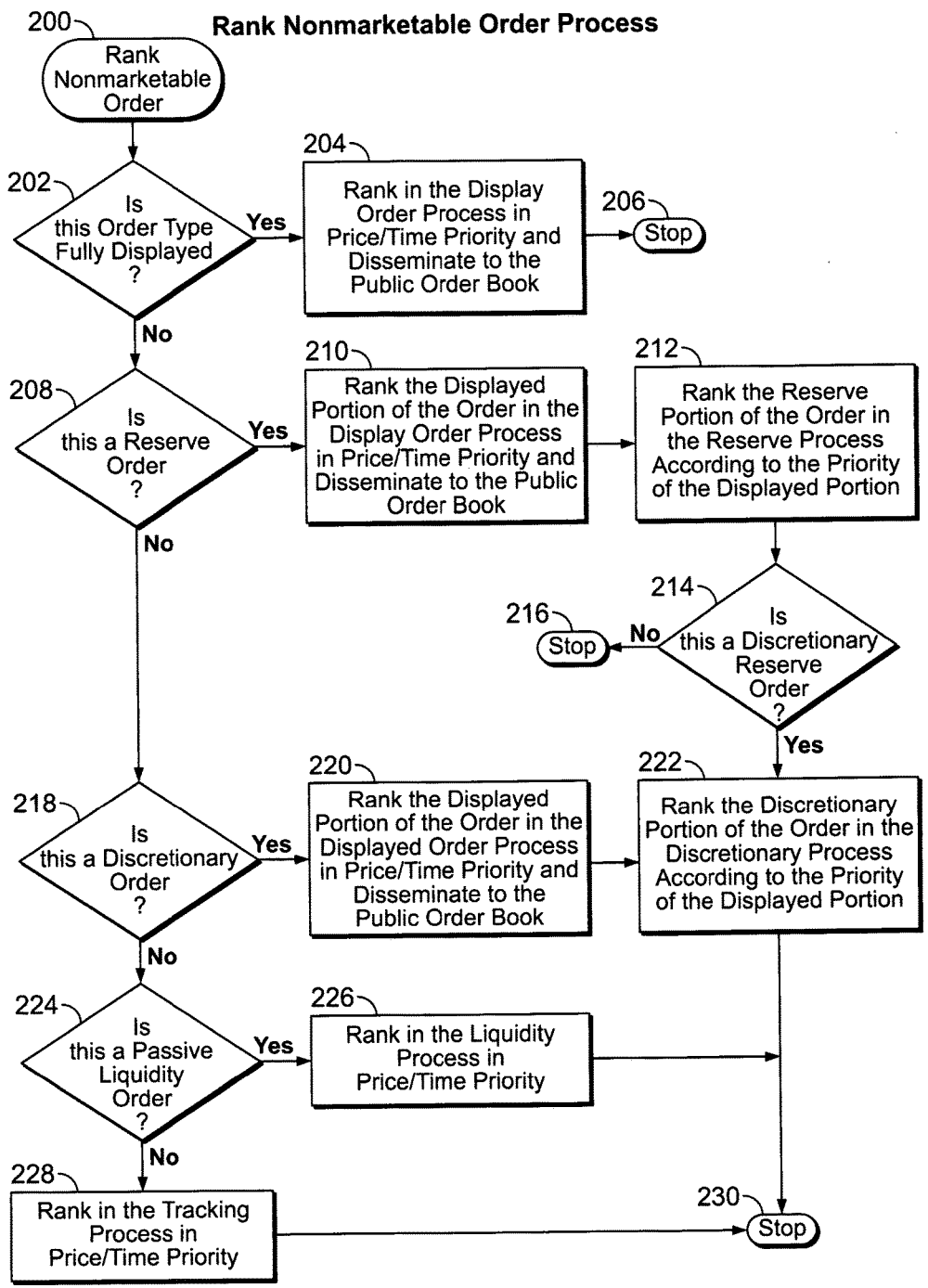
FIG. 5 is a flow diagram illustrating a process for ranking nonmarketable orders in an embodiment of the present invention.

Returning to step 126, if, however, there are no discretionary sell orders that can intercept the incoming buy order, then the incoming buy order will be stored or canceled. At step 134, the process checks if the incoming buy order can be stored in the internal order book 29*a*. If it can, then at step 136, the process initiates the "Rank Nonmarketable Order Process" and proceeds to step 200 (FIG. 5). The process terminates after the incoming buy order is ranked in the internal order book 29*a* according to the rules of the order type. If, however, at step 134, the process determines that the incoming buy order cannot be included in the book (e.g., if it is an IOC order), then it continues to step 140, where it cancels the incoming buy order instead. The process then terminates in step 142 as indicated.

Figure 6:
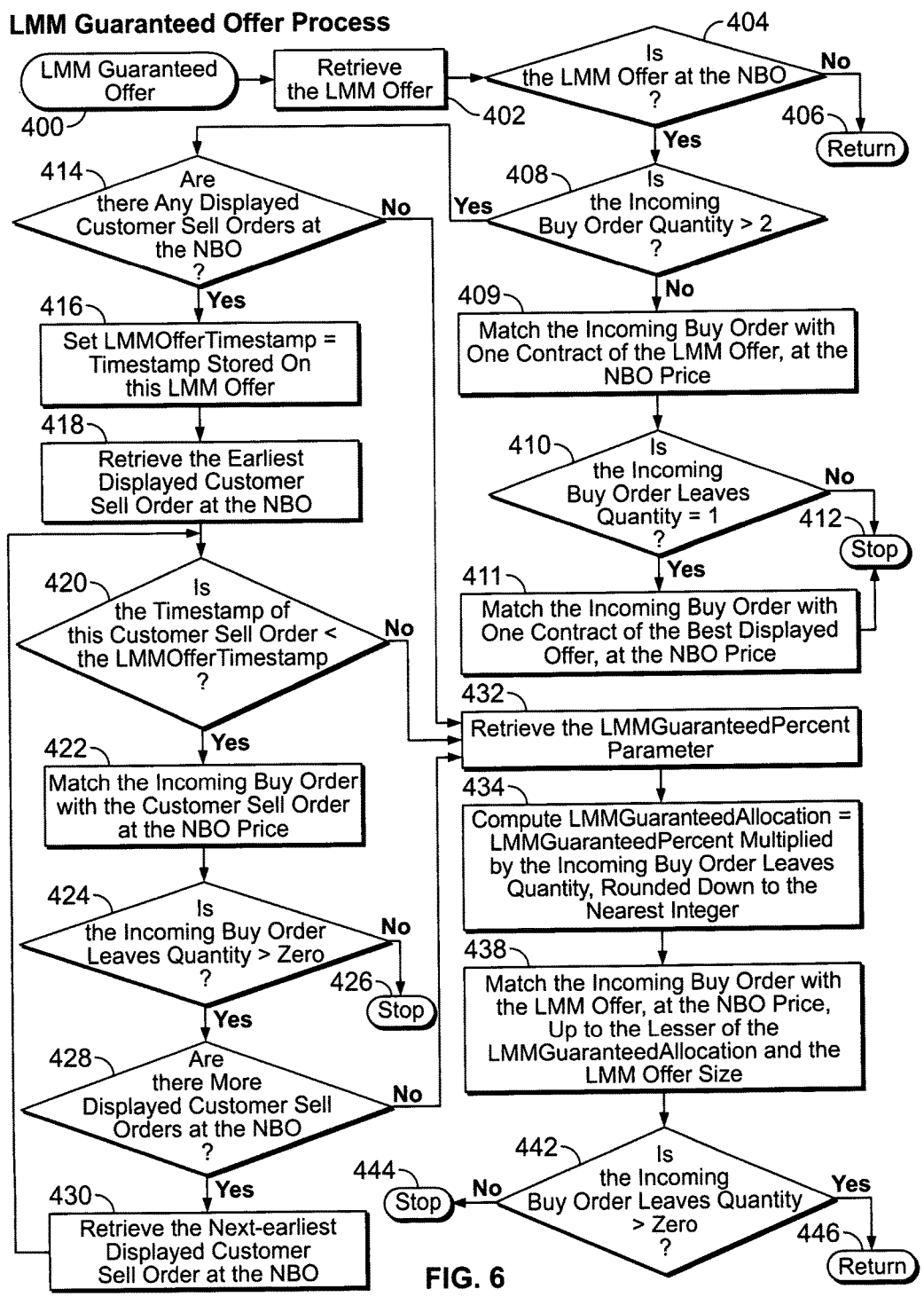
FIG. 6 is a flow diagram illustrating a process for handling lead market maker guaranteed offer entitlements in an embodiment of the present invention.
Figure 7A:
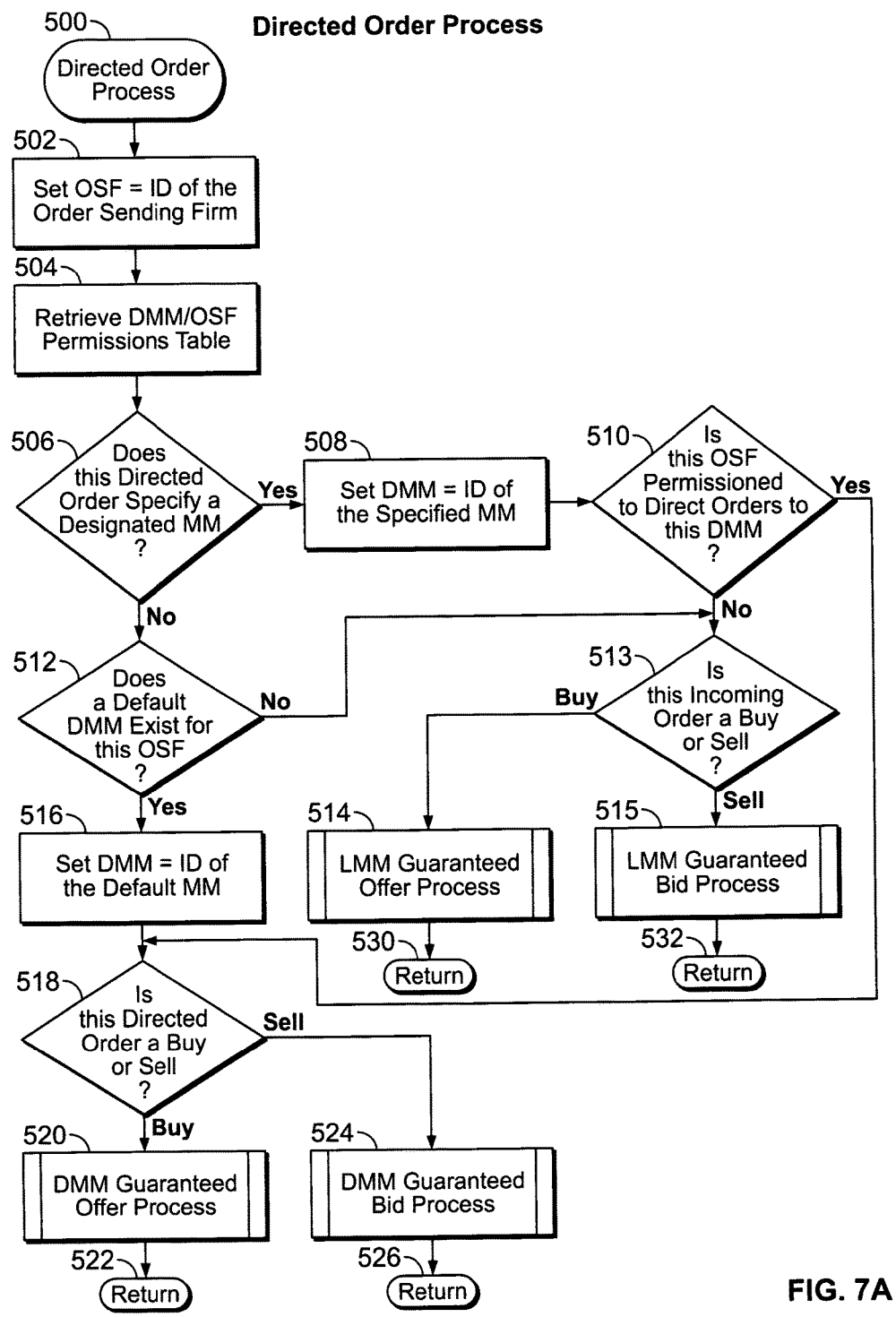
FIG. 7A is a flow diagram illustrating a process for handling directed orders in an embodiment of the present invention.

Returning to step 124, if the incoming buy order's price is greater than or equal to the NBO, then the process proceeds to step 146. At step 146, the process checks if this issue (option series) has any assigned market makers. If the issue does indeed have one or more assigned market makers, then the process continues to step 148, where it determines whether the incoming buy order is a directed order or not. If the incoming buy order is a directed order, then the process continues to step 150, where it activates the directed order routine 21*d* which initiates the Directed Order Process, and proceeds to step 500 (FIG. 7A). If, however, the incoming buy order is not a directed order, then the process continues instead to step 152, where it activates the lead market maker guarantee routine 21*e* which initiates the LMM Guaranteed Offer Process, and proceeds to step 400 (FIG. 6). If the incoming buy order still has quantity available to execute after the process attempts to execute it in the Directed Order Process or the LMM Guaranteed Offer Process, then the process continues to step 154.

Returning to step 146, if the issue does not have any assigned market makers, then the incoming buy order does not participate in either the Directed Order Process or the LMM Guaranteed Offer Process. Accordingly, the process continues to step 154 in this instance as well.

At step 154, the process checks if the incoming buy order is still executable against the virtual consolidated order and quote list. If the incoming buy order is no longer executable, then the process continues to step 156, where it initiates the "Rank Nonmarketable Order Process," and proceeds to step 200 (FIG. 5). The process terminates, as indicated at step 158, after the incoming buy order is ranked in the order book 29*a* according to the rules of the order type.

Returning to step 154, if, however, the incoming buy order is still executable, then the process continues to step 160, where it checks if any away market center offers are superior to the best offer on the market center 20. If no away markets 24 are superior, then the process continues to step 166, where it initiates the "Determine Best Resident Offer Process," and proceeds to step 800 (FIG. 9), which is explained in detail below. This routine determines which sell order or market maker quote qualifies as the best offer on the market center. After executing against the best resident offer, the process continues to step 170, where it checks if the incoming buy order still has quantity available to trade. If it does not, then the process terminates as indicated at step 174. If the incoming buy order still has contracts remaining though, then the process returns to step 154 to check if the incoming buy order is still executable against the virtual consolidated order and quote list. This process is repeated, executing against each sell order or market maker quote at the NBO, in the sequence of their ranking in the virtual consolidated order and quote list, until the incoming buy order is no longer executable or else until an away market offer is superior to the best resident offer, as described next.

Returning to step 160, if one or more away market center quotes are superior to the best offer on the market center 20, i.e., no sell orders or market maker quotes can execute at the NBO, then the process continues to step 162, where it checks whether the incoming buy order should be routed or not. If the process determines that it is not appropriate to route the incoming buy order, then at step 168 the process posts, queues, hides, cancels, or reprices the incoming buy order depending on the rules for the order type, and depending on whether the away market centers 24 quoting at the NBO have already been satisfied or not. The process then terminates in step 174 as indicated.

Returning to step 162, if, however, the process determines that it is appropriate to route the incoming buy order to an away market center or away market centers, then the process releases the incoming buy order to the routing process in step 164, which determines the best way to route the order. After routing to all eligible away market centers, the process continues to step 172, where it checks if the incoming buy order still has quantity available to trade. If it does not, then the process terminates in step 174 as indicated.

Returning to step 172, if the incoming buy order does still have quantity remaining, then the process continues to step 176, where it checks if the incoming buy order is allowed to execute at prices inferior to the NBO or not. For example, certain order types (e.g., inside market orders, inside limit orders) can only execute at the NBO, whereas other order types (e.g., sweep limit orders, intermarket sweep orders) can take advantage of the book-and-ship exception, the trade-and-ship exception, or intermarket sweeping (if allowed by marketplace rules) and execute beyond the NBO after first satisfying the obligation to all the away markets quoting at the NBO. If in step 176, the process determines that the incoming buy order is not allowed to execute beyond the NBO, then it continues to step 168, where it posts, queues, hides, cancels, or reprices the remaining quantity of the incoming buy order as previously described, and the process terminates at step 174.

Figure 9:
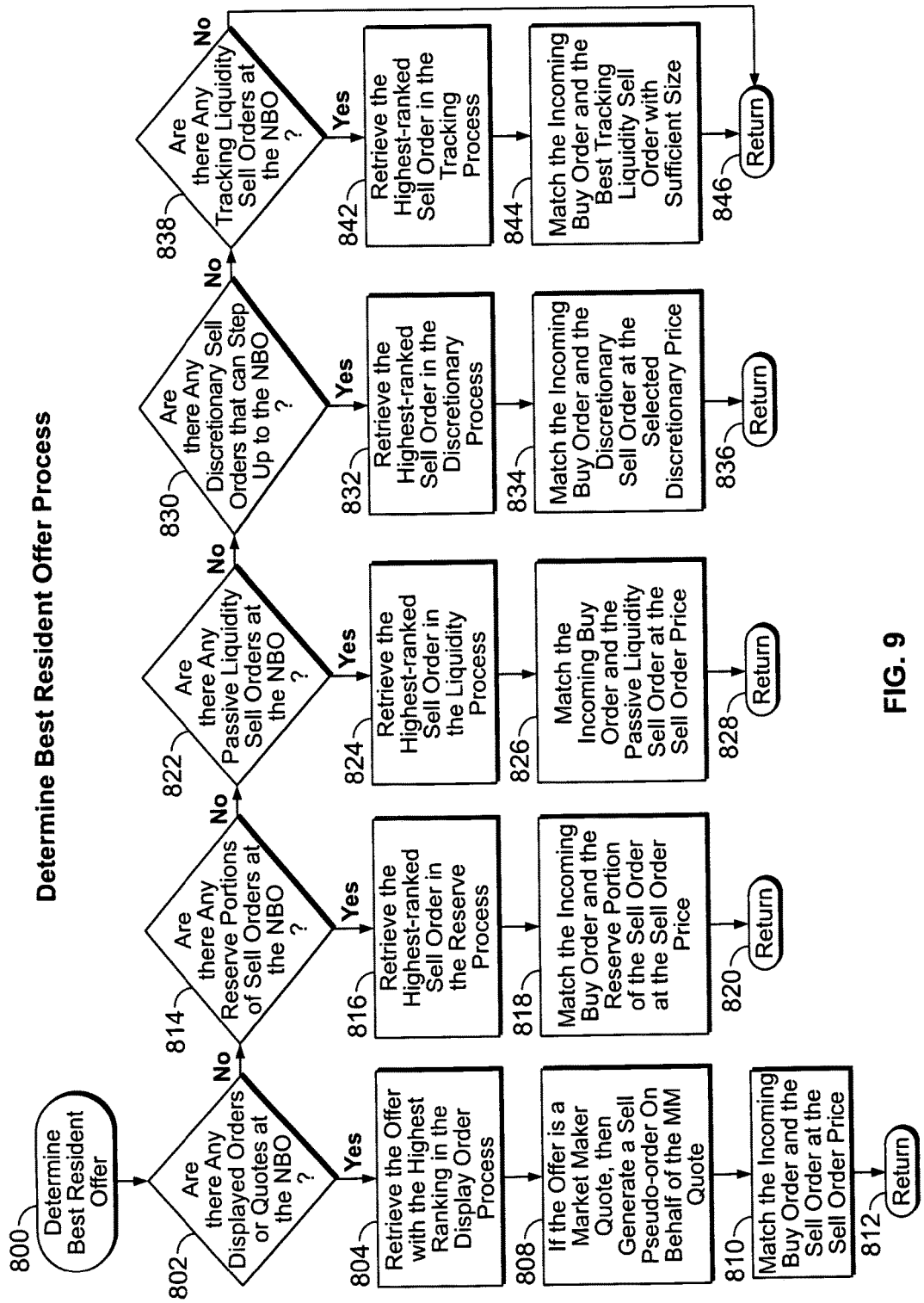
FIG. 9 is a flow diagram illustrating a process for determining the best resident offer in an embodiment of the present invention.

If, however, the process determines that the incoming buy order is indeed allowed to execute beyond the NBO, then the process returns to step 154 to determine if the incoming buy order is still executable against the virtual consolidated order and quote list. If it is still executable, then the process continues to step 160, where it checks if there are any unsatisfied away market offers superior to the market center 20. If the process determines that no away market offer is superior to the market center's best offer, then it continues to step 166, where it initiates the "Determine Best Resident Offer Process," and proceeds to step 800 (FIG. 9). As all the orders and quotes at the NBO have already been executed in the steps above, when the routine is initiated at this point in the process, it now evaluates sell orders (and market maker offers, if allowed by marketplace rules) that are priced at one tick inferior to the NBO. At this point in the process, the routing process has already fully satisfied the obligation to each away market's disseminated quote at the NBO, and the away market offers are no longer "superior" to the market center offers that are priced at one tick inferior to the NBO. The process can continue to execute against sell orders (and market maker offers, if allowed by marketplace rules) on the market center 20 at the next-best price level as indicated at step 166.

After executing against the best resident offer at one tick inferior to the NBO, the process continues to step 170, where it checks if the incoming buy order still has quantity available to trade. If it does not, then the process terminates as indicated at step 174. If the incoming buy order still has contracts remaining though, then the process returns to step 154 to check if the incoming buy order is still executable. This process is repeated until the incoming buy order is no longer executable (because all sell orders that can execute at one tick inferior to the NBO have been depleted) or else the incoming buy order is depleted by trading.

Rank Nonmarketable Orders

Referring now to FIG. 5, the "Rank Nonmarketable Order Process" is illustrated. It should be understood that buy orders and sell orders are ranked on opposite sides of the order book 29*a*. It should also be understood that the order type of an incoming order determines the order execution processes which will rank and maintain the incoming order.

After the process is initiated at step 200, the process proceeds to step 202 where it checks if the incoming order type is fully displayed to the marketplace. If it is fully displayed to the marketplace, then the process continues to step 204, where it ranks the incoming order in price/time priority in the Display Order Process, and disseminates the order to the public order book. The process terminates at step 206 as indicated.

Returning to step 202, if, however, the incoming order type is not fully displayed, then the process continues to step 208, where it checks if the incoming order is a reserve order. If it is a reserve order, then the process continues to step 210, where it ranks the displayed portion of the order in price/time priority in the Display Order Process, and disseminates the displayed portion of the order to the public order book. The process then continues to step 212, where it ranks the reserve portion of the order in the Reserve Process according to the price/time priority assigned to the displayed portion of the order. The process then continues to step 214, where it checks if the reserve order also has discretion, i.e., is a discretionary reserve order. If it does not include a discretionary price, then the process terminates at step 216 as indicated. If, however, at step 214, the incoming order is a discretionary reserve order, then the process continues to step 222, where it ranks the discretionary portion of the order in the Discretionary Process according to the price/time priority assigned to the displayed portion of the order. The process then terminates at step 230 as indicated.

Returning now to step 208, if the incoming order is not a reserve order, then the process continues to step 218, where it checks if the incoming order is a discretionary order. If it is a discretionary order, then the process continues to step 220, where it ranks the displayed portion of the order in price/time priority in the Display Order Process, and disseminates the displayed portion of the order to the public order book. The process then continues to step 222, where, as described above, it ranks the discretionary portion of the order in the Discretionary Process according to the price/time priority assigned to the displayed portion of the order. The process then terminates at step 230 as indicated.

Returning to step 218, if the incoming order is not a discretionary order, then the process checks if it is a passive liquidity order. If it is a passive liquidity order, then the process ranks the order in price/time priority in the Liquidity Process. The process then terminates at step 230 as indicated.

Returning to step 224, if the incoming order is not a passive liquidity order, then, in this embodiment, it is a tracking liquidity order because there are no other order types in this embodiment. The process at this point ranks the order in price/time priority in the Tracking Process. The process then terminates at step 230, as before. It should be understood that there may be other order types that are not specifically discussed herein, but that would work within the framework of this invention and would be evaluated in the same manner as the order types discussed above.

The LMM Guaranteed Offer Process

Referring now to FIG. 6, the "LMM Guaranteed Offer Process" is illustrated. At step 400, the process is initiated. At step 402, the process retrieves the lead market maker's offer. In step 404, the process checks if the lead market maker's offer is at the NBO price. If the lead market maker's offer is inferior to the NBO, then the lead market maker is not entitled to guaranteed participation with the incoming buy order, and the process continues to step 406, where it returns to the step where it was originally invoked, back to step 152 (FIG. 4C).

Returning to step 404, if, however, the lead market maker's offer is at the NBO, then the lead market maker is entitled to guaranteed participation with the incoming buy order. The process proceeds to step 408, where it checks if the incoming buy order's size is greater than two contracts. If it is less than or equal to two contracts, then the process continues to step 409, where it matches the incoming buy order with one contract of the lead market maker's offer, at the NBO price. It does this by generating an immediate or cancel ("IOC") sell pseudo-order on behalf of the underlying lead market maker's offer, and executing the incoming buy order against the sell pseudo-order. After executing the sell pseudo-order, the order matching engine 21 notifies the market maker quote engine 32*b* of the quantity of contracts that executed (one contract) so that it can decrement the lead market maker's offer.

Then at step 410, the process checks if the incoming buy order still has one contract available to trade. If it does not, then the process terminates in step 412 as indicated. If it does, then the process continues to step 411, where it matches the single remaining contract of the incoming buy order with one contract of the best displayed offer, at the NBO price. The best displayed offer is the sell order or market maker quote with the highest ranking in the Display Order Process. The process terminates in step 412 as indicated.

Returning to step 408, if, however, the incoming buy order has more than two contracts available to execute, then the process, in this embodiment, determines if there are any customer orders that are eligible to execute ahead of the lead market maker's offer. Accordingly, the process proceeds to step 414, where it checks if there are any displayed customer sell orders at the NBO.

If none exist, then the lead market maker is entitled to participate immediately with the incoming buy order. The process proceeds to step 432, where it retrieves a stored, configurable guaranteed allocation parameter determined by the market center's business rules ("LMMGuaranteedPercent"). At step 434, the process computes the maximum quantity of contracts that the lead market maker is guaranteed for execution ("LMMGuaranteedAllocation") by multiplying the remaining ("Leaves") quantity of the incoming buy order by the LMMGuaranteedPercent parameter, and rounding the result down to the nearest integer value if necessary. In step 438, the process matches the incoming buy order with the lead market maker's offer, at the NBO price, up to the lesser of the computed LMMGuaranteedAllocation size and the lead marker maker's offer size. It does this by generating an IOC sell pseudo-order on behalf of the underlying lead market maker's offer, and executing the incoming buy order against the sell pseudo-order. After executing the sell pseudo-order, the order matching engine 21 notifies the market maker quote engine 32b of the quantity of contracts that executed so that it can decrement the lead market maker's offer.

In step 442, the process checks if the incoming buy order still has any contracts available to trade. If the incoming buy order has been completely executed, then the process terminates in step 444 as indicated. However, if the incoming buy order still has contracts available to trade, then the process, as indicated at step 446, returns to the step where it was originally invoked, back to step 152 (FIG. 4C), so that the incoming buy order can continue to execute against other offers if possible. The LMM Guaranteed Offer Process is completed, and any remaining quantity of the incoming buy order is released to the Display Order Process.

Returning to step 414, if, however, there are displayed customer sell orders at the NBO, then the process continues to step 416, where it retrieves the timestamp assigned to the lead market maker's offer (the time assigned by the market maker quote engine 32b) and stores it in the parameter "LMMOfferTimestamp." In step 418, the process retrieves the earliest displayed customer sell order at the NBO. In step 420, the process compares the timestamp of the retrieved customer sell order with the LMMOfferTimestamp parameter, and if the customer sell order preceded the lead market maker's offer, then the process continues to step 422, where it matches the incoming buy order with the retrieved customer sell order, at the NBO price.

In step 424, the process checks if the incoming buy order still has contracts available to trade. If it does not, then the process terminates in step 426 as indicated. If it does, then the process continues to step 428, where it checks if there are any additional displayed customer sell orders priced at the NBO. If there are additional customer orders, then in step 430, the process retrieves the next earliest displayed customer sell order at the NBO and returns to step 420, where it checks if the newly-retrieved customer sell order was received prior to the lead market maker's offer. It repeats this process until all customer sell orders with price/time priority over the lead market maker's offer have been matched, unless the incoming buy order is exhausted first.

Returning to step 420, if, however, the timestamp of the retrieved customer sell order is not lower than the LMMOfferTimestamp, then the customer order was not received prior to the lead market maker's offer, and is therefore not eligible to execute in the LMM Guaranteed Offer Process. In this case, the process proceeds to step 432, and executes the lead market maker guaranteed allocation according to steps 432 through 444 or (446) as described above.

Returning to step 428, if, however, there are no additional displayed customer sell orders at the NBO, then the process also proceeds to step 432 at this point, and executes the lead market maker guaranteed allocation according to steps 432 through 444 or (446) as described above.

The Directed Order Process

Referring now to FIG. 7A, the "Directed Order Process" is illustrated. When the market center 20 receives a directed order, it must first determine if the order sending firm 26 is permissioned to direct orders to the designated market maker firm 31. At step 500, the process is initiated. At step 502, the process sets the parameter designated as "OSF" to the order sending firm identification included on the incoming directed order. Then, at step 504, the process retrieves a designated market maker/order sending firm ("DMM/OSF") permissions table, similar to the exemplary one depicted in FIG. 7B.

At step 506, the process checks if the incoming directed order includes the ID of a designated market maker, i.e., a specific market maker firm that is the intended recipient of this directed order. If a designated market maker is not specified, then the process continues to step 512, where it consults the DMM/OSF permissions table to see if a default designated market maker has been established for this order sending firm. If no default market maker has been established in the DMM/OSF permissions table, then the incoming order cannot execute in the Directed Order Process, but it may be able to execute in the LMM Guarantee Process instead. Accordingly, the process continues to step 513, where it checks if the incoming order is a buy or sell. If the incoming order is a buy order, then the process continues to step 514, where it initiates the "LMM Guaranteed Offer Process" and then continues to step 530, where it returns to the step where the routine was originally initiated, back to step 150 (FIG. 4C). If, however, the incoming order is a sell order, then the process continues to step 515, where it initiates the "LMM Guaranteed Bid Process" and then continues to step 532, where it returns to the step where the routine was originally initiated, back to step 1150 (FIG. 10C), described below.

Referring again to step 506, if the directed order includes the ID of a designated market maker, then the process, at step 508, assigns the designated market maker ID to the parameter "DMM." At step 510, the process consults the DMM/OSF permissions table to determine if a rule exists for this DMM/OSF pair. If a rule does not exist, then this order sending firm 26 is not permissioned to send directed orders to this designated market maker 31. In this case, the incoming order cannot execute in the Directed Order Process, but it may be able to execute in the LMM Guarantee Process instead. Accordingly, the process continues to step 513 where it checks if the incoming order is a buy order or a sell order and then proceeds as described in the steps above.

Referring again to step 510, however, if a rule does exist for the DMM/OSF pair, then this order sending firm 26 is permissioned to send directed orders to the designated market maker 31. That being the case, the process continues to step 518, where it checks if the incoming directed order is a buy order or a sell order.

Figure 8:
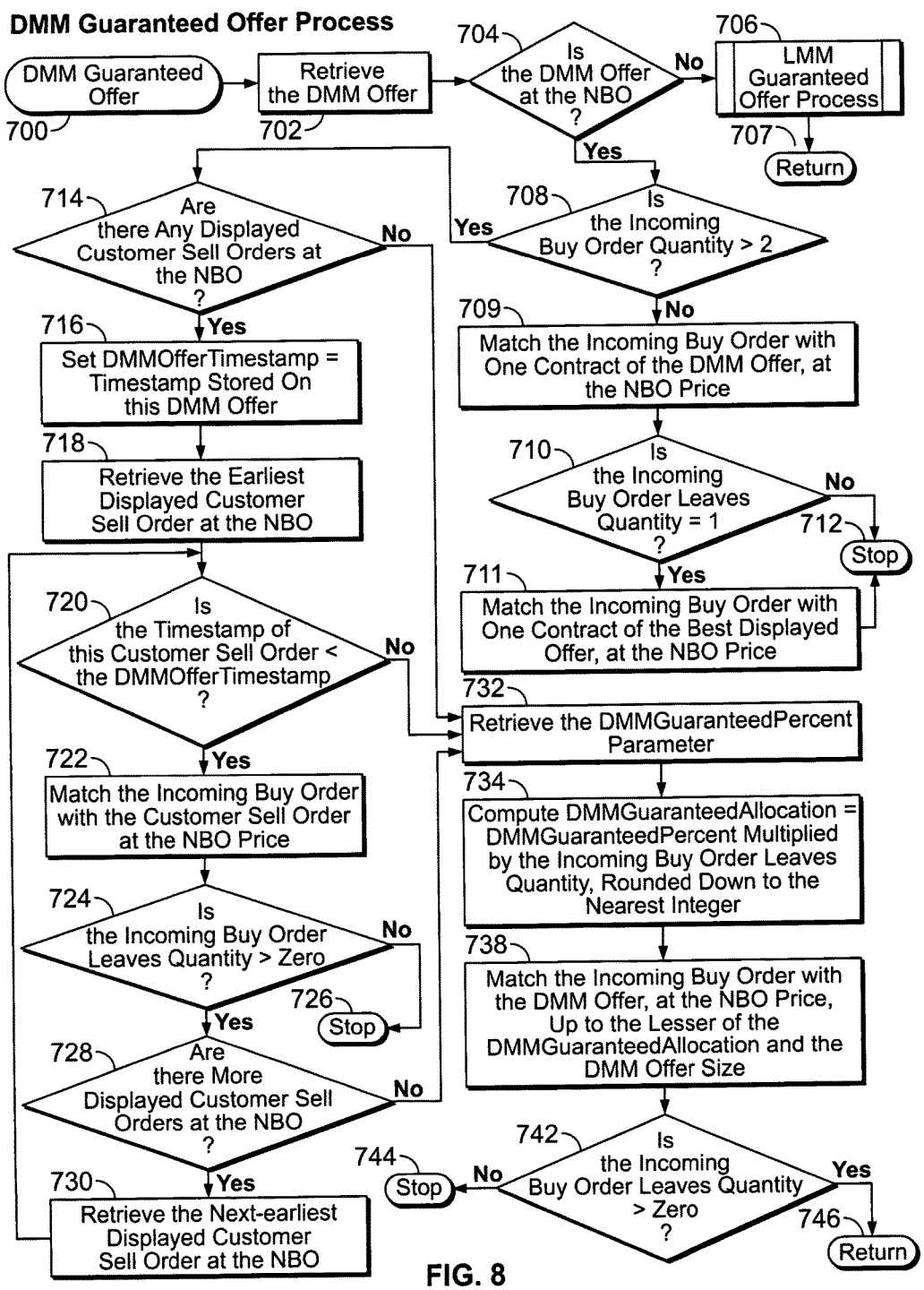
FIG. 8 is a flow diagram illustrating a process for handling designated market maker guaranteed offer entitlements in an embodiment of the present invention.
Figure 12:
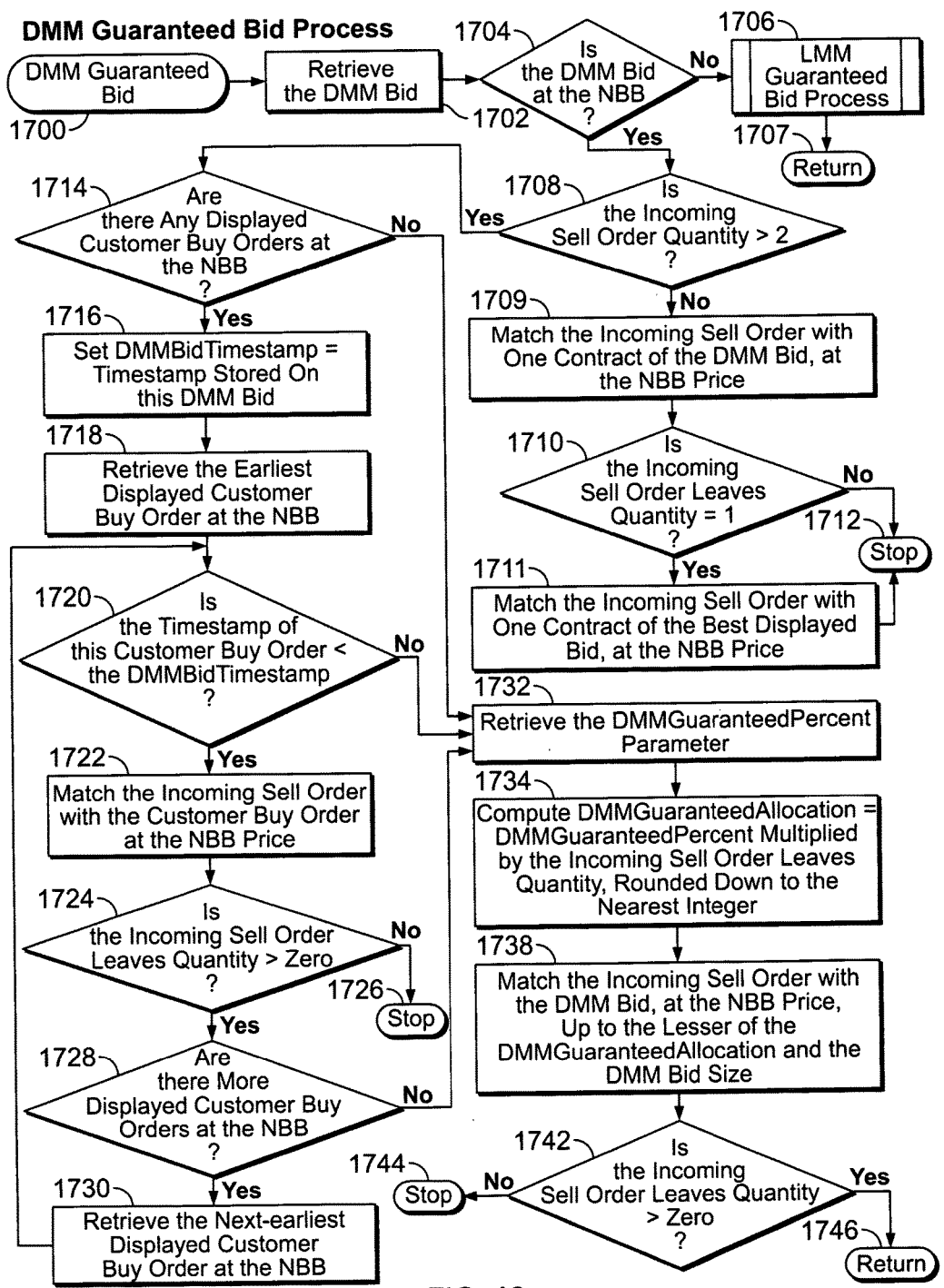
FIG. 12 is a flow diagram illustrating a process for handling designated market maker guaranteed bid entitlements in an embodiment of the present invention.

Referring again to step 512, if the process determines that a default designated market maker exists for the order sending firm sending the order, then the process, at step 516 sets the parameter designated as "DMM" to the default market maker ID and continues to step 518. At step 518, the process determines whether the incoming directed order is a buy order or a sell order. If the directed order is a buy order, then the process proceeds to step 520, where the "DMM Guaranteed Offer Process" is initiated, and the process proceeds to step 700 (FIG. 8). If, on the other hand, the directed order is a sell order, then the process proceeds to step 524, where the "DMM Guaranteed Bid Process" is initiated, and the process proceeds to step 1700 (FIG. 12).

The DMM Guaranteed Offer Process

Where the process has determined that an incoming buy order was sent by an order sending firm 26 that is permissioned to send directed orders to a market maker firm 31, the "DMM Guaranteed Offer Process" is activated as indicated at step 700 (FIG. 8). FIG. 8 illustrates a routine wherein the order matching engine 21 executes the incoming directed buy order in the Directed Order Process, but only if the designated market maker's offer is at the NBO. The DMM Guaranteed Offer Process is very similar to the previously described LMM Guaranteed Offer Process, as the designated market maker in this situation receives the same privileges as the lead market maker for the purpose of executing with the incoming directed order.

At step 702, the process retrieves the designated market maker's offer. In step 704, the process checks if the designated market maker's offer is at the NBO price. If the designated market maker's offer is inferior to the NBO, then the designated market maker is not entitled to guaranteed participation with the incoming directed buy order. However, the lead market maker may still be entitled to participate with the incoming order instead. Accordingly, the process continues to step 706, where the "LMM Guaranteed Offer Process" is activated, and the process proceeds to step 400 (FIG. 6).

Returning to step 704, if, however, the designated market maker's offer is at the NBO, then the designated market maker is entitled to guaranteed participation with the incoming order. The process proceeds to step 708, where, in this embodiment, it checks if the incoming directed buy order's size is greater than two contracts. If it is less than or equal to two contracts, then the process continues to step 709, where it matches the incoming buy order with one contract of the designated market maker's offer, at the NBO price. It does this by generating an IOC sell pseudo-order on behalf of the underlying designated market maker's offer, and executing the incoming buy order against the sell pseudo-order. After executing the sell pseudo-order, the order matching engine 21 notifies the market maker quote engine 32*b* of the quantity of contracts that executed (one contract) so that it can decrement the designated market maker's offer.

In step 710, the process checks if the incoming buy order still has one contract available to trade. If it does not, then the process terminates in step 712 as indicated. If it does, then the process continues to step 711, where it matches the single remaining contract of the incoming buy order with one contract of the best displayed offer, at the NBO price. The best displayed offer is the sell order or market maker quote with the highest ranking in the Display Order Process. The process terminates in step 712 as indicated.

Returning to step 708, if, however, the incoming directed buy order has more than two contracts available to execute, then the process must determine if there are any customer orders that are eligible to execute ahead of the designated market maker's offer. Accordingly, it proceeds to step 714, where it checks if there are any displayed customer sell orders at the NBO.

If none exist, then the designated market maker is entitled to participate immediately with the incoming directed buy order. The process proceeds to step 732, where it retrieves a stored, configurable guaranteed allocation parameter determined by the market center's business rules ("DMMGuaranteedPercent"). In step 734, the process computes the maximum quantity of contracts that the designated market maker is guaranteed for execution ("DMMGuaranteedAllocation") by multiplying the remaining ("Leaves") quantity of the incoming directed buy order by the DMMGuaranteedPercent parameter, and rounding the result down to the nearest integer value if necessary. In step 738, the process matches the incoming buy order with the designated market maker's offer, at the NBO price, up to the lesser of the computed DMMGuaranteedAllocation size and the designated market maker's offer size. It does this by generating an IOC sell pseudo-order on behalf of the underlying designated market maker's offer, and executing the incoming buy order against the sell pseudo-order. After executing the sell pseudo-order, the order matching engine 21 notifies the market maker quote engine 32*b* of the quantity of contracts that executed so that it can decrement the designated market maker's offer.

In step 742, the process checks if the incoming directed buy order still has any contracts available to trade. If the incoming directed buy order has been completely executed, then the process terminates in step 744 as indicated. However, if the incoming directed buy order still has contracts available to trade, then the process continues to step 746, where it returns to the step where it was originally initiated, back to step 520 (FIG. 7A), so that the incoming buy order (no longer directed) can continue to execute against other offers if possible. The Directed Order Process is completed at step 522, and any remaining quantity of the incoming buy order is released to the Display Order Process at step 154 (FIG. 4C).

Returning to step 714, if, however, there are displayed customer sell orders at the NBO, then the process continues to step 716, where it retrieves the timestamp assigned to the designated market maker's offer (the time assigned by the market maker quote engine 32*b*) and stores it in the parameter "DMMOfferTimestamp." In step 718, the process retrieves the earliest displayed customer sell order at the NBO. In step 720, the process compares the timestamp of the retrieved customer sell order with the DMMOfferTimestamp parameter, and if the customer sell order preceded the designated market maker's offer, then the process continues to step 722, where it matches the incoming directed buy order with the retrieved customer sell order, at the NBO price.

In step 724, the process checks if the incoming directed buy order still has contracts available to trade. If it does not, then the process terminates in step 726 as indicated. If it does, then the process continues to step 728, where it checks if there are any additional displayed customer sell orders priced at the NBO. If there are additional customer orders, then in step 730, the process retrieves the next earliest displayed customer sell order at the NBO and returns to step 720, where it checks if the newly-retrieved customer sell order was received prior to the designated market maker's offer. It repeats this process until all customer sell orders with price/time priority over the designated market maker's offer have been matched, unless the incoming directed buy order is exhausted first.

Returning to step 720, if, however, the timestamp of the retrieved customer sell order is not lower than the DMMOfferTimestamp, then the customer order was not received prior to the designated market maker's offer, and is therefore not eligible to execute in the Directed Order Process. In this case, the process proceeds to step 732, and executes the designated market maker guaranteed allocation according to steps 732 through 744 or (746) as described above.

Returning to step 728, if, however, there are no additional displayed customer sell orders at the NBO, then the process also proceeds to step 732, and executes the designated market maker guaranteed allocation according to steps 732 through 744 or (746) as described above.

Determine Best Resident Offer Process

Referring now to FIG. 9, a process is illustrated where the order matching engine 21 retrieves the best resident offer on the market center, i.e., the sell order or market maker quote with the highest priority for trading according to the order and quote ranking algorithm of this invention. Each time this routine is activated, the next-best sell order or market maker offer is retrieved and executed. The process starts by looking for the displayed sell order or market maker offer assigned the highest ranking by the Display Order Process. After exhausting all the displayed orders and quotes in the Display Order Process, the routine then moves to each subsequent working order process in turn, i.e., the Reserve Process, the Liquidity Process, the Discretionary Process, and the Tracking Process. Accordingly, FIG. 9 describes the processing logic of the ranking schema illustrated in FIG. 3. The current price level being processed is the NBO, unless the order type can execute at a price level that is inferior to the NBO after first satisfying all trading interest at the NBO, including away market offers.

At step 802, the process checks if there are any displayed sell orders or market maker quotes at the NBO. If there are, then it continues to step 804, where it retrieves the offer assigned the highest ranking by the Display Order Process. In step 808, if the offer is a market maker quote, then the process automatically generates an IOC sell pseudo-order on behalf of the underlying market maker quote. In step 810, the process matches the incoming buy order with the sell order or pseudo-order, at the sell order's price. The process continues to step 812, where it returns to the step where this routine was originally initiated, back to step 166 (FIG. 4C). Each time this routine is executed, the next-best displayed sell order or market maker quote is retrieved and executed, until there are no more displayed sell orders or market maker quotes at the NBO, as described next.

Returning to step 802, if, however, the process determines that there are no displayed sell orders or market maker quotes priced at the NBO, then it proceeds to step 814, where it checks if there are any portions of reserve sell orders priced at the NBO. If there are, then in step 816, the process retrieves the sell order reserve portion assigned the highest ranking by the Reserve Process. In step 818, it matches the incoming buy order with the reserve portion of the sell order, at the sell order's price. The process continues to step 820, where it returns to the step where this routine was originally initiated, back to step 166 (FIG. 4C). Each time this routine is executed, the next-best sell order reserve portion is retrieved and executed, until there are no more sell order reserve portions priced at the NBO, as described next.

Returning to step 814, if, however, the process determines that there are no portions of the reserve sell orders priced at the NBO, then it proceeds to step 822, where it checks if there are any passive liquidity sell orders priced at the NBO. If there are, then in step 824, the process retrieves the passive liquidity sell order assigned the highest ranking by the Liquidity Process. In step 826, the process matches the incoming buy order with the passive liquidity sell order, at the sell order's price. The process continues to step 828, where it returns to the step where this routine was originally initiated, back to step 166 (FIG. 4C). Each time this routine is executed, the next-best passive liquidity sell order is retrieved and executed, until there are no more passive liquidity sell orders priced at the NBO, as described next.

Returning to step 822, if, however, the process determines that there are no passive liquidity sell orders priced at the NBO, then it proceeds to step 830, where it checks if there are any discretionary sell orders that can step up to the NBO, i.e., whose discretionary price is less than or equal to the NBO. If there are, then in step 832, the process retrieves the discretionary sell order assigned the highest ranking at the NBO price, as determined by the Discretionary Process. In step 834, it matches the incoming buy order with the discretionary sell order at the selected price (the NBO in this example). By way of explanation, by definition, a discretionary order will only use as much discretion as is required to execute, and accordingly its 'selected' price is the price utilizing the minimum required discretion. The process continues to step 836, where it returns to the step where this routine was originally initiated, back to step 166 (FIG. 4C). Each time this routine is executed, the next-best discretionary sell order is retrieved and executed, until there are no more discretionary sell orders that can step up to the NBO price, as described next.

Returning to step 830, if, however, the process determines that there are no discretionary sell orders that can step up to the NBO, then it proceeds to step 838, where it checks if there are any tracking liquidity sell orders priced at the NBO. If there are, then in step 842, the process retrieves the tracking liquidity sell order assigned the highest ranking by the Tracking Process. In step 844, it attempts to match the incoming buy order with the retrieved tracking liquidity sell order at the NBO price, in one embodiment, according to the rules described and disclosed in co-pending and co-owned U.S. patent application Ser. No. 11/416,943, filed May 3, 2006, entitled "Tracking Liquidity Order," which is incorporated by reference herein.

By way of explanation, by definition, a tracking liquidity sell order can only execute if it has sufficient size to fully intercept the incoming buy order to prevent any part of the order from routing. If it does not have sufficient size, then the next-best tracking liquidity sell order at the NBO is evaluated instead, and so on, until a tracking liquidity sell order with sufficient size is retrieved, or else if none have sufficient size, then the incoming buy order must route instead. The process continues to step 846, where it returns to the step where this routine was originally initiated, back to step 166 (FIG. 4C). Returning to step 838, if there are no tracking liquidity sell orders at the NBO, then the process also proceeds to step 846 at this point.

It should be noted that although FIG. 9 only explicitly evaluates orders at the NBO for ease of illustration, if an incoming buy order is allowed to execute at a price that is inferior to the NBO (e.g., using the trade-and-ship exception, the book-and-ship exception, or intermarket sweeping if permitted by marketplace rules), then the same logic described above is followed, except that after the incoming buy order satisfies all away markets offering at the NBO, when the process returns to FIG. 9 again, it evaluates the resident sell orders (and market maker quotes, if allowed by marketplace rules) that are priced at one tick inferior to the NBO, beginning with displayed orders and then continuing to reserve, passive liquidity, and discretionary orders. Tracking liquidity sell orders are bypassed as they can only execute at the NBO.

If intermarket sweeping is allowed and the incoming buy order can route to multiple away markets at multiple price levels contemporaneously, then after satisfying all away markets offering at one tick inferior to the NBO, when the process returns to FIG. 9 again, it evaluates the resident sell orders (and market maker quotes, if allowed by marketplace rules) that are priced at two ticks inferior to the NBO, beginning with displayed orders and then continuing to reserve, passive liquidity, and discretionary orders. It repeats this process for as many price levels as are allowed by marketplace rules and by the incoming buy order's limit price.

Incoming Sell Order Received

Figure 10A:
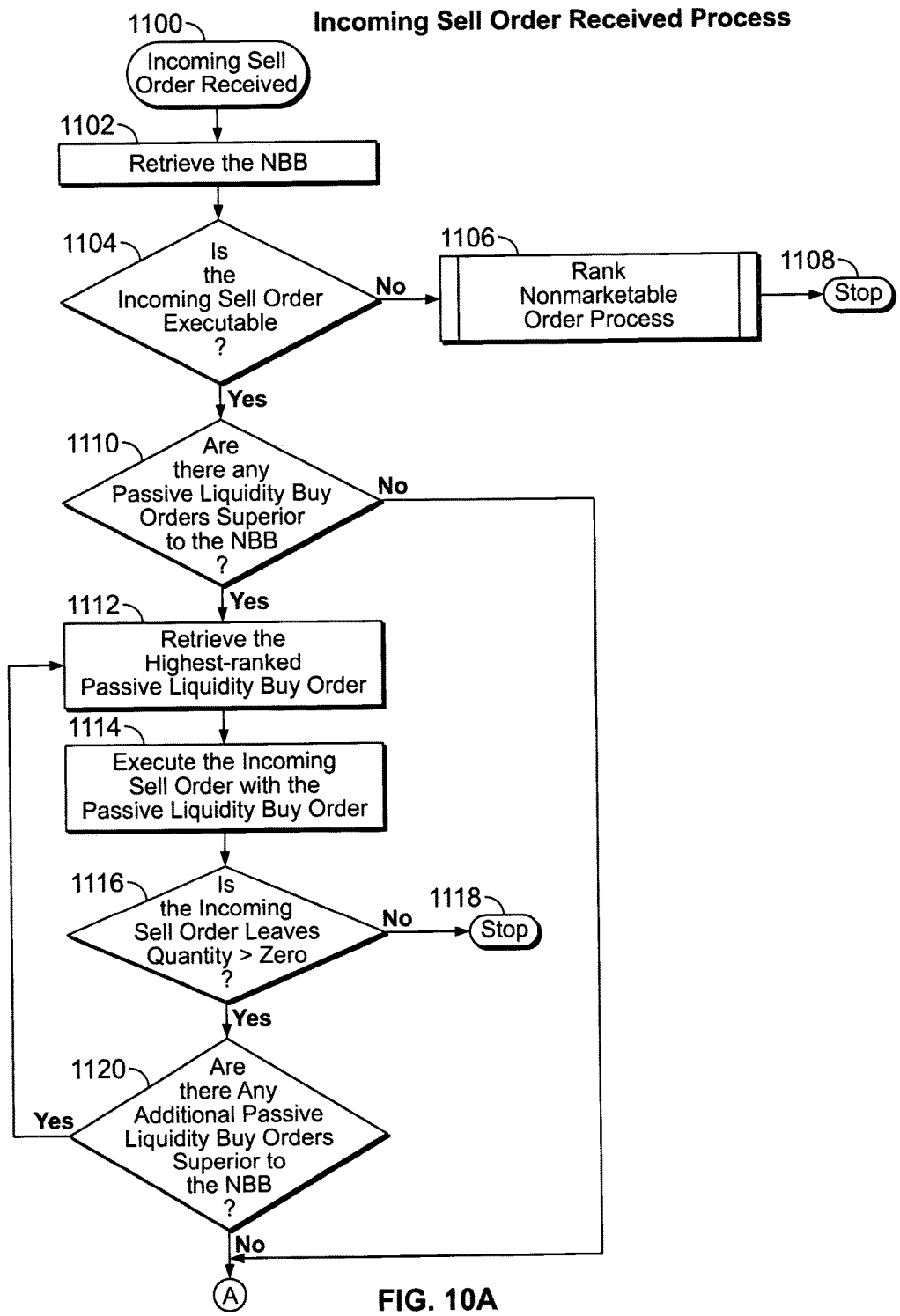
FIGS. 10A-10C are flow diagrams illustrating processes for receiving an incoming sell order in an embodiment of the present invention.
Figure 10B:
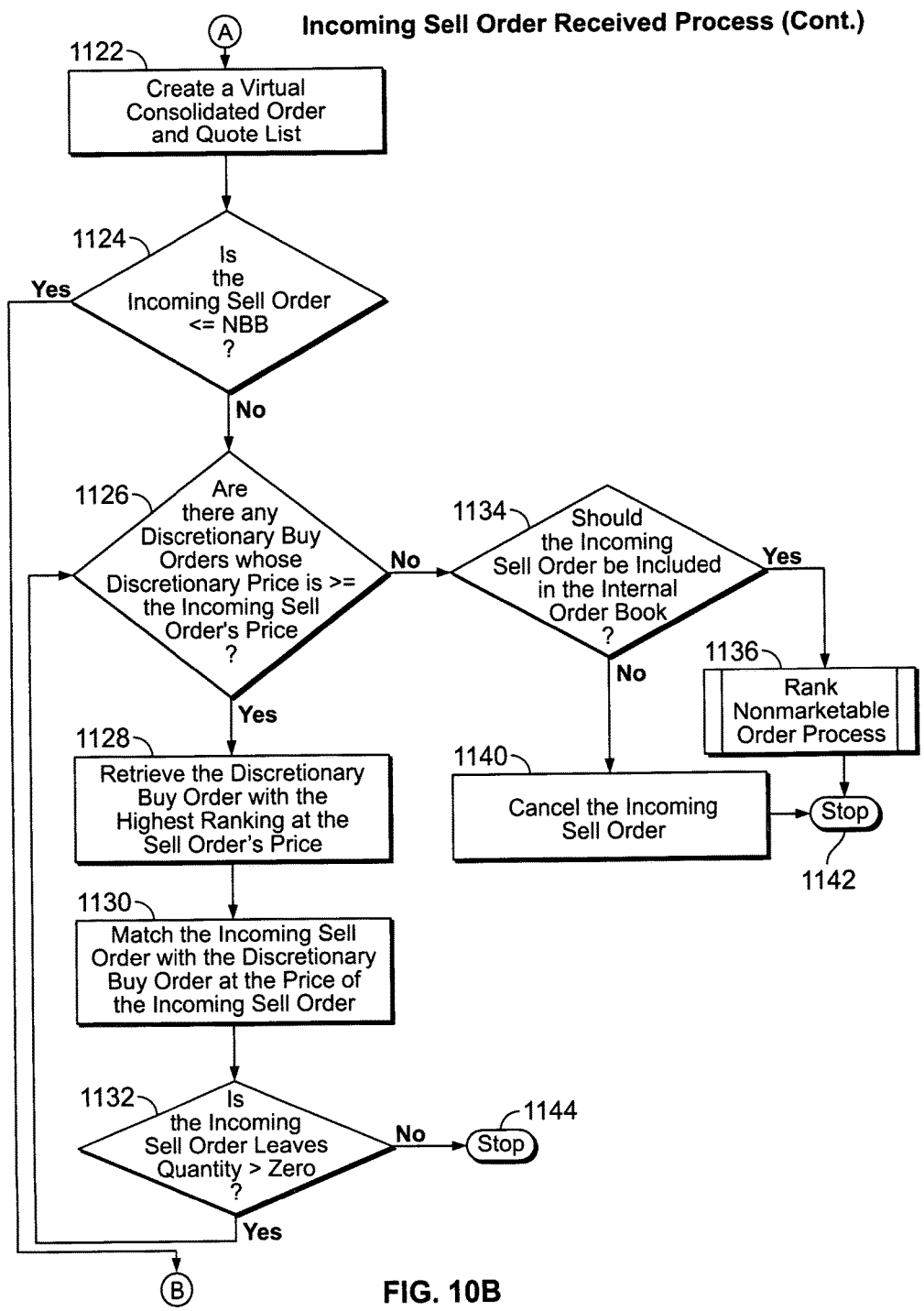
Figure 10C:
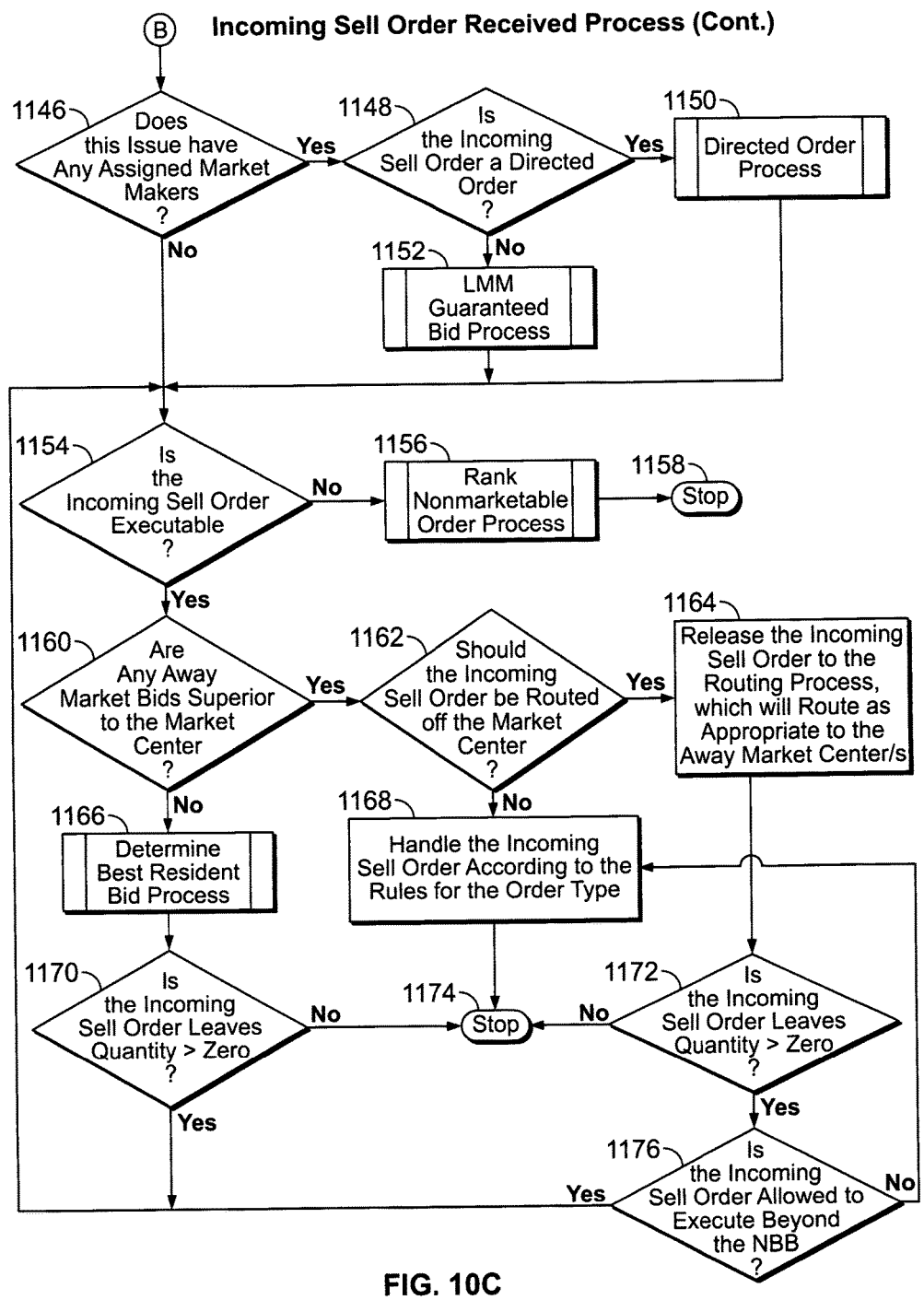

Referring to FIGS. 10A-10C, the process for receiving an incoming sell order is illustrated. The process is very similar to the routine described above for receiving an incoming buy order. As indicated at step 1100, the market center 20 receives an incoming sell order. The incoming sell order is released to the order matching engine 21 and the processes of the order matching engine 21 are implemented to determine whether the incoming sell order is executable or not, and if it can participate in either the Directed Order Process or the LMM Guarantee Process before continuing to execute against other orders and quotes.

At step 1102, the process retrieves the national best bid ("NBB"). Then at step 1104, the process checks if the incoming sell order is executable. If it is determined that the incoming sell order is not executable, then the process continues to step 1106, where it initiates the "Rank Nonmarketable Order Process" and proceeds to step 200 (FIG. 5), where the nonmarketable order is ranked in the internal order book 29a according to the rules for its order type.

Returning to step 1104, if, however, the incoming sell order is executable, then the process attempts to execute it against the best-priced bids. As passive liquidity buy orders are allowed to be priced superior to the NBB, at step 1110, the process checks whether any such superior orders exist. If one or more superior passive liquidity buy orders do exist, then the process retrieves the highest-ranked order in step 1112, and executes it against the incoming sell order according to the market center matching rules at step 1114. The process then continues to step 1116, where it checks if the incoming sell order still has quantity available to trade. If it does not, then the process terminates as indicated at step 1118. If the sell order does still have quantity available to trade, then the process continues to step 1120, where it checks if there are any additional passive liquidity buy orders whose prices are superior to the NBB. If there are superior orders, then the process returns to step 1112, where it retrieves the next best passive liquidity buy order and repeats the process just described until all superior passive liquidity buy orders are executed, unless the incoming sell order is depleted first.

Returning to step 1120, if there are no additional superior passive liquidity buy orders, then the process continues to step 1122, where it combines the away market BBO book 25a, the market maker quote book 33a, and the order book 29a together in a virtual consolidated order and quote list, which it ranks in price/display/time priority but with a preference for resident interest over away market interest at the same price level. Returning to step 1110, if no passive liquidity buy orders are included in the order book 29a, or if such orders exist but are not superior to the NBB, then the process also continues to step 1122.

After generating a virtual consolidated order and quote list, the process then, at step 1124, checks if the incoming sell order is less than or equal to the NBB. If it is less than or equal to the NBB, then the process proceeds to step 1146, where it checks if the incoming sell order can participate in a market maker guaranteed entitlement. Returning to step 1124, if, however, the incoming sell order is greater than the NBB, i.e., is priced between the spread, then the incoming sell order can execute on the market center 20 only if the internal order book 29a includes one or more resting discretionary buy orders that can step up to the incoming sell order's price, i.e., that have a discretionary price that is greater than or equal to the incoming sell order's price. The process checks for the presence of such overlapping discretionary buy orders in step 1126 as indicated.

If there are such overlapping discretionary buy orders, then the process continues to step 1128, where it retrieves the discretionary buy order with the highest ranking at the price of the incoming sell order. At step 1130, the process matches the incoming sell order with the retrieved discretionary buy order, at the incoming sell order's price. In step 1132, the process checks if the incoming sell order still has quantity remaining, and if it does not, the process terminates at step 1144 as indicated. If, however, the incoming sell order does still have available quantity, then the process returns to step 1126, where it checks if there are additional discretionary buy orders that can step up to match the incoming sell order. If there are, then the process retrieves the next-highest ranking discretionary buy order and repeats the process described above, until the incoming sell order is exhausted or until there are no additional discretionary buy orders that can step up to match the incoming sell order.

Returning to step 1126, if, however, there are no discretionary buy orders that can intercept the incoming sell order, then the incoming sell order will be stored or canceled. At step 1134, the process checks if the incoming sell order can be stored in the internal order book 29a. If it can, then at step 1136, the process initiates the "Rank Nonmarketable Order Process" and proceeds to step 200 (FIG. 5). The process terminates after the incoming sell order is ranked in the internal order book 29a according to the rules of the order type. If, however, at step 1134, the process determines that the incoming sell order cannot be included in the book (e.g., if it is an IOC order), then it continues to step 1140, where it cancels the incoming sell order instead. The process then terminates in step 1142 as indicated.

Figure 11:
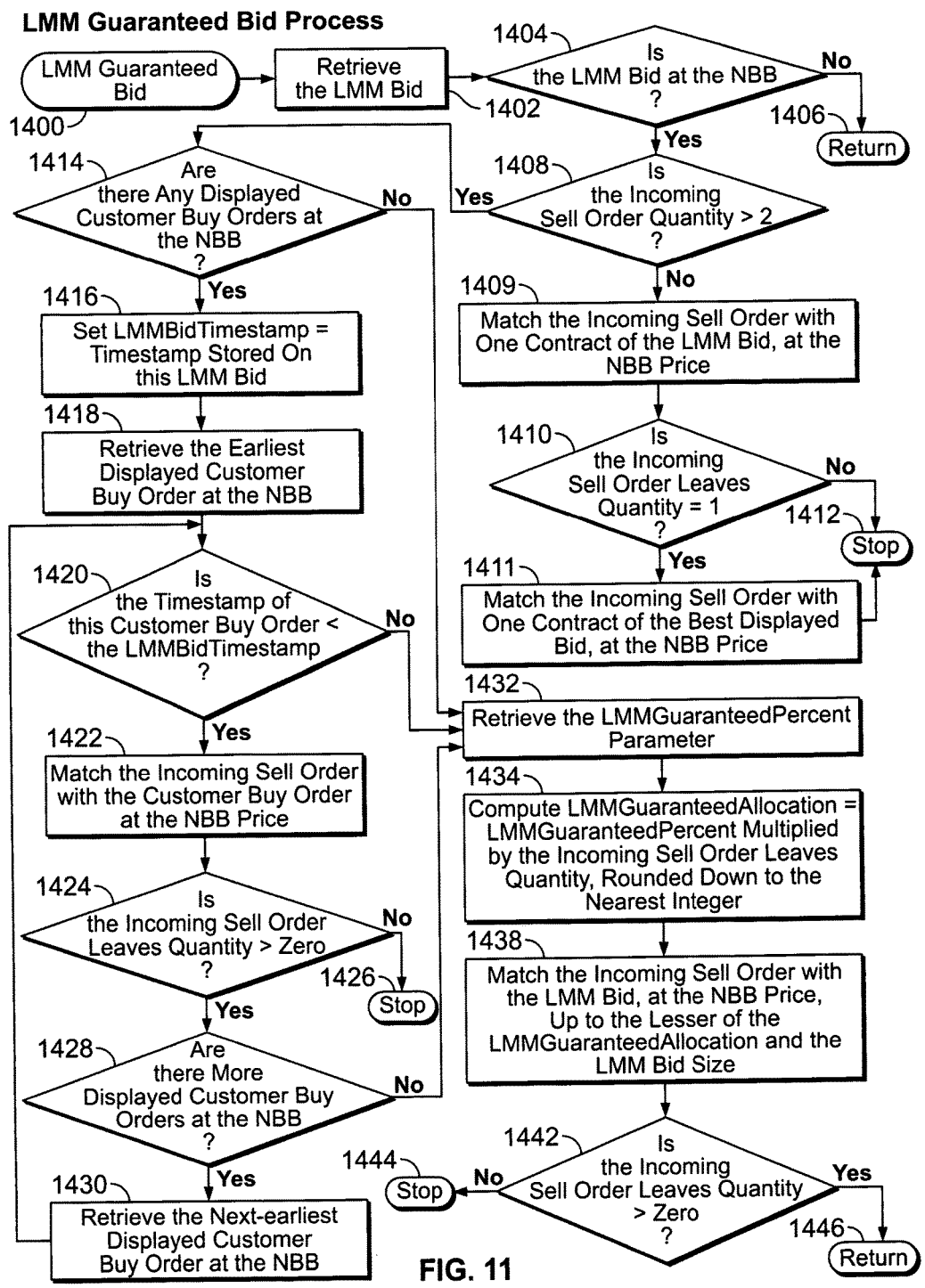
FIG. 11 is a flow diagram illustrating a process for handling lead market maker guaranteed bid entitlements in an embodiment of the present invention.

Returning to step 1124, if the incoming sell order's price is less than or equal to the NBB, then the process proceeds to step 1146. At step 1146, the process checks if this issue (option series) has any assigned market makers. If the issue does indeed have one or more assigned market makers, then the process continues to step 1148, where it determines whether the incoming sell order is a directed order or not. If the incoming sell order is a directed order, then the process continues to step 1150, where it activates the directed order routine 21d which initiates the Directed Order Process, and proceeds to step 500 (FIG. 7A). If, however, the incoming sell order is not a directed order, then the process continues instead to step 1152, where it activates the lead market maker guarantee routine 21e which initiates the LMM Guaranteed Bid Process, and proceeds to step 1400 (FIG. 11). If the incoming sell order still has quantity available to execute after the process attempts to execute it in the Directed Order Process or the LMM Guaranteed Bid Process, then the process continues to step 1154.

Returning to step 1146, if the issue does not have any assigned market makers, then the incoming sell order does not participate in either the Directed Order Process or the LMM Guaranteed Bid Process. Accordingly, the process continues to step 1154 in this instance as well.

At step 1154, the process checks if the incoming sell order is still executable against the virtual consolidated order and quote list. If the incoming sell order is no longer executable, then the process continues to step 1156, where it initiates the "Rank Nonmarketable Order Process," and proceeds to step 200 (FIG. 5). The process terminates, as indicated at 1158, after the incoming sell order is ranked in the order book 29*a* according to the rules of the order type.

Returning to step 1154, if, however, the incoming sell order is still executable, then the process continues to step 1160, where it checks if any away market center bids are superior to bids on the market center 20. If no away markets 24 are superior, then the process continues to step 1166, where it initiates the "Determine Best Resident Bid Process," and proceeds to step 1800 (FIG. 13), which is explained in detail below. This routine determines which buy order or market maker quote qualifies as the best bid on the market center. After executing against the best resident bid, the process continues to step 1170, where it checks if the incoming sell order still has quantity available to trade. If it does not, then the process terminates as indicated at step 1174. If the incoming sell order still has contracts remaining though, then the process returns to step 1154 to check if the incoming sell order is still executable against the virtual consolidated order and quote list. This process is repeated, executing against each buy order or market maker quote at the NBB, in the sequence of their ranking in the virtual consolidated order and quote list, until the incoming sell order is no longer executable or else until an away market bid is superior to the best resident bid, as described next.

Returning to step 1160, if one or more away market center quotes are superior to the best bid on the market center 20, i.e., no buy orders or market maker quotes can execute at the NBB, then the process continues to step 1162, where it checks whether the incoming sell order should be routed or not. If the process determines that it is not appropriate to route the incoming sell order, then at step 1168 it will post, queue, hide, cancel, or reprice the incoming sell order depending on the rules for the order type, and depending on whether the away market centers 24 quoting at the NBB have already been satisfied or not. The process then terminates in step 1174 as indicated.

Returning to step 1162, if, however, the process determines that it is appropriate to route the incoming sell order to an away market center or away market centers, then the process releases the incoming sell order to the Routing Process in step 1164, which determines the best way to route the order. After routing to all eligible away market centers, the process continues to step 1172, where it checks if the incoming sell order still has quantity available to trade. If it does not, then the process terminates in step 1174 as indicated.

Returning to step 1172, if the incoming sell order does still have quantity remaining, then the process continues to step 1176, where it checks if the incoming sell order is allowed to execute at prices inferior to the NBB or not. For example, certain order types (e.g., inside market orders, inside limit orders) can only execute at the NBB, whereas other order types (e.g., sweep limit orders, intermarket sweep orders) can take advantage of the book-and-ship exception, the trade-and-ship exception, or intermarket sweeping (if allowed by marketplace rules) and execute beyond the NBB after first satisfying the obligation to all the away markets quoting the NBB. If in step 1176, the process determines that the incoming sell order is not allowed to execute beyond the NBB, then it continues to step 1168, where it posts, queues, hides, cancels, or reprices the remaining quantity of the incoming sell order as previously described, and the process terminates at step 1174.

If, however, the process determines at step 1176 that the incoming sell order is indeed allowed to execute beyond the NBB, then the process returns to step 1154 to determine if the incoming sell order is still executable against the virtual consolidated order and quote list. If it is still executable, then the process continues to step 1160, where it checks if there are any unsatisfied away market bids superior to the market center 20. If the process determines that no away market bid is superior to the market center's best bid, then it continues to step 1166, where it initiates the "Determine Best Resident Bid" process, and proceeds to step 1800 (FIG. 13). As all the orders and quotes at the NBB have already been executed in the steps above, when the routine is initiated at this point in the process, it now evaluates buy orders (and market maker bids, if allowed by marketplace rules) that are priced at one tick inferior to the NBB. At this point in the process, the routing process has already fully satisfied the obligation to each away market's disseminated quote at the NBB, and the away market bids are no longer "superior" to the market center bids that are priced at one tick inferior to the NBB. The process can continue to execute against buy orders on the market center 20 (and market maker bids, if allowed by marketplace rules) at the next-best price level as indicated at step 1166.

After executing against the best resident bid at one tick inferior to the NBB, the process continues to step 1170, where it checks if the incoming sell order still has quantity available to trade. If it does not, then the process terminates as indicated at step 1174. If the incoming sell order still has contracts remaining though, then the process returns to step 1154 to check if the incoming sell order is still executable. This process is repeated until the incoming sell order is no longer executable (because all the orders that can execute at one tick inferior to the NBB have been depleted) or else the incoming buy order is depleted by trading.

The LMM Guaranteed Bid Process

Referring now to FIG. 11, the "LMM Guaranteed Bid Process" is illustrated. At step 1400, the process is initiated. At step 1402, the process retrieves the lead market maker's bid. In step 1404, the process checks if the lead market maker's bid is at the NBB price. If the lead market maker's bid is inferior to the NBB, then the lead market maker is not entitled to guaranteed participation with the incoming sell order, and the process continues to step 1406, where it returns to the step where it was originally activated, back to step 1152 (FIG. 10C).

Returning to step 1404, if, however, the lead market maker's bid is at the NBB, then the lead market maker is entitled to guaranteed participation with the incoming sell order. The process proceeds to step 1408, where it checks if the incoming sell order's size is greater than two contracts. If it is less than or equal to two contracts, then the process continues to step 1409, where it matches the incoming sell order with one contract of the lead market bid, at the NBB price. It does this by generating an immediate or cancel ("IOC") buy pseudo-order on behalf of the underlying lead market maker bid, and executing the incoming sell order against the buy pseudo-order. After executing the buy pseudo-order, the order matching engine 21 notifies the market maker quote engine 32b of the quantity of contracts that executed (one contract) so that it can decrement the lead market maker's bid.

Then at step 1410, the process checks if the incoming sell order still has one contract available to trade. If it does not, then the process terminates in step 1412 as indicated. If it does, then the process continues to step 1411, where it matches the single remaining contract of the incoming sell order with one contract of the best displayed bid, at the NBB price. The best displayed bid is the buy order or quote with the highest ranking in the Display Order Process according to price/time priority. The process terminates in step 1412 as indicated.

Returning to step 1408, if, however, the incoming sell order has more than two contracts available to execute, then the process, in this embodiment, determines if there are any customer orders that are eligible to execute ahead of the lead market maker's bid. Accordingly, the process proceeds to step 1414, where it checks if there are any displayed customer buy orders at the NBB.

If none exist, then the lead market maker is entitled to participate immediately with the incoming sell order. The process proceeds to step 1432, where it retrieves a stored, configurable guaranteed allocation parameter determined by the market center's business rules ("LMMGuaranteedPercent"). At step 1434, the process computes the maximum quantity of contracts that the lead market maker is guaranteed for execution ("LMMGuaranteedAllocation") by multiplying the remaining ("Leaves") quantity of the incoming sell order by the LMMGuaranteedPercent parameter, and rounding the result down to the nearest integer value if necessary. In step 1438, the process matches the incoming sell order with the lead market maker's bid, at the NBB price, up to the lesser of the computed LMMGuaranteedAllocation size and the lead marker maker's bid size. It does this by generating an IOC buy pseudo-order on behalf of the underlying lead market maker bid, and executing the incoming sell order against the buy pseudo-order. After executing the buy pseudo-order, the order matching engine 21 notifies the market maker quote engine 32b of the quantity of contracts that executed so that it can decrement the lead market maker's bid.

In step 1442, the process checks if the incoming sell order still has any contracts available to trade. If the incoming sell order has been completely executed, then the process terminates in step 1444 as indicated. However, if the incoming sell order still has contracts available to trade, then the process returns to the step where it was originally activated, back to step 1152 (FIG. 10C), so that the incoming sell order can continue to execute against other bids if possible. The LMM Guaranteed Bid Process is completed, and any remaining quantity of the incoming sell order is released to the Display Order Process.

Returning to step 1414, if, however, there are displayed customer buy orders at the NBB, then the process continues to step 1416, where it retrieves the timestamp assigned to the lead market maker's bid (the time assigned by the market maker quote engine 32b) and stores it in the parameter "LMMBidTimestamp." In step 1418, the process retrieves the earliest displayed customer buy order at the NBB. In step 1420, the process compares the timestamp of the retrieved customer buy order with the LMMBidTimestamp parameter, and if the customer buy order preceded the lead market maker's bid, then the process continues to step 1422, where it matches the incoming sell order with the retrieved customer buy order, at the NBB price.

In step 1424, the process checks if the incoming sell order still has contracts available to trade. If it does not, then the process terminates in step 1426 as indicated. If it does, then the process continues to step 1428, where it checks if there are any additional displayed customer buy orders priced at the NBB. If there are additional customer orders, then in step 1430, the process retrieves the next earliest displayed customer buy order at the NBB and returns to step 1420, where it checks if the newly-retrieved customer buy order was received prior to the lead market maker's bid. It repeats this process until all customer buy orders with price/time priority over the lead market maker's bid have been matched, unless the incoming sell order is exhausted first.

Returning to step 1420, if, however, the timestamp of the retrieved customer buy order is not lower than the LMMBidTimestamp, then the customer order was not received prior to the lead market maker's bid, and is therefore not eligible to execute in the LMM Guaranteed Bid Process. In this case, the process proceeds to step 1432, and executes the lead market maker guaranteed allocation according to steps 1432 through 1444 (or 1446) as described above.

Returning to step 1428, if, however, there are no additional displayed customer buy orders at the NBB, then the process also proceeds to step 1432 at this point, and executes the lead market maker guaranteed allocation according to steps 1432 through 1444 (or 1446) as described above.

The DMM Guaranteed Bid Process

Where the process has determined that an incoming sell order was sent by an order sending firm 26 that is permissioned to send directed orders to a market maker firm 31, the "DMM Guaranteed Bid Process" is activated as indicated at step 1700 (FIG. 12). FIG. 12 illustrates a routine wherein the order matching engine 21 executes the incoming directed sell order in the Directed Order Process, but only if the designated market maker's bid is at the NBB. The DMM Guaranteed Bid Process is very similar to the previously described LMM Guaranteed Bid Process, as the designated market maker in this situation receives the same privileges as the lead market maker for the purpose of executing with the incoming directed order.

At step 1702, the process retrieves the designated market maker's bid. In step 1704, the process checks if the designated market maker's bid is at the NBB price. If the designated market maker's bid is inferior to the NBB, then the designated market maker is not entitled to guaranteed participation with the incoming directed sell order. However, the lead market maker may still be entitled to participate with the incoming order instead. Accordingly, the process continues to step 1706, where the "LMM Guaranteed Bid Process" is activated, and the process proceeds to step 1400 (FIG. 11).

Returning to step 1704, if, however, the designated market maker's bid is at the NBB, then the designated market maker is entitled to guaranteed participation with the incoming order. The process proceeds to step 1708, where, in this embodiment, it checks if the incoming directed sell order's size is greater than two contracts. If it is less than or equal to two contracts, then the process continues to step 1709, where it matches the incoming sell order with one contract of the designated market maker's bid, at the NBB price. It does this by generating an IOC buy pseudo-order on behalf of the underlying designated market maker bid, and executing the incoming sell order against the buy pseudo-order. After executing the buy pseudo-order, the order matching engine 21 notifies the market maker quote engine 32b of the quantity of contracts that executed (one contract) so that it can decrement the designated market maker's bid.

In step 1710, the process checks if the incoming sell order still has one contract available to trade. If it does not, then the process terminates in step 1712 as indicated. If it does, then the process continues to step 1711, where it matches the single remaining contract of the incoming sell order with one contract of the best displayed bid, at the NBB price. The best displayed bid is the buy order or quote with the highest ranking in the Display Order Process according to price/time priority. The process terminates in step 1712 as indicated.

Returning to step 1708, if, however, the incoming directed sell order has more than two contracts available to execute, then the process must determine if there are any customer orders that are eligible to execute ahead of the designated market maker's bid. Accordingly, it proceeds to step 1714, where it checks if there are any displayed customer buy orders at the NBB.

If none exist, then the designated market maker is entitled to participate immediately with the incoming directed sell order. The process proceeds to step 1732, where it retrieves a stored, configurable guaranteed allocation parameter determined by the market center's business rules ("DMMGuaranteedPercent"). In step 1734, the process computes the maximum quantity of contracts that the designated market maker is guaranteed for execution ("DMMGuaranteedAllocation") by multiplying the remaining ("Leaves") quantity of the incoming directed sell order by the DMMGuaranteedPercent parameter, and rounding the result down to the nearest integer value if necessary. In step 1738, the process matches the incoming sell order with the designated market maker's bid, at the NBB price, up to the lesser of the computed DMMGuaranteedAllocation size and the designated market maker's bid size. It does this by generating an IOC buy pseudo-order on behalf of the underlying designated market maker bid, and executing the incoming sell order against the buy pseudo-order. After executing the buy pseudo-order, the order matching engine 21 notifies the market maker quote engine 32b of the quantity of contracts that executed so that it can decrement the designated market maker's bid.

In step 1742, the process checks if the incoming directed sell order still has any contracts available to trade. If the incoming directed sell order has been completely executed, then the process terminates in step 1744 as indicated. However, if the incoming directed sell order still has contracts available to trade, then the process continues to step 1746, where it returns to the step where it was originally initiated, back to step 524 (FIG. 7A), so that the incoming sell order (no longer directed) can continue to execute against other bids if possible. The Directed Order Process is completed at step 526, and any remaining quantity of the incoming sell order is released to the Display Order Process at step 1154 (FIG. 10C).

Returning to step 1714, if, however, there are displayed customer buy orders at the NBB, then the process continues to step 1716, where it retrieves the timestamp assigned to the designated market maker's bid (the time assigned by the market maker quote engine 32b) and stores it in the parameter "DMMBidTimestamp." In step 1718, the process retrieves the earliest displayed customer buy order at the NBB. In step 1720, the process compares the timestamp of the retrieved customer buy order with the DMMBidTimestamp parameter, and if the customer buy order preceded the designated market maker's bid, then the process continues to step 1722, where it matches the incoming directed sell order with the retrieved customer buy order, at the NBB price.

In step 1724, the process checks if the incoming directed sell order still has contracts available to trade. If it does not, then the process terminates in step 1726 as indicated. If it does, then the process continues to step 1728, where it checks if there are any additional displayed customer buy orders priced at the NBB. If there are additional customer orders, then in step 1730, the process retrieves the next earliest displayed customer buy order at the NBB and returns to step 1720, where it checks if the newly-retrieved customer buy order was received prior to the designated market maker's bid. It repeats this process until all customer buy orders with price/time priority over the designated market maker's bid have been matched, unless the incoming directed sell order is exhausted first.

Returning to step 1720, if, however, the timestamp of the retrieved customer buy order is not lower than the DMMBidTimestamp, then the customer order was not received prior to the designated market maker's bid, and is therefore not eligible to execute in the Directed Order Process. In this case, the process proceeds to step 1732, and executes the designated market maker guaranteed allocation according to steps 1732 through 1744 (or 1746) as described above.

Returning to step 1728, if, however, there are no additional displayed customer buy orders at the NBB, then the process also proceeds to step 1732, and executes the designated market maker guaranteed allocation according to steps 1732 through 1744 (or 1746) as described above.

Determine Best Resident Bid Process

Referring now to FIG. 13, a process is illustrated where the order matching engine 21 retrieves the best resident bid on the market center, i.e., the buy order or market maker quote with the highest priority for trading according to the order and quote ranking algorithm of this invention. Each time this routine is activated, the next-best buy order or market maker bid is retrieved and executed. As with the "Determine Best Resident Offer Process" described above, the process starts by looking for the displayed buy order or market maker bid assigned the highest ranking by the Display Order Process. After exhausting all the orders and quotes in the Display Order Process, the routine then moves to each subsequent working order process in turn, i.e., the Reserve Process, the Liquidity Process, the Discretionary Process, and the Tracking Process. The current price level being processed is the NBB, unless the order type can execute at a price level that is inferior to the NBB after first satisfying all trading interest at the NBB, including away market bids.

At step 1802, the process checks if there are any displayed buy orders or market maker quotes at the NBB. If there are, then it continues to step 1804, where it retrieves the bid assigned the highest ranking by the Display Order Process. In step 1808, if the bid is a market maker quote, then the process automatically generates an IOC buy pseudo-order on behalf of the underlying market maker quote. In step 1810, the process matches the incoming sell order with the buy order or pseudo-order, at the buy order's price. The process continues to step 1812, where it returns to the step where this routine was originally initiated, back to step 1166 (FIG. 10C). Each time this routine is executed, the next-best displayed buy order or market maker quote is retrieved and executed, until there are no more displayed buy orders or market maker quotes at the NBB, as described next.

Returning to step 1802, if, however, the process determines that there are no displayed buy orders or market maker quotes priced at the NBB, then it proceeds to step 1814, where it checks if there are any portions of reserve buy orders priced at the NBB. If there are, then in step 1816, the process retrieves the buy order portion assigned the highest ranking by the Reserve Process. In step 1818, it matches the incoming sell order with the reserve portion of the buy order, at the buy order's price. The process continues to step 1820, where it returns to the step where this routine was originally initiated, back to step 1166 (FIG. 10C). Each time this routine is executed, the next-best buy order reserve portion is retrieved and executed, until there are no more buy order reserve portions priced at the NBB, as described next.

Returning to step 1814, if, however, the process determines that there are no portions of the reserve buy orders priced at the NBB, then it proceeds to step 1822, where it checks if there are any passive liquidity buy orders priced at the NBB. If there are, then in step 1824, the process retrieves the passive liquidity buy order assigned the highest ranking by the Liquidity Process. In step 1826, the process matches the incoming sell order with the passive liquidity buy order, at the buy order's price. The process continues to step 1828, where it returns to the step where this routine was originally initiated, back to step 1166 (FIG. 10C). Each time this routine is executed, the next-best passive liquidity buy order is retrieved and executed, until there are no more passive liquidity buy orders priced at the NBB, as described next.

Returning to step 1822, if, however, the process determines that there are no passive liquidity buy orders priced at the NBB, then it proceeds to step 1830, where it checks if there are any discretionary buy orders that can step up to the NBB, i.e., whose discretionary price is greater than or equal to the NBB. If there are, then in step 1832, the process retrieves the discretionary buy order with the highest ranking at the NBB price, as determined by the Discretionary Process. In step 1834, it matches the incoming sell order with the discretionary buy order, at the selected price (the NBB in this example). The process continues to step 1836, where it returns to the step where this routine was originally initiated, back to step 1166 (FIG. 10C). Each time this routine is executed, the next-best discretionary buy order is retrieved and executed, until there are no more discretionary buy orders that can step up to the NBB price, as described next.

Returning to step 1830, if, however, the process determines that there are no discretionary buy orders that can step up to the NBB, then it proceeds to step 1838, where it checks if there are any tracking liquidity buy orders priced at the NBB. If there are, then in step 1842, the process retrieves the tracking liquidity buy order assigned the highest ranking by the Tracking Process. In step 1844, it attempts to match the incoming sell order with the retrieved tracking liquidity buy order at the NBB price according to the rules described and disclosed in co-pending and co-owned U.S. patent application Ser. No. 11/416,943, filed May 3, 2006, entitled "Tracking Liquidity Order," which is incorporated by reference herein.

The process continues to step 1846, where it returns to the step where this routine was originally initiated, back to step 1166 (FIG. 10C). Returning to step 1838, if there are no tracking liquidity buy orders at the NBB, then the process also proceeds to step 1846 at this point.

It should be noted that although FIG. 13 only explicitly evaluates orders at the NBB for ease of illustration, if an incoming sell order is allowed to execute at a price that is inferior to the NBB (e.g., using the trade-and-ship exception, the book-and-ship exception, or intermarket sweeping if permitted by marketplace rules), then the same logic described above is followed, except that after the incoming sell order satisfies all away markets bidding at the NBB, when the process returns to FIG. 13 again, it evaluates the resident buy orders (and market maker quotes, if allowed by marketplace rules) that are priced at one tick inferior to the NBB, beginning with displayed orders and then continuing to reserve, passive liquidity, and discretionary orders. Tracking liquidity buy orders are bypassed as they can only execute at the NBB.

If intermarket sweeping is allowed and the incoming sell order can route to multiple away markets at multiple price levels contemporaneously, then after satisfying all away markets bidding at one tick inferior to the NBB, when the process returns to FIG. 13 again, it evaluates the resident buy orders (and market maker quotes, if allowed by marketplace rules) that are priced at two ticks inferior to the NBB, beginning with displayed orders and then continuing to reserve, passive liquidity, and discretionary orders. It repeats this process for as many price levels as are allowed by marketplace rules and by the incoming sell order's limit price.

DETAILED EXAMPLES

Examples of how quotes and orders are processed in a preferred embodiment of the invention are provided below. It should be understood that the order and quote prices and sizes discussed in these examples are by way of example only to illustrate how the process of an embodiment of the invention operates. Quote and order processing is not limited to these examples.

Example 1: Incoming Order Participates in the Directed Order Process and the Display Order Process In the Directed Order Process, in this embodiment, a customer order can step ahead of other non-customer orders and quotes that were received before it, as can a designated market maker quote. Therefore, in the Directed Order Process, price priority is strictly enforced, but time priority is not.

The following example illustrates the ranking and execution of displayed orders and quotes in the DMM Guaranteed Offer Process and in the Display Order Process. In this example, the issue has a lead market maker (Firm B) and two regular market makers (Firm A and Firm C). After executing in the Directed Order Process, the incoming order then continues to execute in Display Order Process. For ease of illustration, only the offer side of the books is shown in this example.

→The NBBO is 2.00 to 2.05

The offer side of the away market BBO book 25a is ranked as follows:

| Quote | Details | On behalf of | Time received |
|---|---|---|---|
| AwayMktA | Offer 20 @ 2.05 | Away Market A | 10:01:17 |
| AwayMktB | Offer 60 @ 2.10 | Away Market B | 09:57:25 |

The offer side of the market maker quote book 33a is ranked as follows:

| Quote | Details | On behalf of | Time received |
|---|---|---|---|
| Quote A | Offer 40 @ 2.05 | FirmC | 10:02:17 |
| Quote B | Offer 50 @ 2.05 | FirmA | 10:04:22 |
| Quote C | Offer 30 @ 2.05 | FirmB | 10:05:30 |

The internal order book 29a includes the following sell orders, which are ranked as follows according to price/display/time priority. Note that although Order C has the highest time priority of the orders priced at 2.05, it is ranked behind Orders D, E, and F because they are displayed orders and Order C is a working order:

| Order | Details | On behalf of | Time received |
|---|---|---|---|
| Order D | Sell 30 @ 2.05 | Non-customer | 10:01:03 |
| Order E | Sell 10 @ 2.05 | Customer | 10:03:50 |
| Order F | Sell 10 @ 2.05 | Customer | 10:04:40 |
| Order C | Sell 20 @ 2.05, Passive Liquidity | Non-customer | 10:00:36 |
| Order G | Sell 40 @ 2.10 | Customer | 09:58:57 |

Passive liquidity order C is not displayed to the marketplace. The offer side of the public order book looks like this:

| Published Offers |
|---|
| 170 @ 2.05 |
| 40 @ 2.10 |

Referring to FIGS. 4A-4C, the order matching engine 21 at step 100 receives the following incoming directed order in issue XYZ from order sending firm "Firm B" designated for market maker firm "Firm A":

Order 1: Buy 60@ Market, directed order for Firm A

In step 102, the process retrieves the NBO (2.05). In step 104, it checks if incoming Directed Buy Order 1 is executable. As market orders are marketable by definition, the process continues to step 110, where it checks if there are any passive liquidity sell orders superior to the NBO. As passive liquidity sell order C is not superior to the NBO (rather, it is equal to the NBO), the process continues to step 122, where it combines the away market BBO book 25a, the market maker quote book 33a, and the internal order book 29a into a virtual consolidated order and quote list, which it ranks in price/display/time priority but with a preference for resident interest over away market interest at the same price level. Note that although Order C has a higher time priority than all the orders and market maker quotes priced at 2.05, it is ranked behind them because they are displayed whereas Order C is not displayed.

The offer side of the virtual consolidated order and quote list looks like this:

| Order or Quote | Details | On behalf of | Time received |
|---|---|---|---|
| Order D | Sell 30 @ 2.05 | Non-customer | 10:01:03 |
| Quote A | Offer 40 @ 2.05 | FirmC | 10:02:17 |
| Order E | Sell 10 @ 2.05 | Customer | 10:03:50 |
| Quote B | Offer 50 @ 2.05 | FirmA | 10:04:22 |
| Order F | Sell 10 @ 2.05 | Customer | 10:04:40 |
| Quote C | Offer 30 @ 2.05 | FirmB | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

In step 124, the process checks if incoming Buy Order 1's price (Market) is greater than or equal to the NBO (2.05). As it is equal, the process proceeds to step 146. In step 146, the process checks if this issue has any assigned market makers. As it does, the process continues to step 148, where it checks if incoming Buy Order 1 is a directed order or not. As it is a directed order in this example, the process continues to step 150, where the "Directed Order Process" is initiated and proceeds to step 500 (FIG. 7A).

At step 502, the process sets the order sending firm ("OSF") parameter to "FirmB," the ID assigned to the firm that sent incoming Directed Buy Order 1. In step 504, it retrieves the DMM/OSF Permissions Table, which looks like this in this example:

| Issue | Designated Market Maker Firm (DMM) | Default Market Maker? | Order Sending Firm (OSF) |
|---|---|---|---|
| XYZ | FirmA | | FirmB |
| XYZ | FirmA | Yes | FirmC |
| XYZ | FirmB | Yes | FirmB |
| XYZ | FirmB | | FirmA |

In step 506, the process checks if incoming Directed Buy Order 1 specifies a designated market maker. As it has specified Firm A as the designated market maker, the process continues to step 508, where it sets the designated market maker ("DMM") parameter to "Firm A," the ID assigned to the designated firm. In step 510, the process checks the rules in the DMM/OSF Permissions Table, and determines that Firm B is indeed permissioned to direct orders to Firm A (first rule in the Table).

The process then proceeds to step 518, where it checks if incoming Directed Buy Order 1 is a buy order or a sell order. As it is a buy order, the process continues to step 520, where the "DMM Guaranteed Offer Process" is initiated and proceeds to step 700 (FIG. 8).

In step 702, the process retrieves the offer for the designated market maker, Firm A. As shown in the offer side of the virtual consolidated order and quote list below, the designated market maker's offer is Quote B:

| Order or Quote | Details | On behalf of | Time received |
|---|---|---|---|
| Order D | Sell 30 @ 2.05 | Non-customer | 10:01:03 |
| Quote A | Offer 40 @ 2.05 | FirmC | 10:02:17 |
| Order E | Sell 10 @ 2.05 | Customer | 10:03:50 |
| Quote B | Offer 50 @ 2.05 ← | FirmA | 10:04:22 |
| Order F | Sell 10 @ 2.05 | Customer | 10:04:40 |
| Quote C | Offer 30 @ 2.05 | FirmB | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

In step 704, the process determines that Quote B (2.05) is equal to the NBO (2.05), and accordingly incoming Directed Buy Order 1 is eligible to participate in the Directed Order Process. The process continues to step 708, where it checks if incoming Directed Buy Order 1's size (60 contracts) is greater than two contracts. As it is, the process proceeds to step 714, where it checks if there are any displayed customer sell orders at the NBO (2.05). As there are displayed customer sell orders at the NBO, it continues to step 716, where it stores the timestamp assigned to Quote B (10:04:22) in the parameter DMMOfferTimestamp.

As indicated below, Order E and Order F are both displayed customer sell orders at the NBO (2.05). Although Order G is also a displayed customer sell order, it's price (2.10) is inferior to the NBO (2.05):

| Order or Quote | Details | On behalf of | Time received |
|---|---|---|---|
| Order D | Sell 30 @ 2.05 | Non-customer | 10:01:03 |
| Quote A | Offer 40 @ 2.05 | FirmC | 10:02:17 |
| Order E | Sell 10 @ 2.05 ← | Customer | 10:03:50 |
| Quote B | Offer 50 @ 2.05 | FirmA | 10:04:22 |
| Order F | Sell 10 @ 2.05 ← | Customer | 10:04:40 |
| Quote C | Offer 30 @ 2.05 | FirmB | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The process continues to step 718, where it retrieves the earliest displayed customer sell order at the NBO, Order E. In step 720, the process compares the timestamp of Order E (10:03:50) to the value of the DMMOfferTimestamp parameter (10:04:22) and determines that the customer timestamp is lower, i.e., the order was received prior to the quote. Accordingly, the process continues to step 722, where it matches 10 contracts of incoming Directed Buy Order 1 with posted customer Sell Order E, at the price of 2.05, completely depleting Sell Order E and removing it from the virtual consolidated order and quote list and the order books.

The offer side of the virtual consolidated order and quote list now looks like this:

| Order or Quote | Details | On behalf of | Time received |
|---|---|---|---|
| Order D | Sell 30 @ 2.05 | Non-customer | 10:01:03 |
| Quote A | Offer 40 @ 2.05 | FirmC | 10:02:17 |
| Quote B | Offer 50 @ 2.05 | FirmA | 10:04:22 |
| Order F | Sell 10 @ 2.05 | Customer | 10:04:40 |
| Quote C | Offer 30 @ 2.05 | FirmB | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The internal order book 29a now looks like this:

| Order | Details | On behalf of | Time received |
|---|---|---|---|
| Order D | Sell 30 @ 2.05 | Non-customer | 10:01:03 |
| Order F | Sell 10 @ 2.05 | Customer | 10:04:40 |
| Order C | Sell 20 @ 2.05, Passive Liquidity | Non-customer | 10:00:36 |
| Order G | Sell 40 @ 2.10 | Customer | 09:58:57 |

The offer side of the public order book now looks like this:

| Published Offers |
|---|
| 160 @ 2.05 ← |
| 40 @ 2.10 |

The process continues to step 724, where it checks if incoming Directed Buy Order 1 still has any quantity available to trade. As it has 50 contracts remaining, the process continues to step 728, where it checks if there are any more displayed customer sell orders at the NBO. As Order F is also a displayed customer sell order at the NBO, the process retrieves it in step 730, and returns to step 720.

In step 720, the process compares the timestamp of Order F (10:04:40) to the value of the DMMOfferTimestamp parameter (10:04:22) and determines that the customer timestamp is higher, i.e., the order was received later than the quote. Accordingly, Order F is not eligible to participate in the Directed Order Process, and the designated market maker's quote is entitled to execute next.

The process proceeds to step 732, where it retrieves the guaranteed percentage allocated for designated market makers, which is stored in the parameter "DMMGuaranteedPercent." In this example, the DMMGuaranteedPercent is set to 40%. In step 734, the process multiplies the remaining quantity of incoming Directed Buy Order 1 (50 contracts) by the DMMGuaranteedPercent (40%) to derive the DMMGuaranteedAllocation of 20 contracts (40% of 50 contracts=20 contracts). In step 738, the process matches 20 contracts of incoming Directed Buy Order 1, the lesser of the DMMGuaranteedAllocation (20 contracts) and the DMM Offer size (50 contracts), with Quote B, at the price of 2.05. It executes the DMM Offer by creating an IOC pseudo-order to sell 50 at 2.05 on behalf of the DMM Offer, and matching 20 contracts of the pseudo-order with incoming Directed Buy Order 1. The Directed Order Process is completed. The process notifies the market maker quote engine 32b to decrement Quote B by the 20 contracts just executed.

The offer side of the virtual consolidated order and quote list now looks like this:

| Order or Quote | Details | On behalf of | Time received |
|---|---|---|---|
| Order D | Sell 30 @ 2.05 | Non-customer | 10:01:03 |
| Quote A | Offer 40 @ 2.05 | FirmC | 10:02:17 |
| Quote B | Offer 30 @ 2.05 ← | FirmA | 10:04:22 |
| Order F | Sell 10 @ 2.05 | Customer | 10:04:40 |
| Quote C | Offer 30 @ 2.05 | FirmB | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The market maker quote engine 32b decrements Quote B by the 20 contracts that were executed. The offer side of the market maker quote book 33a now looks like this:

| Order or Quote | Details | On behalf of | Time received |
|---|---|---|---|
| Quote A | Offer 40 @ 2.05 | FirmC | 10:02:17 |
| Quote B | Offer 30 @ 2.05 ← | FirmA | 10:04:22 |
| Quote C | Offer 30 @ 2.05 | FirmB | 10:05:30 |

The offer side of the public order book now looks like this:

| Published Offers |
|---|
| 140 @ 2.05 ← |
| 40 @ 2.10 |

The process continues to step 742, where it checks if incoming Directed Buy Order 1 still has any quantity available to trade. As it still has 30 contracts remaining, the process continues to step 746, where it returns to the step where it was originally invoked, back to step 520 (FIG. 7A).

From step 520, the process continues to step 522, where it returns to the step where it was originally invoked, back to step 150 (FIG. 4C). After the Directed Order Process completes, incoming Buy Order 1 is no longer a directed order, and is processed like any other non-directed order. In step 154, the process checks if incoming Buy Order 1 is still executable. As it is, the process continues to step 160, where it checks if any away market centers are superior to the market center. As none are (the market center 20 is at the NBO, 2.05), the process continues to step 166, where it initiates the "Determine Best Resident Offer Process," and proceeds to step 800 (FIG. 9).

In step 802, the process checks if there are any displayed orders or quotes at the NBO (2.05). As there are, the process continues to step 804, where it retrieves the offer assigned the highest ranking by the Display Order Process. As illustrated in the table above, Order D is the highest-ranked offer in the Display Order Process. As Order D is a sell order, the process bypasses step 808 and continues to step 810, where it matches the remaining 30 contracts of incoming Buy Order 1 against Order D, at the price of 2.05, completely depleting both orders.

The offer side of the virtual consolidated order and quote list now looks like this:

| Order or Quote | Details | On behalf of | Time received |
|---|---|---|---|
| Quote A | Offer 40 @ 2.05 | FirmC | 10:02:17 |
| Quote B | Offer 30 @ 2.05 | FirmA | 10:04:22 |
| Order F | Sell 10 @ 2.05 | Customer | 10:04:40 |
| Quote C | Offer 30 @ 2.05 | FirmB | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The offer side of the internal order book 29a now looks like this:

| Order | Details | On behalf of | Time received |
|---|---|---|---|
| Order F | Sell 10 @ 2.05 | Customer | 10:04:40 |
| Order C | Sell 20 @ 2.05, Passive Liquidity | Non-customer | 10:00:36 |
| Order G | Sell 40 @ 2.10 | Customer | 09:58:57 |

The offer side of the public order book now looks like this:

| Published Offers |
|---|
| 110 @ 2.05 ← |
| 40 @ 2.10 |

The process continues to step 812, where it returns to the step where the procedure was originally invoked, back to step 166 (FIG. 4C). The process continues to step 170, where it checks if incoming Buy Order 1 still has any contracts available to trade. As it does not, the process terminates in step 174 as indicated. The process automatically cancels the remaining 30 contracts of the IOC pseudo-order it created on behalf of Quote B. The virtual consolidated order and quote list is deleted from local memory.

It should be noted that if incoming Buy Order 1 had had a larger size, then the process would have continued to "walk the book," executing against each resting order and quote in the sequence of their ranking in the virtual consolidated order and quote list:

1. Quote A (Display Order Process)
2. Quote B (Display Order Process)
3. Order F (Display Order Process)
4. Quote C (Display Order Process)
5. Order C (working order Liquidity Process)
6. AwayMktA (Routing Process)

As shown above, the remaining portion of Quote B would have executed again, but this time in the Display Order Process according to normal price/time priority rules. After routing to Away Market A, if incoming Buy Order 1 still had quantity available to trade, the process would have momentarily queued it until the NBO changed or until new trading interest presented at or better than the NBO, as incoming market buy orders can only execute at the NBO.

Example 2: Incoming Order Executes in the LMM Guarantee Process and the Display Order Process The following example illustrates the ranking and execution of displayed orders and quotes in the LMM Guarantee Process and in the Display Order Process. In this example, the issue has a lead market maker (LMM) and two assigned market makers (MM2 and MM3). After executing in the LMM Guarantee Process, the incoming order then continues to execute in the Display Order Process.

→The NBBO is 2.00 to 2.05

The offer side of the away market BBO book 25a is ranked as follows:

| Quote | Details | On behalf of | Time received |
|---|---|---|---|
| AwayMktA | Offer 20 @ 2.05 | Away Market A | 10:01:17 |
| AwayMktB | Offer 60 @ 2.10 | Away Market B | 09:57:25 |

The offer side of the market maker quote book 33a is ranked as follows:

| Quote | Details | On behalf of | Time received |
|---|---|---|---|
| Quote A | Offer 40 @ 2.05 | MM3 | 10:02:17 |
| Quote B | Offer 50 @ 2.05 | MM2 | 10:04:22 |
| Quote C | Offer 30 @ 2.05 | LMM | 10:05:30 |

The internal order book 29a includes the following sell orders, which are ranked as follows according to price/display/time priority. Note that although Order C has the highest time priority of the orders priced at 2.05, it is ranked behind Orders D, E, and F because they are displayed orders and Order C is a working order:

| Order | Details | On behalf of | Time received |
|---|---|---|---|
| Order D | Sell 30 @ 2.05 | Non-customer | 10:01:03 |
| Order E | Sell 10 @ 2.05 | Customer | 10:03:50 |
| Order F | Sell 10 @ 2.05 | Customer | 10:04:40 |
| Order C | Sell 20 @ 2.05, Passive Liquidity | Non-customer | 10:00:36 |
| Order G | Sell 40 @ 2.10 | Customer | 09:58:57 |

Passive liquidity order C is not displayed to the marketplace. The offer side of the public order book looks like this:

| Published Offers |
|---|
| 170 @ 2.05 |
| 40 @ 2.10 |

Referring to FIGS. 4A-4C, at step 100, the order matching engine 21 receives the following incoming order:

Order 2: Buy 60@ Market

In step 102, the process retrieves the NBO (2.05). In step 104, it checks if incoming Buy Order 2 is executable. As market orders are marketable by definition, the process continues to step 110, where it checks if there are any passive liquidity sell orders superior to the NBO. As passive liquidity sell order C is not superior to the NBO (rather, it is equal to the NBO), the process continues to step 122, where it combines the away market BBO book 25a, the market maker quote book 33a, and the internal order book 29a together in a virtual consolidated order and quote list, which it ranks in price/display/time priority but with a preference for resident interest over away market interest at the same price level. Note that although Order C has a higher time priority than all the orders and market maker quotes priced at 2.05, it is ranked behind them because they are displayed whereas Order C is not displayed.

The offer side of the virtual consolidated order and quote list looks like this:

| Order or Quote | Details | On behalf of | Time received |
|---|---|---|---|
| Order D | Sell 30 @ 2.05 | Non-customer | 10:01:03 |
| Quote A | Offer 40 @ 2.05 | MM3 | 10:02:17 |
| Order E | Sell 10 @ 2.05 | Customer | 10:03:50 |
| Quote B | Offer 50 @ 2.05 | MM2 | 10:04:22 |
| Order F | Sell 10 @ 2.05 | Customer | 10:04:40 |
| Quote C | Offer 30 @ 2.05 | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

In step 124, the process checks if incoming Buy Order 2's price (Market) is greater than or equal to the NBO (2.05). As it is equal, the process proceeds to step 146. In step 146, the process checks if this issue has any assigned market makers. As it does, the process continues to step 148, where it checks if incoming Buy Order 2 is a directed order or not. As it is not a directed order, the process continues to step 152, where the "LMM Guaranteed Offer Process" is initiated and proceeds to step 400 (FIG. 6).

In step 402, the process retrieves the offer for the lead market maker. As shown in the offer side of the virtual consolidated order and quote list below, the lead market maker's offer is Quote C:

| Order or Quote | Details | On behalf of | Time received |
|---|---|---|---|
| Order D | Sell 30 @ 2.05 | Non-customer | 10:01:03 |
| Quote A | Offer 40 @ 2.05 | MM3 | 10:02:17 |
| Order E | Sell 10 @ 2.05 | Customer | 10:03:50 |
| Quote B | Offer 50 @ 2.05 | MM2 | 10:04:22 |
| Order F | Sell 10 @ 2.05 | Customer | 10:04:40 |
| Quote C | Offer 30 @ 2.05 ← | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

In step 404, the process determines that Quote C (2.05) is equal to the NBO (2.05), and accordingly incoming Buy Order 2 is eligible to participate in the LMM Guaranteed Offer Process. The process continues to step 408, where it checks if incoming Buy Order 2's size (60 contracts) is greater than two contracts. As it is, the process proceeds to step 414, where it checks if there are any displayed customer sell orders at the NBO (2.05). As there are, the process continues to step 416, where it stores the timestamp assigned to Quote C (10:05:30) in the parameter LMMOfferTimestamp.

As indicated below, Order E and Order F are both displayed customer sell orders at the NBO (2.05). Although Order G is also a displayed customer sell order, it's price (2.10) is inferior to the NBO (2.05):

| Order or Quote | Details | On behalf of | Time received |
|---|---|---|---|
| Order D | Sell 30 @ 2.05 | Non-customer | 10:01:03 |
| Quote A | Offer 40 @ 2.05 | MM3 | 10:02:17 |
| Order E | Sell 10 @ 2.05 ← | Customer | 10:03:50 |
| Quote B | Offer 50 @ 2.05 | MM2 | 10:04:22 |
| Order F | Sell 10 @ 2.05 ← | Customer | 10:04:40 |
| Quote C | Offer 30 @ 2.05 | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The process continues to step 418, where it retrieves the earliest displayed customer sell order at the NBO, Order E. In step 420, the process compares the timestamp of Order E (10:03:50) to the value of the LMMOfferTimestamp parameter (10:05:30) and determines that the customer timestamp is lower, i.e., the order was received prior to the quote. Accordingly, the process continues to step 422, where it matches 10 contracts of incoming Buy Order 2 with posted customer Sell Order E, at the price of 2.05, completely depleting Sell Order E and removing it from the virtual consolidated order and quote list and the books.

The offer side of the virtual consolidated order and quote list now looks like this:

| Order or Quote | Details | On behalf of | Time received |
|---|---|---|---|
| Order D | Sell 30 @ 2.05 | Non-customer | 10:01:03 |
| Quote A | Offer 40 @ 2.05 | MM3 | 10:02:17 |
| Quote B | Offer 50 @ 2.05 | MM2 | 10:04:22 |
| Order F | Sell 10 @ 2.05 | Customer | 10:04:40 |

-continued

| Order or Quote | Details | On behalf of | Time received |
|---|---|---|---|
| Quote C | Offer 30 @ 2.05 | LMM | 10:05:30 |
| Order C | Sell 20 @ 2.05, Pssive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The offer side of the internal order book 29a now looks like this:

| Order | Details | On behalf of | Time received |
|---|---|---|---|
| Order D | Sell 30 @ 2.05 | Non-customer | 10:01:03 |
| Order F | Sell 10 @ 2.05 | Customer | 10:04:40 |
| Order C | Sell 20 @ 2.05, Passive Liquidity | Non-customer | 10:00:36 |
| Order G | Sell 40 @ 2.10 | Customer | 09:58:57 |

The offer side of the public order book now looks like this:

| Published Offers |
|---|
| 160 @ 2.05 ← |
| 40 @ 2.10 |

The process continues to step 424, where it checks if incoming Buy Order 2 still has any quantity available to trade. As it has 50 contracts remaining, the process continues to step 428, where it checks if there are any more displayed customer sell orders at the NBO. As Order F is also a displayed customer sell order at the NBO, the process retrieves it in step 430, and returns to step 420.

In step 420, the process compares the timestamp of Order F (10:04:40) to the value of the LMMOfferTimestamp parameter (10:05:30) and determines that the customer timestamp is lower, i.e., the order was received prior to the quote. Accordingly, Order F is also eligible to participate in the LMM Guaranteed Offer Process. The process continues to step 422, where it matches 10 contracts of incoming Buy Order 2 with posted customer Sell Order F, at the price of 2.05, completely depleting Sell Order F and removing it from the virtual consolidated order and quote list and the books.

The offer side of the virtual consolidated order and quote list now looks like this:

| Order or Quote | Details | On behalf of | Time received |
|---|---|---|---|
| Order D | Sell 30 @ 2.05 | Non-customer | 10:01:03 |
| Quote A | Offer 40 @ 2.05 | MM3 | 10:02:17 |
| Quote B | Offer 50 @ 2.05 | MM2 | 10:04:22 |
| Quote C | Offer 30 @ 2.05 | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The offer side of the internal order book 29a now looks like this:

| Order | Details | On behalf of | Time received |
|---|---|---|---|
| Order D | Sell 30 @ 2.05 | Non-customer | 10:01:03 |
| Order C | Sell 20 @ 2.05, Passive Liquidity | Non-customer | 10:00:36 |
| Order G | Sell 40 @ 2.10 | Customer | 09:58:57 |

The offer side of the public order book now looks like this:

| Published Offers |
|---|
| 150 @ 2.05 ← |
| 40 @ 2.10 |

The process continues to step 428, where it checks if there are any additional displayed customer sell orders at the NBO. As there are none, the process proceeds to step 432, where it retrieves the guaranteed percentage allocated for lead market makers, which is stored in the parameter "LMMGuaranteedPercent." In this example, the LMMGuaranteedPercent is set to 40%. In step 434, the process multiplies the remaining quantity of incoming Buy Order 2 (40 contracts) by the LMMGuaranteedPercent (40%) to derive the LMMGuaranteedAllocation of 16 contracts (40% of 40 contracts=16 contracts). In step 438, the process matches 16 contracts of incoming Buy Order 2, the lesser of the LMMGuaranteedAllocation (16 contracts) and the LMM Offer size (30 contracts), with LMM Quote C, at the price of 2.05. The process executes LMM Quote C by creating an IOC pseudo-order to sell 30 at 2.05 on behalf of LMM Quote C, and matching 16 contracts of the pseudo-order against incoming Buy Order 2. The LMM Guaranteed Offer Process is completed. The process notifies the market maker quote engine 32b to decrement LMM Quote C by the 16 contracts just executed.

The offer side of the virtual consolidated order and quote list now looks like this:

| Order or Quote | Details | On behalf of | Time received |
|---|---|---|---|
| Order D | Sell 30 @ 2.05 | Non-customer | 10:01:03 |
| Quote A | Offer 40 @ 2.05 | MM3 | 10:02:17 |
| Quote B | Offer 50 @ 2.05 | MM2 | 10:04:22 |
| Quote C | Offer 14 @ 2.05 ← | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The market maker quote engine 32b decrements Quote C by the 16 contracts that were executed. The offer side of the market make quote book 33a now looks like this:

| Order or Quote | Details | On behalf of | Time received |
|---|---|---|---|
| Quote A | Offer 40 @ 2.05 | MM3 | 10:02:17 |
| Quote B | Offer 50 @ 2.05 | MM2 | 10:04:22 |
| Quote C | Offer 14 @ 2.05 ← | LMM | 10:05:30 |

The offer side of the public order book now looks like this:

| Published Offers |
|---|
| 134 @ 2.05 ← |
| 40 @ 2.10 |

The process continues to step 442, where it checks if incoming Buy Order 2 still has any quantity available to trade. As it still has 24 contracts remaining, the process continues to step 446, where it returns to the step where it was originally invoked, back to step 152 (FIG. 4C).

The process continues to step 154, where it checks if incoming Buy Order 2 is still executable against the virtual consolidated order and quote list. As it is, the process continues to step 160, where it checks if any away market centers are superior to the market center. As none are (the market center is at the NBO, 2.05), the process continues to step 166, where it initiates the "Determine Best Resident Offer Process," and proceeds to step 800 (FIG. 9).

In step 802, the process checks if there are any displayed orders or quotes at the NBO (2.05). As there are, the process continues to step 804, where it retrieves the offer assigned the highest ranking by the Display Order Process. As illustrated in the table above, Order D is the offer with the highest ranking in the Display Order Process. As Order D is a sell order, the process bypasses step 808 and continues to step 810, where it matches the remaining 24 contracts of incoming Buy Order 2 against posted Sell Order D, at the price of 2.05. Incoming Buy Order 2 is completely depleted. Posted Sell Order D still has 6 contracts remaining.

The offer side of the virtual consolidated order and quote list now looks like this:

| Order or Quote | Details | On behalf of | Time received |
|---|---|---|---|
| Order D | Sell 6 @ 2.05 ← | Non-customer | 10:01:03 |
| Quote A | Offer 40 @ 2.05 | MM3 | 10:02:17 |
| Quote B | Offer 50 @ 2.05 | MM2 | 10:04:22 |
| Quote C | Offer 14 @ 2.05 | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The offer side of the internal order book 29a now looks like this:

| Order | Details | On behalf of | Time received |
|---|---|---|---|
| Order D | Sell 6 @ 2.05 ← | Non-customer | 10:01:03 |
| Order C | Sell 20 @ 2.05, Passive Liquidity | Non-customer | 10:00:36 |
| Order G | Sell 40 @ 2.10 | Customer | 09:58:57 |

The offer side of the public order book now looks like this:

| Published Offers |
|---|
| 110 @ 2.05 ← |
| 40 @ 2.10 |

The process continues to step 812, where it returns to the step where the procedure was originally invoked, back to step 166 (FIG. 4C). The process continues to step 170, where it checks if incoming Buy Order 2 still has any contracts available to trade. As it does not, the process terminates in step 174 as indicated. As incoming Buy Order 2 is completed, the process cancels the remaining 14 contracts of the IOC pseudo-order it created on behalf of the LMM Offer. The virtual consolidated order and quote list is deleted from local memory.

It should be noted that if incoming Buy Order 2 had had a larger size, then the process would have continued to "walk the book," executing against each resting order and quote in the sequence of their ranking in the virtual consolidated order and quote list. Quote C would have executed again, but this time in the Display Order Process according to normal price/time priority rules.

Example 3: Lead Market Maker is not at the NBBO: Incoming Order Executes in the Display Order Process Only As illustrated in the preceding examples, the LMM Guarantee Process and the Directed Order Process each provide a preference to certain customers and market makers. In contrast, in the Display Order Process, resting orders and quotes compete without regard to whether the trading interest is on behalf of a customer, a broker/dealer, a market maker, an institution, or any other market participant eligible to send orders to the market center 20. In this example, the issue has a lead market maker (LMM) and two assigned market makers (MM2 and MM3). In contrast to the prior example, in this example, the LMM is not quoting at the NBBO and is therefore not eligible to participate in the LMM Guarantee Process.

→The NBBO is 1.90 to 2.00. The market center 20 is alone at the NBO.

The offer side of the away market BBO book 25a is ranked as follows:

| Quote | Details | On behalf of | Time received |
|---|---|---|---|
| AwayMktA | Offer 20 @ 2.05 | Away Market A | 10:01:17 |
| AwayMktB | Offer 60 @ 2.10 | Away Market B | 09:57:25 |

The offer side of the market maker quote book 33a is ranked as follows:

| Quote | Details | On behalf of | Time received |
|---|---|---|---|
| Quote A | Offer 40 @ 2.05 | MM3 | 10:02:17 |
| Quote B | Offer 50 @ 2.05 | MM2 | 10:04:22 |
| Quote C | Offer 30 @ 2.05 | LMM | 10:05:30 |

The internal order book 29a includes the following sell orders, which are ranked as follows according to price/display/time priority.

| Order | Details | On behalf of | Time received |
|---|---|---|---|
| Order D | Sell 30 @ 2.00 | Non-customer | 10:05:08 |
| Order E | Sell 10 @ 2.05 | Customer | 10:03:50 |
| Order F | Sell 10 @ 2.05 | Customer | 10:04:40 |
| Order C | Sell 20 @ 2.05, Passive Liquidity | Non-customer | 10:00:36 |
| Order G | Sell 40 @ 2.10 | Customer | 09:58:57 |

The offer side of the public order book looks like this:

| Published Offers |
|---|
| 30 @ 2.00 |
| 140 @ 2.05 |
| 40 @ 2.10 |

Referring to FIGS. 4A-4C, in step 100, the order matching engine 21 receives the following incoming order:
Order 3: Buy 60@ Market
In step 102, the process retrieves the NBO (2.00). In step 104, it checks if incoming Buy Order 3 is executable. Since the order is a market order, the process continues to step 110, where it checks if there are any passive liquidity sell orders superior to the NBO. As passive liquidity sell order C (2.05) is inferior to the NBO (2.00), the process continues to step 122, where it combines the away market BBO book 25a, the market maker quote book 33a, and the internal order book 29a together in a virtual consolidated order and quote list, which it ranks in price/display/time priority but with a preference for resident interest over away market interest at the same price level.

The offer side of the virtual consolidated order and quote list looks like this:

| Order or Quote | Details | On behalf of | Time received |
|---|---|---|---|
| Order D | Sell 30 @ 2.00 | Non-customer | 10:05:08 |
| Quote A | Offer 40 @ 2.05 | MM3 | 10:02:17 |
| Order E | Sell 10 @ 2.05 | Customer | 10:03:50 |
| Quote B | Offer 50 @ 2.05 | MM2 | 10:04:22 |
| Order F | Sell 10 @ 2.05 | Customer | 10:04:40 |
| Quote C | Offer 30 @ 2.05 | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

In step 124, the process checks if incoming Buy Order 3's price (Market) is greater than or equal to the NBO (2.00). As it is equal, the process proceeds to step 146. In step 146, the process checks if this issue has any assigned market makers. As it does, the process continues to step 148, where it checks whether the incoming Buy Order 3 is a directed order. As it is not a directed order, the process continues to step 152, where it initiates the "LMM Guaranteed Offer Process," and proceeds to step 400 (FIG. 6). In step 402, the process retrieves the offer for the lead market maker. As shown in the offer side of the virtual consolidated order and quote list below, the lead market maker's offer is Quote C:

| Order or Quote | Details | On behalf of | Time received |
|---|---|---|---|
| Order D | Sell 30 @ 2.00 | Non-customer | 10:05:08 |
| Quote A | Offer 40 @ 2.05 | MM3 | 10:02:17 |
| Order E | Sell 10 @ 2.05 | Customer | 10:03:50 |
| Quote B | Offer 50 @ 2.05 | MM2 | 10:04:22 |
| Order F | Sell 10 @ 2.05 | Customer | 10:04:40 |
| Quote C | Offer 30 @ 2.05 ← | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

In step 404, the process determines that the lead market maker's Quote C (2.05) is inferior to the NBO (2.00). Accordingly, the lead market maker is not eligible to participate in the LMM Guaranteed Offer Process, which is therefore bypassed. The process continues to step 406, where it returns back to step 152 (FIG. 4C).

The process then continues to step 154, where it checks if incoming Buy Order 3 is still executable against the virtual consolidated order and quote list. As it is, the process continues to step 160, where it checks if any away market centers are superior to the market center. As none are (the market center 20 is alone at the NBO, 2.00), the process continues to step 166, where the "Determine Best Resident Offer Process" is initiated and proceeds to step 800 (FIG. 9). In step 802, the process checks if there are any displayed orders or quotes at the NBO (2.00). As there are, the process continues to step 804, where it retrieves the offer assigned the highest ranking by the Display Order Process. As illustrated in the table above, Order D is the offer with the highest ranking in the Display Order Process. As Order D is a sell order, the process bypasses step 808 and continues to step 810, where it matches 30 contracts of incoming Buy Order 3 against posted Sell Order D, at the price of 2.00, completely depleting Sell Order D and removing it from the virtual consolidated order and quote list and the books.
→The NBBO is now 1.90 to 2.05. The market center 20 is still at the NBO.

The offer side of the virtual consolidated order and quote list now looks like this:

| Order or Quote | Details | On behalf of | Time received |
|---|---|---|---|
| Quote A | Offer 40 @ 2.05 | MM3 | 10:02:17 |
| Order E | Sell 10 @ 2.05 | Customer | 10:03:50 |
| Quote B | Offer 50 @ 2.05 | MM2 | 10:04:22 |
| Order F | Sell 10 @ 2.05 | Customer | 10:04:40 |
| Quote C | Offer 30 @ 2.05 | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The offer side of the internal order book 29a now looks like this:

| Order | Details | On behalf of | Time received |
|---|---|---|---|
| Order E | Sell 10 @ 2.05 | Customer | 10:03:50 |
| Order F | Sell 10 @ 2.05 | Customer | 10:04:40 |
| Order C | Sell 20 @ 2.05, Passive Liquidity | Non-customer | 10:00:36 |
| Order G | Sell 40 @ 2.10 | Customer | 09:58:57 |

The offer side of the public order book now looks like this:

| Published Offers |
|---|
| 140 @ 2.05 ← |
| 40 @ 2.10 |

The process continues to step 812, where it returns to step 166 (FIG. 4C). The process continues to step 170, where it checks if incoming Buy Order 3 still has any contracts available to trade. As it still has 30 contracts available, the process returns to step 154, where it checks if incoming Buy Order 3 is still executable against the virtual consolidated order and quote list. As it is, the process continues to step 160, where it checks if any away market centers are superior to the market center. As none are (the market center 20 is at the new NBO, 2.05), the process continues to step 166, where the "Determine Best Resident Offer Process" is activated again and proceeds to step 800 (FIG. 9).

In step 802, the process checks if there are any displayed orders or quotes at the NBO (2.05). As there are, the process continues to step 804, where it retrieves the offer assigned the highest ranking by the Display Order Process. As illustrated in the table above, Quote A is the offer assigned the highest ranking by the Display Order Process. In step 808, the process automatically generates an IOC pseudo-order to sell 40 at 2.05 on behalf Quote A. The process continues to step 810, where it matches 30 contracts of incoming Buy Order 3, the lesser of the remaining size of incoming Buy Order 3 (30 contracts) and the Quote A offer size (40 contracts), against the sell pseudo-order, at the price of 2.05, completely depleting incoming Buy Order 3. The process notifies the market maker quote engine 32b to decrement Quote A by the 30 contracts just executed.

The offer side of the virtual consolidated order and quote list now looks like this:

| Order or Quote | Details | On behalf of | Time received |
| --- | --- | --- | --- |
| Quote A | Offer 10 @ 2.05 ← | MM3 | 10:02:17 |
| Order E | Sell 10 @ 2.05 | Customer | 10:03:50 |
| Quote B | Offer 50 @ 2.05 | MM2 | 10:04:22 |
| Order F | Sell 10 @ 2.05 | Customer | 10:04:40 |
| Quote C | Offer 30 @ 2.05 | LMM | 10:05:30 |
| Order C | Sell 20 @ 2.05, Passive Liquidity | Non-customer | 10:00:36 |
| AwayMktA | Offer 20 @ 2.05 | Away Market A | 10:01:17 |
| Order G | Sell 40 @ 2.10 | Customer | 09:58:57 |
| AwayMktB | Offer 60 @ 2.10 | Away Market B | 09:57:25 |

The market maker quote engine 32b decrements Quote A by the 30 contracts just executed. The offer side of the market maker quote book 33a now looks like this:

| Order or Quote | Details | On behalf of | Time received |
| --- | --- | --- | --- |
| Quote A | Offer 10 @ 2.05 ← | MM3 | 10:02:17 |
| Quote B | Offer 50 @ 2.05 | MM2 | 10:04:22 |
| Quote C | Offer 30 @ 2.05 | LMM | 10:05:30 |

The offer side of the public order book now looks like this:

| Published Offers |
| --- |
| 110 @ 2.05 ← |
| 40 @ 2.10 |

The process continues to step 812, where it returns to step 166 (FIG. 4C). The process then continues to step 170, where it checks if incoming Buy Order 3 still has any contracts available to trade. As it does not, the process terminates in step 174 as indicated. As incoming Buy Order 3 is completed, the process cancels the remaining 10 contracts of the IOC pseudo-order it created on behalf of Quote A. The virtual consolidated order and quote list is deleted from local memory.

As illustrated in the preceding example, the best order (Order D) belonged to a non-customer, and the best quote (Quote A) belonged to a market maker that was neither the lead market maker, nor a designated market maker. This example illustrates how quotes and orders are executed equally in this invention, i.e., on a level playing field, when orders and quotes execute in the Display Order Process.

It should be noted that after Order D executed and the NBO changed from 2.00 to 2.05, the lead market maker's offer (Quote C, at 2.05) was still not eligible to execute in the LMM Guaranteed Offer Process although it was now at the new NBO (2.05). This is because a lead market maker must be at the NBBO when an incoming order is first received to be eligible to participate in the LMM Guarantee Process.

Example 4: Ranking and Execution of Different Order Types in the Display Order Process and the Working Order Process This example illustrates how nonmarketable orders, including working orders, are ranked according to price/display/time priority within the internal order book 29a and how an incoming marketable order executes against the resting orders and quotes in the sequence of their ranking in the virtual consolidated order and quote list. This example also illustrates how a working order with a price superior to the NBBO is allowed to execute ahead of all displayed orders and quotes.

For ease of illustration, the different order types are described as "residing" in a given order execution process. This description does not imply a physical location in the internal order book 29a although the ranking schema is illustrated in a physical embodiment in the examples below. Rather, when an order is described as residing in a given order execution process, it simply indicates which routine determines the ranking for all or part of a given order.

As the LMM Guarantee Process has already been illustrated in a prior example, in this example, the lead market maker is not quoting at the NBBO and is therefore not entitled to participate in the LMM Guarantee Process.

→At the start of this example, the NBBO is 2.00 to 2.10 (30×50).

The away market BBO book 25a looks like this:

| Away Market Best Bids | Away Market Best Offers |
| --- | --- |
| Away Market Center A: Bid 30 @ 2.00 | Away Market Center B: Offer 20 @ 2.10 |
| Away Market Center B: Bid 40 @ 1.95 | Away Market Center A: Offer 50 @ 2.15 |

The market maker quote book 33a looks like this:

| Market Maker Bids | Market Maker Offers |
| --- | --- |
| LMM: Bid 50 @ 1.95 | LMM: Offer 30 @ 2.10 |

The internal order book 29a is empty at the start of this example, but is populated by a series of incoming orders in the next steps.

→The market center BBO is 1.95 to 2.10 (50×30)

The public order book looks like this:

| Market Center Bids | Market Center Offers |
|---|---|
| 50 @ 1.95 | 30 @ 2.10 |

Referring to FIGS. 4A-4C, in step 100, the order matching engine 21 receives the following tracking liquidity order:

Order E: Buy 40, Tracking Liquidity

→The NBBO is 2.00 to 2.10 (30×50)

By definition, a tracking liquidity buy order is automatically priced at the NBB. As the NBB is presently 2.00, incoming Buy Order E is automatically priced at 2.00 accordingly. In step 102, the process retrieves the NBO (2.10). In step 104, it checks if incoming Buy Order E is executable. As it is not executable, the process continues to step 106, where it initiates the "Rank Nonmarketable Order Process" and proceeds to step 200 (FIG. 5).

The process continues to step 202, where it checks if incoming Buy Order E is fully displayed. As it is not a fully-displayed order type, the process continues to step 208, where it checks in incoming Buy Order E is a reserve order instead. As it is not a reserve order, the process continues to step 218, where it checks if incoming Buy Order E is a discretionary order instead. As it is not a discretionary order, the process continues to step 224, where it checks if incoming Buy Order E is a passive liquidity order instead. As it is not a passive liquidity order, the process continues to step 228, where it ranks incoming Buy Order E in price/time priority in the Tracking Process at the price point of 2.00. The process then terminates in step 230 as indicated.

→The NBBO remains unchanged and is still 2.00 to 2.10 (30×50)

The bid side of the internal order book 29a looks like this:

| Price Point | Display Process | Reserve Process | Liquidity Process | Discretionary Process | Tracking Process |
|---|---|---|---|---|---|
| 2.00 | | | | | Order E: Buy 40 ← |

→The market center BBO remains unchanged and is still 1.95 to 2.10 (50×30)

As tracking liquidity orders are not displayed to the marketplace, the public order book remains unchanged and still looks like this:

| Market Center Bids | Market Center Offers |
|---|---|
| 50 @ 1.95 | 30 @ 2.10 |

Returning to FIG. 4A, at step 100, the order matching engine 21 receives the following discretionary order:

Order D: Buy 30@ 1.95 with Discretion to 2.00

In step 102, the process retrieves the NBO (2.10). In step 104, it checks if incoming Buy Order D is executable. As it is not executable, the process continues to step 106, where it initiates the "Rank Nonmarketable Order Process," and proceeds to step 200 (FIG. 5).

The process continues to step 202, where it checks if incoming Buy Order D is fully displayed. As it is not a fully-displayed order type, the process continues to step 208, where it checks in incoming Buy Order D is a reserve order instead. As it is not a reserve order, the process continues to step 218, where it checks if incoming Buy Order D is a discretionary order instead. As it is a discretionary order, the process continues to step 220, where it ranks the displayed portion of incoming Buy Order D in price/time priority in the Display Order Process. As the displayed price of incoming Buy Order D is 1.95, the order is ranked in price/time priority at the price point of 1.95, as illustrated below. The process then continues to step 222, where it ranks the discretionary price of incoming Buy Order D in the Discretionary Process at the price point of 2.00, its discretionary price. The discretionary portion of the order is shown in reverse-display to emphasize the fact that the discretionary order does not reside in multiple cells. The discretionary order resides in the Display Order Process, but a link resides in the Discretionary Process at the price point of 2.00 indicating the more aggressive price. The process then terminates in step 230 as indicated.

→The NBBO remains unchanged and is still 2.00 to 2.10 (30×50)

The bid side of the internal order book 29a now looks like this:

| Price Point | Display Process | Reserve Process | Liquidity Process | Discretionary Process | Tracking Process |
|---|---|---|---|---|---|
| 2.00 | | | | Link to Order D: Buy 30 ← | Order E: Buy 40 |
| 1.95 | Order D: Buy 30 ← | | | | |

Only the displayed price of Order D is included in the aggregate quantity displayed to the marketplace. Order D's quantity (30) is aggregated with the lead market maker's bid quantity (50).

→The market center BBO is now 1.95 to 2.10 (80×30)

The public order book now looks like this:

| Market Center Bids | Market Center Offers |
|---|---|
| 80 @ 1.95 ← | 30 @ 2.10 |

Referring again to FIG. 4A, at step 100, the order matching engine 21 receives the following passive liquidity order:

Order C: Buy 90@ 2.05, Passive Liquidity

In step 102, the process retrieves the NBO (2.10). In step 104, it checks if incoming Buy Order C is executable. As it is not executable, the process continues to step 106, where it initiates the "Rank Nonmarketable Order Process," and proceeds to step 200 (FIG. 5).

The process continues to step 202, where it checks if incoming Buy Order C is fully displayed. As it is not a fully-displayed order type, the process continues to step 208, where it checks in incoming Buy Order C is a reserve order instead. As it is not a reserve order, the process continues to step 218, where it checks if incoming Buy Order C is a discretionary order instead. As it is not a discretionary order, the process continues to step 224, where it checks if incoming Buy Order C is a passive liquidity order instead. As it is, the process continues to step 226, where it ranks incoming Buy Order C in price/time priority in the Liquidity Process at the price point of 2.05. The process then terminates in step 230 as indicated.

→The NBBO remains unchanged and is still 2.00 to 2.10 (30×50)

The bid side of the internal order book 29a now looks like this:

| Price Point | Display Process | Reserve Process | Liquidity Process | Discretionary Process | Tracking Process |
|---|---|---|---|---|---|
| 2.05 | | | Order C: Buy 90 ← | | |
| 2.00 | | | | Link to Order D: Buy 30 | Order E: Buy 40 |
| 1.95 | Order D: Buy 30 | | | | |

→The market center BBO remains unchanged and is still 1.95 to 2.10 (80×30)

As passive liquidity orders are not displayed to the marketplace, the public order book remains unchanged and still looks like this:

| Market Center Bids | Market Center Offers |
|---|---|
| 80 @ 1.95 | 30 @ 2.10 |

Referring again to FIG. 4A, at step 100, the order matching engine 21 receives the following limit order:

Order A: Buy 10@ 2.00

In step 102, the process retrieves the NBO (2.10). In step 104, it checks if incoming Buy Order A is executable. As it is not executable, the process continues to step 106, where it initiates the "Rank Nonmarketable Order Process," and proceeds to step 200 (FIG. 5).

The process continues to step 202, where it checks if incoming Buy Order A is fully displayed. As it is, the process continues to step 204, where it ranks incoming Buy Order A in price/time priority at the price point of 2.00 in the Display Order Process. The process terminates in step 206 as indicated.

→The NBBO is now 2.00 to 2.10 (40×50)

The bid side of the internal order book 29a now looks like this:

| Price Point | Display Process | Reserve Process | Liquidity Process | Discretionary Process | Tracking Process |
|---|---|---|---|---|---|
| 2.05 | | | Order C: Buy 90 | | |
| 2.00 | Order A: Buy 10 ← | | | Link to Order D: Buy 30 | Order E: Buy 40 |
| 1.95 | Order D: Buy 30 | | | | |

→The market center BBO is now 2.00 to 2.10 (10×30)
The public order book now looks like this:

| Market Center Bids | Market Center Offers |
|---|---|
| 10 @ 2.00 ← | 30 @ 2.10 |
| 80 @ 1.95 | |

Referring again to FIG. 4A, at step 100, the order matching engine 21 receives the following reserve order:

Order B: Buy 100@ 2.00, Show Size=20, Reserve Size=80

In step 102, the process retrieves the NBO (2.10). In step 104, it checks if incoming Buy Order B is executable. As it is not executable, the process continues to step 106, where it initiates the "Rank Nonmarketable Order Process," and proceeds to step 200 (FIG. 5).

The process continues to step 202, where it checks if incoming Buy Order B is fully displayed. As it is not a fully-displayed order type, the process continues to step 208, where it checks in incoming Buy Order B is a reserve order instead. As it is a reserve order, the process continues to step 210, where it ranks the displayed portion of incoming Buy Order B (i.e., the Show Size of 20 contracts) in price/time priority in the Display Order Process. As Buy Order A was received first, Buy Order B is ranked behind it at the price point of 2.00, as illustrated below. The process then continues to step 212, where it ranks the reserve portion of incoming Buy Order B (80 contracts) in the Reserve Process at the price point of 2.00 according to the price/time priority of the displayed portion. By way of explanation, this simply means that the displayed and nondisplayed components are not treated as independent orders. This is emphasized by displaying the components on the same row of the table below.

→The NBBO is now 2.00 to 2.10 (60×50)

The bid side of the internal order book 29a now looks like this:

| Price Point | Display Process | Reserve Process | Liquidity Process | Discretionary Process | Tracking Process |
|---|---|---|---|---|---|
| 2.05 | | | Order C: Buy 90 | | |
| 2.00 | Order A: Buy 10 | | | Link to Order D: Buy 30 | Order E: Buy 40 |
| | Order B: Buy 20 ← | Order B: Buy 80 ← | | | |
| 1.95 | Order D: Buy 30 | | | | |

→The market center BBO is now 2.00 to 2.10 (30×30)

Only the displayed portion of Buy Order B is included in the aggregate bid quantity displayed to the marketplace. The public order book now looks like this:

| Market Center Bids | Market Center Offers |
|---|---|
| 30 @ 2.00 ← | 30 @ 2.10 |
| 80 @ 1.95 | |

The away market BBO book 25a remains unchanged and still looks like this:

| Away Market Best Bids | Away Market Best Offers |
|---|---|
| Away Market Center A: Bid 30 @ 2.00 | Away Market Center B: Offer 20 @ 2.10 |
| Away Market Center B: Bid 40 @ 1.95 | Away Market Center A: Offer 50 @ 2.15 |

The market maker quote book 33a remains unchanged and still looks like this:

| Market Maker Bids | Market Maker Offers |
|---|---|
| LMM: Bid 50 @ 1.95 | LMM: Offer 30 @ 2.10 |

Referring now to FIGS. 10A-10C, at step 1100, the order matching engine 21 receives the following order:

Order X: Sell 250@ 2.00

In step 1102, the process retrieves the NBB (2.00). In step 1104, it checks if incoming Sell Order X is executable. As the price of incoming Sell Order X (2.00) is the same as the NBB (2.00), the order is executable, and the process continues to step 1110.

In step 1110, the process checks if there are any passive liquidity buy orders whose price is superior to the NBB. As Buy Order C's price (2.05) is superior to the NBB (2.00), the process retrieves Order C in step 1112. In step 1114, the process executes 90 contracts of incoming Sell Order X against Buy Order C, at Buy Order C's limit price of 2.05. As illustrated here, incoming Sell Order X received price improvement. Buy Order C is completely depleted, and is removed from the internal order book 29a.

→The NBBO remains unchanged and is still 2.00 to 2.10 (60×50)

The bid side of the internal order book 29a now looks like this:

| Price Point | Display Process | Reserve Process | Liquidity Process | Discretionary Process | Tracking Process |
|---|---|---|---|---|---|
| 2.00 | Order A: Buy 10 | | | Link to Order D: Buy 30 | Order E: Buy 40 |
| 1.95 | Order B: Buy 20 Order D: Buy 30 | Order B: Buy 80 | | | |

→The market center BBO remains unchanged and is still 2.00 to 2.10 (30×30)

As passive liquidity orders are not displayed, the public order book remains unchanged.

The process continues to step 1116, where it checks if incoming Sell Order X still has any contracts available to trade. As it still has 160 contracts remaining, the process continues to step 1120, where it checks if there are any additional passive liquidity buy orders whose prices are superior to the NBB. As there are none, the process continues to step 1122, where it combines the away market BBO book 25a, the market maker quote book 33a, and the internal order book 29a together in a virtual consolidated order and quote list, which it ranks in price/display/time priority but with a preference for resident interest over away market interest at the same price level.

The bid side of the virtual consolidated order and quote list looks like this: Highest priority-→→→→→→→→→Lowest priority

| Price Point | Display Process | Reserve Process | Liquidity Process | Discretionary Process | Tracking Process | Routing Process |
|---|---|---|---|---|---|---|
| 2.00 | Order A: Buy 10 | | | Link to Order D: Buy 30 | Order E: Buy 40 | Market A: Bid 30 |
| 1.95 | Order B: Buy 20 LMM: Bid 50 Order D: Buy 30 | Order B: Buy 80 | | | | Market B: Bid 40 |

As shown above, the lead market maker's bid has a higher ranking at the price of 1.95 than Order D because its timestamp is earlier (the lead market maker's bid was already disseminated at the start of this example). As also shown below, Away Market A has the lowest priority for executing at the price of 2.00, and Away Market B has the lowest priority for executing at the price of 1.95.

The process continues to step 1124, where it checks if incoming Sell Order X's price (2.00) is less than or equal to the NBB (2.00). As it is at the NBB, the process proceeds to step 1146, where it checks if this issue has any assigned market makers. As this issue has assigned market makers, the process continues to step 1148, where it checks if incoming Sell Order X is a directed order. As it is not a directed order, the process continues to step 1152, where it initiates the "LMM Guaranteed Bid Process," and proceeds to step 1400 (FIG. 11).

In step 1402, the process retrieves the lead market maker's bid. In step 1404, the process checks if the lead market maker's bid is at the NBB. As the lead market maker's bid (1.95) is inferior to the NBB (2.00), the lead market maker is not entitled to participate in the LMM Guaranteed Bid Process. Accordingly, the process continues to step 1406, where it returns to step 1152 (FIG. 10C).

The process continues to step 1154, where it checks if incoming Sell Order X is still executable. As it is, the process continues to step 1160, where it checks if any away markets are superior to the market center. As the market center's best bid (2.00) is at the NBB (2.00), no away markets are superior. Accordingly, incoming Sell Order X executes on the market center, according to the sequence in which the orders and quotes are ranked. The process continues to step 1166, where it initiates the "Determine Best Resident Bid Process," and proceeds to step 1800 (FIG. 13).

→The NBBO is still 2.00 to 2.10 (60×50)

The bid side of the virtual consolidated order and quote list still looks like this:

| Price Point | Display Process | Reserve Process | Liquidity Process | Discretionary Process | Tracking Process | Routing Process |
|---|---|---|---|---|---|---|
| 2.00 | Order A: Buy 10 | | | Link to Order D: Buy 30 | Order E: Buy 40 | Market A: Bid 30 |
| | Order B: Buy 20 | Order B: Buy 80 | | | | |
| 1.95 | LMM: Bid 50 | | | | | Market B: Bid 40 |
| | Order D: Buy 30 | | | | | |

In step 1802, the process checks if there are any displayed orders or quotes at the NBB (2.00). As there are, it continues to step 1804, where it retrieves the bid with the highest ranking in the Display Order Process, which is Buy Order A. The process bypasses step 1808 and continues to step 1810, where it matches 10 contracts of incoming Sell Order X with Buy Order A, at the price of 2.00. Buy Order A is completely depleted, and is removed from the virtual consolidated order and quote list and the books.

→The NBBO is now 2.00 to 2.10 (50×50)

The bid side of the virtual consolidated order and quote list now looks like this:

| Price Point | Display Process | Reserve Process | Liquidity Process | Discretionary Process | Tracking Process | Routing Process |
|---|---|---|---|---|---|---|
| 2.00 | Order B: Buy 20 | Order B: Buy 80 | | Link to Order D: Buy 30 | Order E: Buy 40 | Market A: Bid 30 |
| 1.95 | LMM: Bid 50 Order D: Buy 30 | | | | | Market B: Bid 40 |

The bid side of the internal order book 29a now looks like this:

| Price Point | Display Process | Reserve Process | Liquidity Process | Discretionary Process | Tracking Process |
|---|---|---|---|---|---|
| 2.00 | Order B: Buy 20 | Order B: Buy 80 | | Link to Order D: Buy 30 | Order E: Buy 40 |
| 1.95 | Order D: Buy 30 | | | | |

→The market center's BBO is now 2.00 to 2.10 (20×30)

The public order book now looks like this:

| Market Center Bids | Market Center Offers |
|---|---|
| 20 @ 2.00 ← | 30 @ 2.10 |
| 80 @ 1.95 | |

The process continues to step 1812, where it returns to step 1166 (FIG. 10C). The process continues to step 1170, where it checks if incoming Sell Order X still has quantity available to trade. As it still has 150 contracts remaining, the process returns to step 1154, where it checks if incoming Sell Order X is still executable. As it is, in step 1160, the process checks again if any away markets are superior to the market center. As none are, the process continues to step 1166, where it activates the "Determine Best Resident Bid Process" again and proceeds to step 1800 (FIG. 13).

In step 1802, the process checks if there are any displayed orders or quotes at the NBB (2.00). As there are, it continues to step 1804, where it retrieves the bid ranked highest by the Display Order Process, which is Buy Order B. The process bypasses step 1808 and continues to step 1810, where it matches 20 contracts of incoming Sell Order X with Buy Order B, at the price of 2.00. The displayed portion of Buy Order B is completely depleted, which is illustrated in this example by setting the size of Buy Order B to zero in the Display Order Process.

The bid side of the virtual consolidated order and quote list momentarily looks like this:

| Price Point | Display Process | Reserve Process | Liquidity Process | Discretionary Process | Tracking Process | Routing Process |
|---|---|---|---|---|---|---|
| 2.00 | Order B: Buy 0 | Order B: Buy 80 | | Link to Orde D: Buy 30 | Order E: Buy 40 | Market A: Bid 30 |
| 1.95 | LMM: Bid 50 Order D: Buy 30 | | | | | Market B: Bid 40 |

The bid side of the internal order book 29*a* momentarily looks like this:

| Price Point | Display Process | Reserve Process | Liquidity Process | Discretionary Process | Tracking Process |
|---|---|---|---|---|---|
| 2.00 | Order B: Buy 0 | Order B: Buy 80 | | Link to Order D: Buy 30 | Order E: Buy 40 |

-continued

| Price Point | Display Process | Reserve Process | Liquidity Process | Discretionary Process | Tracking Process |
|---|---|---|---|---|---|
| 1.95 | Order D: Buy 30 | | | | |

→The market center BBO is now 1.95 to 2.10 (80×30). The market center 20 is no longer at the NBB.

The public order book now looks like this:

| Market Center Bids | Market Center Offers |
|---|---|
| 80 @ 1.95 ← | 30 @ 2.10 |

The process continues to step 1812, where it returns to step 1166 (FIG. 10C). The process continues to step 1170, where it checks if incoming Sell Order X still has quantity available to trade. As it still has 130 contracts remaining, the process returns to step 1154, where it checks if incoming Sell Order X is still executable. As it is, in step 1160, the process checks again if any away markets are superior to the market center. Although the market center 20 is no longer at the NBB, it still has orders that can execute at the NBB. Accordingly, away market center A is not superior to the market center 20. The process therefore continues, as before, to step 1166, where the "Determine Best Resident Bid Process" is initiated again at step 1800 (FIG. 13).

In step 1802, the process checks if there are any displayed orders or quotes at the NBB (2.00). As there are none, it continues to step 1814, where it checks if there are any portions of reserve buy orders priced at the NBB. As reserve order B is priced at the NBB, the process continues to step 1816, where it retrieves the buy order with the highest ranking in the Reserve Process, which is Buy Order B. In step 1818, it matches 80 contracts of incoming Sell Order X with Buy Order B, at the price of 2.00. The reserve portion of Buy Order B is completely depleted, so Buy Order B is completely removed from the virtual consolidated order and quote list and the books.

→The NBBO is now 2.00 to 2.10 (30×50).

The bid side of the virtual consolidated order and quote list now looks like this:

| Price Point | Display Process | Reserve Process | Liquidity Process | Discretionary Process | Tracking Process | Routing Process |
|---|---|---|---|---|---|---|
| 2.00 | | | | Link to Order D: Buy 30 | Order E: Buy 40 | Market A: Bid 30 |
| 1.95 | LMM: Bid 50 Order D: Buy 30 | | | | | Market B: Bid 40 |

The bid side of the internal order book 29*a* now looks like this:

| Price Point | Display Process | Reserve Process | Liquidity Process | Discretionary Process | Tracking Process |
|---|---|---|---|---|---|
| 2.00 | | | | Link to Order D: Buy 30 | Order E: Buy 40 |
| 1.95 | Order D: Buy 30 | | | | |

As the reserve portion of Buy Order B was never displayed publicly, the market center BBO and the public order book remain unchanged. The process continues to step 1820, where it returns to step 1166 (FIG. 10C). The process continues to step 1170, where it checks if incoming Sell Order X still has quantity available to trade. As it still has 50 contracts remaining, the process returns to step 1154, where it checks if incoming Sell Order X is still executable. As it is, in step 1160, the process checks again if any away markets are superior to the market center. Although the market center 20 is no longer at the NBB, it still has orders that can execute at the NBB. Accordingly, away market center A is not superior to the market center 20. The process therefore continues, as before, to step 1166, where the "Determine Best Resident Bid Process" is again initiated and proceeds to step 1800 (FIG. 13).

In step 1802, the process checks if there are any displayed orders or quotes at the NBB (2.00). As there are none, it continues to step 1814, where it checks if there are any portions of reserve buy orders priced at the NBB. As there are none, it continues to step 1822, where it checks if there are any passive liquidity buy orders at the NBB. As there are none, it continues to step 1830, where it checks if there are any discretionary buy orders that can step up to the NBB. As Buy Order D can step up to 2.00, the NBB, the process continues to step 1832, where it retrieves Buy Order D. In step 1834, the process matches 30 contracts of incoming Sell Order X against Buy Order D, at the price of 2.00, completely depleting Buy Order D and removing it from the virtual consolidated order and quote list and the books.
→The NBBO remains unchanged and is still 2.00 to 2.10 (30×50)

The bid side of the virtual consolidated order and quote list now looks like this:

| Price Point | Display Process | Reserve Process | Liquidity Process | Discretionary Process | Tracking Process | Routing Process |
|---|---|---|---|---|---|---|
| 2.00 | | | | | Order E: Buy 40 | Market A: Bid 30 |
| 1.95 | LMM: Bid 50 | | | | | Market B: Bid 40 |

The bid side of the internal order book 29a now looks like this:

| Price Point | Display Process | Reserve Process | Liquidity Process | Discretionary Process | Tracking Process |
|---|---|---|---|---|---|
| 2.00 | | | | | Order E: Buy 40 |

→The market center BBO is now 1.95 to 2.10 (50×30)

The public order book now looks like this:

| Market Center Bids | Market Center Offers |
|---|---|
| 50 @ 1.95 ← | 30 @ 2.10 |

The process continues to step 1836, where it returns to step 1166 (FIG. 10C). The process continues to step 1170, where it checks if incoming Sell Order X still has quantity available to trade. As it still has 20 contracts remaining, the process returns to step 1154, where it checks if incoming Sell Order X is still executable. As it is, in step 1160, the process checks again if any away markets are superior to the market center. Once again, although the market center 20 is no longer at the NBB, it still has orders that can execute at the NBB. Accordingly, away market center A is not superior to the market center 20. The process therefore continues to step 1166 to invoke the "Determine Best Resident Bid Process."

In step 1802, the process checks if there are any displayed orders or quotes at the NBB (2.00). As there are none, it continues to step 1814, where it checks if there are any portions of reserve buy orders priced at the NBB. As there are none, it continues to step 1822, where it checks if there are any passive liquidity buy orders at the NBB. As there are none, it continues to step 1830, where it checks if there are any discretionary buy orders that can step up to the NBB. As there are none, it continues to step 1838, where it checks if there are any tracking liquidity buy orders at the NBB. As Buy Order E is priced at the NBB (2.00), the process retrieves it in step 1842. In step 1844, the process determines that Buy Order E is eligible to execute according to the rules of U.S. patent application Ser. No. 11/416,943, i.e., incoming Sell Order X would otherwise route to away market center A, except that Buy Order E has sufficient size (40 contracts) to fully intercept the remaining size of incoming Sell Order X (20 contracts). Accordingly, the process matches 20 contracts of incoming Sell Order X against Buy Order E, at the price of 2.00. As any unexecuted portion of a tracking liquidity orders is immediately canceled by definition, Buy Order E is removed from the internal order book 29a and the virtual consolidated order and quote list.
→The NBBO remains unchanged and is still 2.00 to 2.10 (30×50)

At the end of this example, the bid side of the virtual consolidated order and quote list now looks like this:

| Price Point | Display Process | Reserve Process | Liquidity Process | Discretionary Process | Tracking Process | Routing Process |
|---|---|---|---|---|---|---|
| 2.00 | | | | | | Market A: Bid 30 |
| 1.95 | LMM: Bid 50 | | | | | Market B: Bid 40 |

As incoming Sell Order X has completed trading, the virtual consolidated order and quote list is no longer needed and is deleted from local memory.

The away market BBO book 25a remains unchanged and still looks like this:

| Away Market Best Bids | Away Market Best Offers |
|---|---|
| Away Market Center A: Bid 30 @ 2.00 | Away Market Center B: Offer 20 @ 2.10 |
| Away Market Center B: Bid 40 @ 1.95 | Away Market Center A: Offer 50 @ 2.15 |

The market maker quote book 33a remains unchanged and still looks like this:

| Market Maker Bids | Market Maker Offers |
|---|---|
| LMM: Bid 50 @ 1.95 | LMM: Offer 30 @ 2.10 |

The bid side of the internal order book 29a has been completely depleted by trading.

→The market center BBO remains unchanged and is still 1.95 to 2.10 (50×30)

The public order book remains unchanged and still looks like this:

| Market Center Bids | Market Center Offers |
|---|---|
| 50 @ 1.95 | 30 @ 2.10 |

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A computer-implemented method, comprising:

storing, in a non-transitory memory of a market center an order book for each options series in a plurality of options series and a quote book for each options series in said plurality of options series, the market center comprising one or more computing systems including said memory, an interface, and a computer processor executing computer-readable code stored in said memory, said computer-readable code including a set of order execution routines that are executed in a predetermined sequence so as to fully execute all incoming orders, each order book being stored in a memory location that is separate from each quote book in said memory, wherein each order book includes an interest component that is displayed by the market center and a nondisplayed interest component, and wherein a portion of the plurality of options series has an appointed lead market maker;

receiving, via the interface of the market center, an incoming order associated with a first options series among the plurality of options series;

retrieving, by the computer processor of the market center, from said memory, a first order book and a first quote book associated with the first options series among order books and quote books for the plurality of options series;

maximizing matching opportunities by integrating, by the computer processor of the market center, said first order book and said first quote book associated with the first options series to create one virtual, searchable consolidated list of displayed orders, partially-displayed orders, non-displayed orders and market maker quotes from among said first order book and said first quote book, such that said virtual consolidated list is separate from said first order book and said first quote book;

the computer processor creating the virtual consolidated list by momentarily combining quotes from said first quote book and orders from said first order book in a local memory of said one or more computing systems, without disrupting operations of said first quote book;

minimizing, by the computer processor of the market center, matching times by only performing matching functions for the incoming order against said virtual consolidated list;

executing, by the computer processor of the market center, the set of order execution routines, commencing with a first routine, in the predetermined sequence, said executing including:

determining, by the computer processor of the market center, that the incoming order associated with the first options series is among the portion of the plurality of options series that has the lead market maker;

determining, by the computer processor of the market center, that the lead market maker has a quote at a national best bid and offer (NBBO);

determining, by the computer processor of the market center, that the lead market maker quote is first in time in said virtual consolidated list;

computing, by the computer processor of the market center, an allocation percentage for the lead market maker;

matching, by the computer processor of the market center, the incoming order up to the allocation percentage amount computed for the lead market maker; and matching, by the computer processor of the market center, the incoming order against a customer order before the lead market maker's quote when it is determined that the customer order has a quote that is at the NBBO and is earlier in time than the quote from the lead market maker in said virtual consolidated list;

deleting said virtual consolidated list from the local memory when said matching functions of the set of order execution routines are completed; and executing, by the computer processor of the market center, the incoming order as matched according to said matching functions.

2. The computer-implemented method of claim 1, further comprising, prior to computing the lead market maker allocation percentage:

determining if the virtual consolidated list has at least one customer order at the NBBO;

wherein if the virtual consolidated list has the at least one customer order at the NBBO, determining if the at least one customer order is displayed and was posted to the first order book prior to the lead market maker quote at the NBBO;

wherein if the at least one customer order at the NBBO is displayed and was posted to the first order book prior to the lead market maker quote at the NBBO, matching the incoming order with the at least one customer order.

3. The computer-implemented method of claim 2, wherein if the at least one customer order at the NBBO was posted to the first order book after the lead market maker quote at the NBBO, proceeding to compute the lead market maker allocation percentage.

4. The computer-implemented method of claim 2, wherein if the at least one customer order at the NBBO is not displayed, proceeding to compute the lead market maker allocation percentage.

5. The computer-implemented method of claim 1, further comprising:

determining if the first order book has at least one nondisplayed order with a price superior to the NBBO;

wherein if the first order book has the at least one nondisplayed order with the price superior to the NBBO, determining if the at least one nondisplayed order is executable ahead of the lead market maker quote;

wherein if the at least one nondisplayed order with a price superior to the NBBO is executable ahead of the lead market maker quote, matching the incoming order with the at least one nondisplayed order with the price superior to the NBBO.

6. The computer-implemented method of claim 1, wherein the lead market maker has a quote at a national best offer (NBO).

7. The computer-implemented method of claim 1, wherein the lead market maker has a quote at a national best bid (NBB).

8. The computer-implemented method of claim 1, further comprising:
providing at least one appointed market maker in the portion of the plurality of options series in addition to the lead market maker:
wherein the incoming order is from a specified order sending firm and is directed to and designates the at least one appointed market maker;
determining if the specified order sending firm is permissioned to direct orders to the at least one appointed market maker;
wherein if the specified order sending firm does have permission to direct orders to the at least one appointed market maker, determining if the at least one appointed market maker has a quote at the NBBO;
wherein if the at least one appointed market maker has a quote at the NBBO, computing an allocation percentage for the at least one appointed market maker; and
matching the incoming order up to the allocation percentage amount computed for the at least one appointed market maker.

9. The computer-implemented method of claim 8, further comprising, prior to computing the at least one appointed market maker allocation percentage:
determining if the first order book has at least one customer order at the NBBO;
wherein if the first order book does have the at least one customer order at the NBBO, determining if the at least one customer order is displayed and was posted to the first order book prior to the at least one appointed market maker quote at the NBBO;
wherein if the at least one customer order is displayed and was posted to the first order book prior to the at least one appointed market maker quote at the NBBO, matching the incoming order with the at least one customer order.

10. The computer-implemented method of claim 9, wherein if the at least one customer order was posted to the first order book after the at least one appointed market maker quote at the NBBO, proceeding to compute the at least one appointed market maker allocation percentage.

11. The computer-implemented method of claim 9, wherein if the at least one customer order at the NBBO is not displayed, proceeding to compute the at least one appointed market maker allocation percentage.

12. The computer-implemented method of claim 8, further comprising:
determining if the first order book has at least one nondisplayed order with a price superior to the NBBO;
wherein if the first order book does have the at least one nondisplayed order with the price superior to the NBBO, determining if the at least one nondisplayed order is executable ahead of the at least one appointed market maker quote;
wherein if the at least one nondisplayed order with the price superior to the NBBO is executable ahead of the at least one appointed market maker quote, matching the incoming order with the at least one nondisplayed order with the price superior to the NBBO.

13. The computer-implemented method of claim 8, wherein the at least one appointed market maker has a quote at a national best offer (NBO).

14. The computer-implemented method of claim 8, wherein the at least one appointed market maker has a quote at a national best bid (NBB).

15. The computer-implemented method of claim 1, wherein the market center includes a reserve process and wherein the incoming order is processed by the reserve process.

16. The computer-implemented method of claim 1, wherein the market center includes a liquidity process and wherein the incoming order is processed by the liquidity process.

17. The computer-implemented method of claim 1, wherein the market center includes a discretionary process and wherein the incoming order is processed by the discretionary process.

18. The computer-implemented method of claim 1, wherein the market center includes a tracking process and wherein the incoming order is processed by the tracking process.

19. The computer-implemented method of claim 1, wherein the market center includes a routing process and wherein the incoming order is processed by the routing process.

20. The computer-implemented method of claim 1, wherein the integrating of said first order book and said first quote book includes combining stored orders in the first order book and stored quotes in the first quote book into the virtual consolidated list.

21. The computer-implemented method of claim 20, wherein the virtual consolidated list is ranked according to a combination of a price, a time priority and order display characteristics.

22. A computer system comprising:
an order book for each options series in a plurality of options series and a quote book for each options series in said plurality of options series, each order book being stored in a memory location of non-transitory memory of the computer system that is separate from each quote book, wherein each order book comprises an interest component that is displayed by the computer system and a nondisplayed interest component, wherein a portion of the plurality of the options series has an appointed lead market maker;
first and second interfaces respectively receiving orders and receiving quotes;
the non-transitory memory storing code that when executed, analyzes and processes the orders and the quotes, said code including a set of order execution routines that are executed in a predetermined sequence so as to fully execute all incoming orders;
a computer processor interacting with the first and second interfaces and executing the code for analyzing and processing the quotes and the orders, wherein the code, when executed, causes the computer processor to:
receive an incoming order associated with a first options series among the plurality of options series;
retrieve a first order book and a first quote book associated with the first options series among order books and quote books for the plurality of options series;
maximize matching opportunities by integrating the first order book and said first quote book associated with the first options series to create one virtual, searchable consolidated list of displayed orders, partially-displayed orders, non-displayed orders and market maker quotes from among said first order book and said first quote book, said virtual consolidated list being separate from said first order book and said first quote book, said virtual consolidated list created by momentarily combining quotes from said first quote book and orders from said first order book in a local memory of said computer system, without disrupting operations of said first quote book;

minimize matching times by only performing matching functions for the incoming order against said virtual consolidated list;

execute the set of order execution routines, commencing with a first routine, in the predetermined sequence, said execute including:

determine that the incoming order associated with the first options series is among the portion of the plurality of options series that has the lead market maker;

determine that the lead market maker has a quote at a national best bid and offer (NBBO);

compute an allocation for the lead market maker;

match the incoming order up to the allocation percentage amount computed for the lead maker when it is determined that the quote from the lead market maker at the NBBO is earlier in time in said virtual consolidated list; and match, via the virtual consolidated list, the incoming order against a customer order before the lead market maker's quote when it is determined that the has a quote that is at least at the NBBO and is earlier in time than the quote from the lead market maker in the virtual consolidated list;

delete said virtual consolidated list from said local memory when said matching functions of the set of order execution routines are completed, and execute the incoming order as matched according to said matching functions.

23. The computer system of claim 22, wherein the code, when executed, further causes the computer processor to, prior to computing the lead market maker allocation percentage:

determine if the virtual consolidated list has at least one customer order at the NBBO;

wherein if the virtual consolidated list has the at least one customer order at the NBBO, determine if the at least one customer order is displayed and was posted to the first order book prior to the lead market maker quote at the NBBO;

wherein if the at least one customer order at the NBBO is displayed and was posted to the first order book prior to the lead market maker quote at the NBBO, match the incoming order with the at least one customer order.

24. The computer system of claim 23, wherein if the at least one customer order at the NBBO was posted to the first order book after the lead market maker quote at the NBBO, the code, when executed, further causes the computer processor to compute the lead market maker allocation percentage.

25. The computer system of claim 22, wherein the computer processor is configured to integrate said first order book and said first quote book by combining stored orders in the first order book and stored quotes in the first quote book into the virtual consolidated list.

26. The computer system of claim 25, wherein the virtual consolidated list is ranked according to a combination of a price, a time priority and order display characteristics.

* * * * *